US012766727B2

(12) United States Patent
Zizka et al.

(10) Patent No.: US 12,766,727 B2
(45) Date of Patent: Oct. 20, 2026

(54) MOBILE ROBOTS FOR A FULFILLMENT CENTER AND METHODS OF AUTOMATIC ORDER FULFILLMENT USING SAME

(71) Applicant: Brightpick s.r.o., Bratislava (SK)

(72) Inventors: Jan Zizka, Ziar nad Hronom (SK); Tomas Kovacovsky, Bratislava (SK); Michal Maly, Bratislava (SK)

(73) Assignee: Brightpick s. r. o., Bratislava (SK)

( * ) Notice: Subject to any disclaimer, the term of this patent is extended or adjusted under 35 U.S.C. 154(b) by 441 days.

(21) Appl. No.: 18/339,965

(22) Filed: Jun. 22, 2023

(65) Prior Publication Data

US 2023/0415345 A1 Dec. 28, 2023

Related U.S. Application Data

(60) Provisional application No. 63/354,577, filed on Jun. 22, 2022.

(51) Int. Cl.

| | |
|---|---|
| ***B25J 9/16*** | (2006.01) |
| ***B25J 5/00*** | (2006.01) |
| ***B25J 9/04*** | (2006.01) |
| ***B25J 19/02*** | (2006.01) |
| ***B65G 1/04*** | (2006.01) |

(52) U.S. Cl.

CPC ............ *B25J 9/1679* (2013.01); *B25J 5/007* (2013.01); *B25J 9/042* (2013.01); *B25J 19/023* (2013.01); *B65G 1/0492* (2013.01)

(58) Field of Classification Search

CPC . B25J 9/042; B25J 9/1679; B25J 5/007; B25J 19/023; B65G 1/0492

USPC ........................................................ 414/279

See application file for complete search history.

(56) References Cited

U.S. PATENT DOCUMENTS

| | | | | |
|---|---|---|---|---|
| 10,315,843 | B2 * | 6/2019 | Magens | B65G 1/0492 |
| 2018/0065806 | A1 * | 3/2018 | Sugahara | B25J 9/04 |
| 2019/0337733 | A1 * | 11/2019 | Wehner | B65G 47/90 |

(Continued)

OTHER PUBLICATIONS

Brightpick robot demonstration at ProMat (Mar. 20, 2023), accessed at https://www.youtube.com/shorts/EEnpmhclc01 on Sep. 25, 2023, 1 page.

(Continued)

*Primary Examiner* — Terrell H Matthews
(74) *Attorney, Agent, or Firm* — Smith Baluch LLP

(57) ABSTRACT

Conventional automated storage and retrieval systems (ASRSs) are expensive, time consuming to implement, require an appreciable amount of space, and difficult to change after implementation. Accordingly, various mobile robots are described herein that provide on the spot retrieval, picking, and/or placement of items without relying upon any infrastructure to facilitate movement through an environment, thus simplifying deployment and providing a highly scalable solution to automate order fulfillment. In one example, a mobile picker apparatus includes movable platforms to load or unload boxes, a camera assembly to acquire imagery of the items in a box to locate an item for picking, and a picker robot to pick the item from the box and place the item in another box. In another example, a mobile runner apparatus includes a set of movable platforms to load or unload boxes and can be used with a stationary picker apparatus or a picking station.

20 Claims, 29 Drawing Sheets

(56) References Cited

U.S. PATENT DOCUMENTS

2019/0366556 A1* 12/2019 Wang .................. B25J 15/0293
2020/0207546 A1* 7/2020 Borders ................. B65G 67/02

OTHER PUBLICATIONS

Correll, Nikolaus, et al. "Analysis and Observations from the First Amazon Picking Challenge." arXiv preprint arXiv:1601.05484 (2016), 17 pages.
World's first autonomous mobile picking robot showcased at ProMat 2023 | Brightpick (Mar. 22, 2023), accessed at https://www.youtube.com/watch?v=1_VAz_iTYqc on Sep. 25, 2023, 2 page.
European Office Action in European App. No. 23180995.5 dated Sep. 5, 2025, 6 pages.
Extended European Search Report in European App. No. 23180995.5 dated Nov. 22, 2023, 8 pages.

* cited by examiner

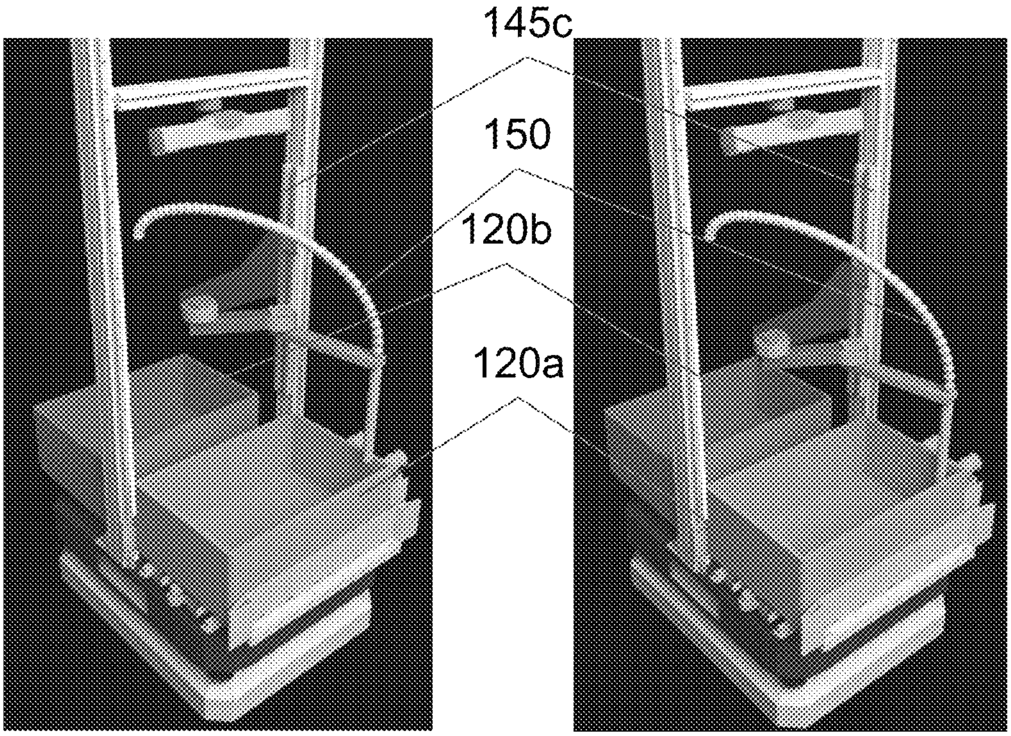
FIG. 2A
FIG. 2B
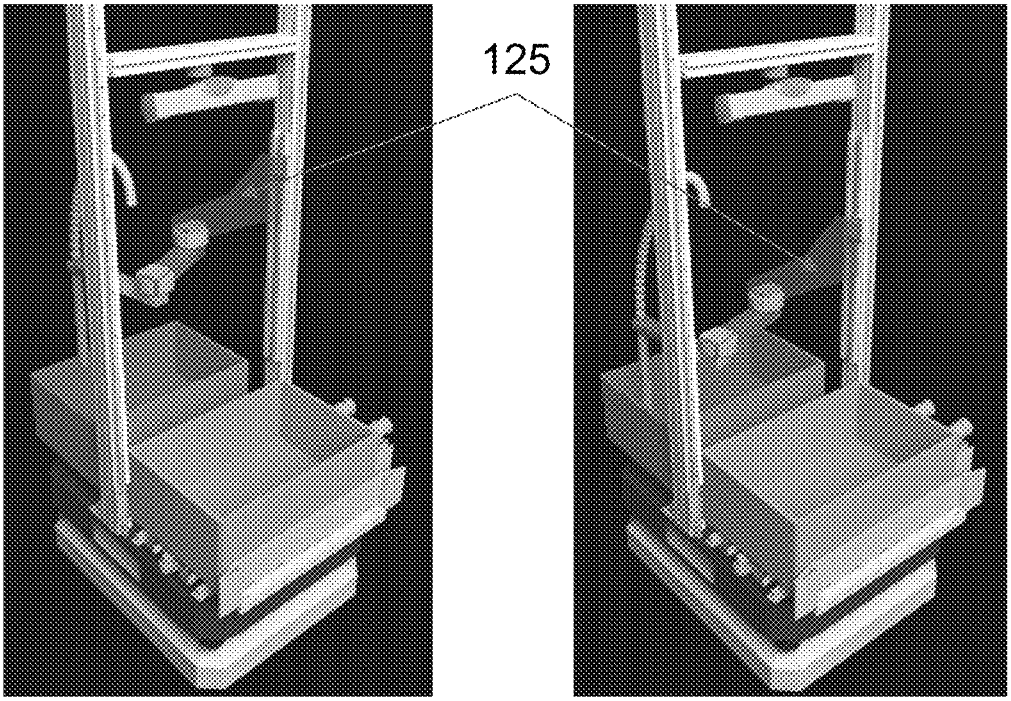
FIG. 2C
FIG. 2D

300

400

400

MOBILE ROBOTS FOR A FULFILLMENT CENTER AND METHODS OF AUTOMATIC ORDER FULFILLMENT USING SAME

CROSS-REFERENCE TO RELATED PATENT APPLICATION(S)

This application claims priority to U.S. Provisional Application No. 63/354,577, filed on Jun. 22, 2022, entitled "MOBILE ROBOTS FOR WAREHOUSE OPERATION AND AUTOMATIC ORDER FULFILLMENT," which is incorporated herein by reference in its entirety.

BACKGROUND

A fulfillment center is a facility that processes and prepares orders for delivery, for example, to a retailer or directly to the end customer. Conventional fulfillment centers typically include a warehouse to store an inventory of stock items from which one or more items are picked when fulfilling an order. In some fulfillment centers, the process of picking stock items for an order is performed manually. More recently, some fulfillment centers employ an automated storage and retrieval systems (ASRS) to automate portions of the picking process. The ASRS may provide, for example, automated retrieval of boxes (also sometimes referred to as a "tote," a "bin," or a "container") with stock items stored on shelving units, automated picking of stock items for an order (e.g., by moving an item from a source box containing stock items to a destination box containing picked items for an order), and/or automated placement of the boxes on the shelving units (e.g., after item(s) are picked, to refill stock items). Once all the items for an order are picked and stored in a destination box, the order can be deemed complete and further processed for packing, shipping, and so on.

SUMMARY

The tasks of retrieving, picking, and placing items to fulfill an order in a fulfillment center can be inordinately complex. Typically, thousands of orders are processed at a time, which can create logistical challenges with multiple source boxes and/or multiple destination boxes moving in confined spaces within the fulfillment center as items are picked for each order. For example, the locations of source boxes and destination boxes and/or stock levels for thousands of items continuously change over time. In another example, items are often picked at centralized locations using human-operated or automated picking stations, thus requiring the source boxes and/or the destination boxes to arrive at a picking station in a particular sequence and/or time window so that orders can be fulfilled in a timely manner. The process of picking items is further complicated by some stock items often requiring a human operator to pick, such as fresh produce, or fragile items.

To address some of these challenges, conventional ASRSs typically provide a highly controlled environment where source boxes and destination boxes or even the items themselves move along preset paths. For example, some conventional ASRS's include an expansive multi-level storage system with conveyors, rails, and/or the like that define the preset paths to facilitate movement of the source boxes and/or destination boxes to different locations of the fulfillment center. These locations can include a picking station, a replenishment area to refill stock items, or a consolidation area to deliver destination boxes with items). Accordingly, the movement of a box or an item in the fulfillment center is limited by the infrastructure of the ASRS.

Conventional ASRSs are also expensive, time consuming to implement, and require a significant amount of space for deployment. This is further exacerbated by a fulfillment center seldom being able to utilize existing infrastructure when implementing a conventional ASRS, such as existing storage racks or shelving. Once an ASRS is implemented, it is also challenging to modify the layout of the ASRS without requiring extensive modification and downtime. For example, the addition of shelves can require installation of new conveyors or rails. In another example, the addition of a picking station or the relocation of existing picking stations can require substantial modifications to the network of conveyors or rails that deliver boxes to and from the picking station.

The present disclosure is thus directed to various inventive mobile robots that provide on the spot retrieval, picking, and/or placement of items to facilitate order fulfillment. The mobile robots described herein do not require any particular infrastructure to facilitate movement or navigation through an environment. Instead, each mobile robot is a standalone apparatus capable of moving and navigating the environment on its own. Thus, the mobile robot can be readily deployed in a variety of different environments (e.g., fulfillment centers with different layouts). For example, the mobile robot can accommodate standardized shelving typically used in human-operated fulfillment centers. In this manner, the mobile robots described herein can be readily deployed in a fulfillment center more quickly and at appreciably lower costs compared to conventional ASRSs. Additionally, the number of mobile robots operating in a fulfillment center can be readily changed, thus providing a simple way to scale automation particularly if the fulfillment center is modified over time (e.g., the layout of the center is changed to accommodate more or less stock items).

In one illustrative example, a mobile robot disclosed herein can be a mobile picker robot (also referred to herein as a "mobile picker apparatus") that is capable of retrieving and holding multiple boxes (e.g., a source box, a destination box), picking an item from one box (e.g., a source box), placing the item into another box (e.g., a destination box), and placing the boxes into different areas of the environment (e.g., a shelf storing source boxes, a consolidation shelf storing destination boxes). The mobile picker apparatus can include a body portion with a drivetrain (e.g., a set of motorized wheels) to facilitate movement of the mobile picker apparatus in an environment (e.g., a warehouse), sensor(s) (e.g., a 3D camera) to facilitate navigation through the environment, a frame, a set of platforms movably coupled to the frame to access shelves at different heights, a picker robot with a gripper to pick and move items from a box, and a camera assembly to acquire imagery of the items in a box (e.g., to guide the picker robot when picking an item).

In one aspect, the mobile picker apparatus's capability to provide on the spot picking can reduce or, in some instances, eliminate the need for dedicated picking stations in the fulfillment center. The mobile picker apparatus can further be configured to hold multiple destination boxes to facilitate batch picking. For example, if two orders include the same item, the mobile picker apparatus can pick these items from one source box for placement in two destination boxes supported by the apparatus corresponding to the two orders. If the mobile picker apparatus encounters an item that it cannot pick, the mobile picker apparatus can also readily approach a human operator working in the same environment for assistance.

In another aspect, the mobile picker apparatus can move the set of platforms along the frame to facilitate the picking of an item, which, in turn, can simplify the design of the picker robot and reduce the cost of the apparatus. For example, the platform supporting a source box can move an item along a vertical axis into contact with the picker robot. Accordingly, the picker robot itself can be fixed along the vertical axis and/or only provides limited vertical travel for the gripper.

In another aspect, the picker robot can include a relatively lower cost and simpler robotic arm. For example, the robotic arm can include a set of arms and a set of rotary joints with each arm being joined to another arm via a rotary joint. The rotary joints can be arranged such that the arms are only displaced and/or oriented within a horizontal plane. Said another way, the rotary joints can be arranged such that their respective rotation axes are oriented vertically. Said in yet another way, each rotary joint can be coupled to a pair of arms such that, when the rotary joint is actuated, the rotary joint does not cause a portion of either arm to move vertically. The robotic arm can also control a relatively fewer number of degrees of freedom (e.g., less than six degrees of freedom), further simplifying the picker robot. This may be accomplished, for example, by incorporating a robotic arm with fewer axes of motion. For example, the robotic arm can include a 4-axis robotic arm (e.g., a Selective Compliance Articulated Robot Arm (SCARA) robotic arm) or a 5-axis robotic arm. However, it should be appreciated that the mobile picker apparatus described herein can include a picker robot with a 6-axis robotic arm.

In another aspect, the frame of the mobile picker apparatus can include a single frame arm to support the set of platforms, the picker robot, and the camera assembly. The picker robot and the camera assembly can further be fixed to the frame arm. This arrangement can, for example, appreciably simplify the design of the mobile picker apparatus and use fewer parts. The picker robot and the camera assembly can each be configured to allow the set of platforms to move past the picker robot and the camera assembly mounted to the frame without colliding with the picker robot or the camera assembly. For example, the set of platforms can include a first platform and a second platform offset from the first platform to form a gap. The picker robot can include a robotic arm and a gripper with a pose (e.g., a position and/or orientation) where the robotic arm and the gripper fit within the gap. Likewise, the camera assembly can include a robotic arm and a camera with a pose where the robotic arm and the camera fit within the gap. The camera assembly can further include a locking mechanism to lock the robotic arm and the camera in the pose to reduce or, in some instances, mitigate any risk of the platforms colliding with the camera assembly.

In another illustrative example, a mobile robot disclosed herein can be a mobile runner robot (also referred to herein as a "mobile runner apparatus") that is capable of retrieving and holding multiple boxes (e.g., a source box, a destination box) and placing the boxes into different areas of the environment (e.g., a picking station, a shelf storing source boxes, a consolidation shelf storing destination boxes). The mobile runner apparatus can include the body portion with the drivetrain, sensor(s), a frame, and a set of platforms movably coupled to the frame, as described above for the mobile picker apparatus. The mobile runner apparatus can thus be used, for example, to facilitate the movement of items and/or boxes with items to and from existing picking stations in a fulfillment center.

Herein a source box is sometimes referred to as an "origin box" or a "donor box" and a destination box is sometimes referred to as a "target box".

All combinations of the foregoing concepts and additional concepts are discussed in greater detail below (provided such concepts are not mutually inconsistent) and are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2A shows the picker robot of FIG. 1A is positioned to align a gripper to an item in a source box as part of an example picking operation.

FIG. 2B shows the picker robot of FIG. 2A is then lowered so that the gripper contacts the item.

FIG. 2C shows the picker robot of FIG. 2B is then raised with the gripper holding the item and the robotic arm is repositioned to align the gripper to a destination box.

FIG. 2D shows the picker robot of FIG. 2C is then lowered so that the gripper places the item into the destination box.

DETAILED DESCRIPTION

Figure 1A:
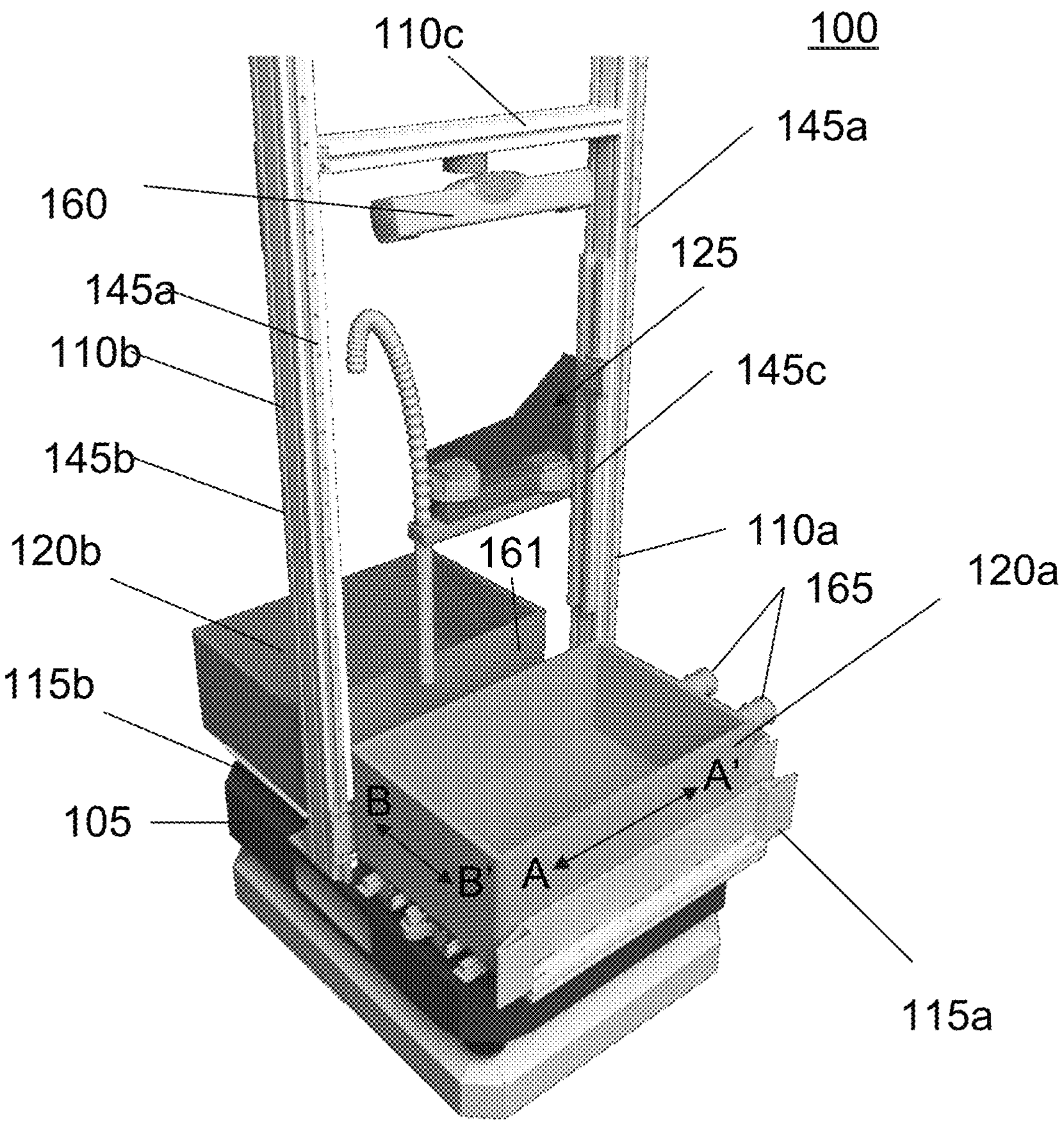
FIG. 1A shows an example mobile picker apparatus to load, unload, and hold two boxes with a picker robot to pick (e.g., transfer) items from one box to the other box.

Following below are more detailed descriptions of various concepts related to, and implementations of, a mobile robot that provides on the spot retrieval, picking, and/or placement of items to facilitate order fulfillment, fulfillment centers deploying the mobile robot, and methods for using the mobile robot to fulfill an order. It should be appreciated that various concepts introduced above and discussed in greater detail below may be implemented in multiple ways. Examples of specific implementations and applications are provided primarily for illustrative purposes so as to enable those skilled in the art to practice the implementations and alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

In the discussion below, various examples of a mobile robot are provided, wherein a given example or set of examples showcases one or more features of a body portion, a drivetrain, a frame, a picker robot, and a camera assembly. It should be appreciated that one or more features discussed in connection with a given example of a mobile robot may be employed in other examples of mobile robots according to the present disclosure, such that the various features disclosed herein may be readily combined in a given mobile robot according to the present disclosure (provided that respective features are not mutually inconsistent).

Certain dimensions and features of the mobile robot and/or a fulfillment center are described herein using the terms "approximately," "about," "substantially," and/or "similar." As used herein, the terms "approximately," "about," "substantially," and/or "similar" indicates that each of the described dimensions or features is not a strict boundary or parameter and does not exclude functionally similar variations therefrom. Unless context or the description indicates otherwise, the use of the terms "approximately," "about," "substantially," and/or "similar" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

1. EXAMPLES OF MOBILE PICKER APPARATUSES

In this section, several examples of a mobile picker apparatus are presented that can retrieve and hold multiple boxes (e.g., a source box, a destination box), pick an item from one box (e.g., a source box), place the item into another box (e.g., a destination box), and place the boxes into different areas of the environment (e.g., a shelf storing source boxes, a consolidation shelf storing destination boxes). The process of picking and placing an item can be facilitated, in part, by a picker robot with a robotic arm configured to move items between boxes. The mobile picker apparatus can further move items between boxes while the mobile picker apparatus is in motion or stationary. The mobile picker apparatuses disclosed herein are generally configured to hold one or more source boxes and one or more destination boxes.

It should be appreciated that one or more components and/or features of one mobile picker apparatus can be readily combined or substituted with one or more components and/or features of another mobile picker apparatus provided the combination or substitution does not result in mutually inconsistent features. It should also be understood that unless indicated otherwise, components of the additional/alternative apparatuses described herein can be structurally and/or functionally similar to similarly referenced and/or similarly named components. For example, the picker robots 325 and 425 shown below in FIGS. 3 and 4 can be structurally and/or functionally similar to the robot 125 shown in FIG. 1A, and so on.

1.1 An Example Mobile Picker Apparatus

Figure 1B:
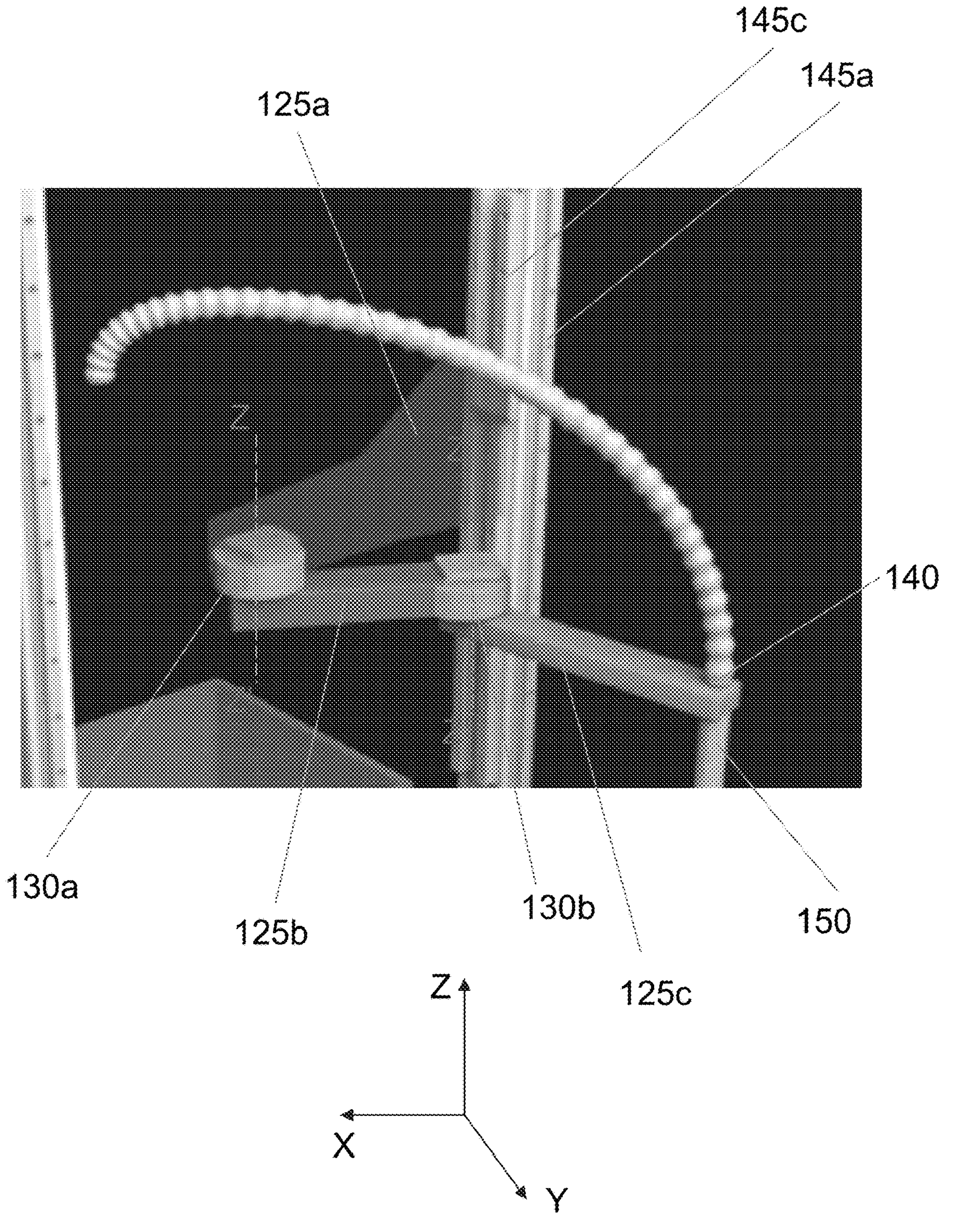
FIG. 1B shows a magnified view of the picker robot of the apparatus of FIG. 1A.

FIGS. 1A and 1B show an example mobile picker apparatus 100 that includes a body portion 105 (also sometimes referred to as a "chassis") that supports the various components of the apparatus 100. The body portion 105 can be formed of a durable material, such as steel. This includes, for example, a drivetrain (not shown) to provide mobility for the apparatus 100. For example, the drivetrain can include one or more motors (e.g., servo motors, not shown) to actuate a set of wheels (e.g., four wheels). The drivetrain of the apparatus 100 can also include one or more odometry sensors to measure the rotation of the wheels to detect the distance travelled by each wheel, which can thus provide a way to track the movement of the apparatus 100. The apparatus 100 can further include one or more 3D sensor(s) or cameras for safety (e.g., detection of obstacles) and/or mapping of the environment surrounding the apparatus 100. Also, the apparatus 100 can include a battery to provide power to the various components of the apparatus 100. For example, the apparatus 100 can include one or more proximity sensors such as, for example, a distance sensor that reports a distance of a nearby object (e.g., a shelf, a human operator, another apparatus 100) to a processor (described below) of the apparatus 100.

For some fulfillment centers, the setup of the warehouse can include one or more safety zones where the apparatus 100 is not permitted to enter. If the apparatus 100 attempts to enter a safety zone, the apparatus 100 can be configured to stop and reverse its direction of travel. This can be accomplished, for example, using one or more of the proximity sensors onboard the apparatus 100 to monitor the location of the apparatus 100 within the warehouse. The data acquired by the proximity sensor(s) can be processed by the onboard processor to determine whether the apparatus 100 is approaching and/or about to enter a safety zone. In another, one or multiple proximity sensors can be disposed at the boundaries of the safety zone. If a portion of the apparatus 100 passes the proximity sensor, the proximity sensor can be triggered to transmit a signal to the apparatus 100 to stop and reverse direction.

The apparatus 100 can further include one or more processors (also sometimes referred to as the picker processor(s)) and a memory/database. The memory/database can encompass, for example, a random access memory (RAM), a memory buffer, a hard drive, a database, an erasable programmable read-only memory (EPROM), an electrically erasable read-only memory (EEPROM), a read-only memory (ROM), Flash memory, and/or the like. The memory/database can store instructions to cause the one or more processors to execute processes and/or functions associated with the apparatus 100 and/or generally with a central system such as, for example digital map(s) to guide motion of the apparatus 100, configuration settings such as network addresses of the runner apparatus and/or other system components, and/or the like.

The one or more processors can each (independently) be any suitable processing device configured to run and/or execute a set of instructions or code associated with its apparatus 100 and/or the system. Each processor can be, for example, a general-purpose processor, a Field Programmable Gate Array (FPGA), an Application Specific Integrated Circuit (ASIC), a Digital Signal Processor (DSP), and/or the like. The processor(s) and memory/database can be included in a compute device, such as a desktop computer, a laptop computer, a tablet computer, and/or the like, associated with the apparatus 100. The processor can be further configured to provide an interface (e.g., an Application Programming Interface (API)) for communication with a master server of the system over a wired or wireless network (see master servers 1001 and 1101 in FIGS. 12A and 12B). During typical operation, the apparatus 100, can navigate and move safely around the warehouse using onboard sensors. The apparatus 100 can also receive commands (e.g., wirelessly, via a Wi-Fi network) from the master server to load/unload the boxes, move the boxes between the shelving area(s), move items between boxes, and/or the like.

The apparatus 100 further includes a frame 110 to support a set of platforms 115*a* and 115*b*. The set of platforms 115*a*, 115*b* can respectively hold and support boxes 120*a* (e.g., a source box) and 120*b* (e.g., a destination). As shown, the frame 110 can be coupled to the body portion 105. The frame 105 can include a set of frame arms 110*a* and 110*b* where at least one frame arm (e.g., frame arm 110*a*) includes a lift engine (e.g., a servo motor, not shown) and a belt (e.g., a rubber belt, not shown). The belt couples the lift engine to the platforms 115*a* and 115*b*. In this manner, the set of platforms 115*a* and 115*b* is movably coupled to the frame 105. The frame arms 110*a* and 110*b* can further include one or more tracks (e.g., the set of tracks 145*a* and 145*b*) to guide the movement of the set of platforms 115*a* and 115*b* along the frame arms 110*a* and 110*b*. Herein, the portion of the frame 110 that includes the lift engine is also sometimes referred to as a lift portion or a lift.

In some cases, instead of an engine and belt, any other suitable component(s) can be employed such as, but not limited to, a scissor lift, a pneumatic lift, and/or the like. While two platforms holding two boxes are illustrated and described here for simplicity, it is understood that the apparatus 100 can include additional platforms for holding additional boxes (see, for example, the mobile picker apparatus 400). During operation, each platform 115*a* and 115*b* of the apparatus 100 can be independently pre-designated to be a platform for holding a source box, a platform for holding a destination box, or both (i.e., being dynamically selected for holding one or the other). Similarly, each box 120*a* and 120*b* held by the apparatus 100 can be independently pre-designated to be a source box, a destination box, or both (i.e., being dynamically selected to be one or the other). As described above, the apparatus 100 can further include (e.g., for box 120*a*) a set of tracks 145*a* formed on the arms 110*a*, 110*b* to allow the box 120*a* (via the platform 115*a*) to independently and vertically translocate. Similarly, a set of tracks 145*b* (partially shown) can be formed on the arms 110*a*, 110*b* to allow the box 120*b* (via the platform 115*b*) to independently and vertically translocate. In some cases, the distance and/or extent of the translocation of each of the platforms 115*a* and 115*b* and, by extension, the boxes 120*a*, 120*b* can be the same, or different.

Each platform 115*a* and 115*b* can include a push-pull mechanism to facilitate the loading and unloading of the boxes 120*a* and 120*b* from their respective platforms. The push-pull mechanism can include, for example, a mechanical coupling mechanism that securely couples a box to the push-pull mechanism, which, in turn, allows the push-pull mechanism to move the box onto or off the platform. In one example, the mechanical coupling mechanism can be a set of suction cups 165 that attach to a box. The suction cups 165 can be further coupled to a pump (not shown) onboard the apparatus 100 that produces a vacuum at the suction cups 165 to securely couple a box to the push-pull mechanism.

It should be appreciated that the suction cups 165 and the pump is one non-limiting example. More generally, any suitable coupling mechanism can be used to securely couple a box to the push-pull mechanism such as, for example, a set of hooks that engage with corresponding rings on the box, an electromagnet mounted on the platform that can engage or disengage a magnet coupled to the box, and so on.

Generally, each box (e.g., the boxes 120*a* and 120*b*) can be stored on a shelf in the fulfillment center such that the longest dimension of the box is oriented along the depth of the shelf. This means the side of the box with a shorter dimension is used for loading and unloading (i.e., the side with the shorter dimension directly coupled to the push-pull mechanism). For example, FIG. 1A shows the box 120*a* can be loaded or unloaded along the A-A' direction (e.g., via the side of the box 120*a* with a shorter dimension along the B-B' direction). More generally, any side of the box, and correspondingly, another direction can be used to load and unload the boxes 120*a* and 120*b*. The apparatus 100, for example, can load a box along the B-B' direction (e.g. via the side of the box with a longer dimension along the A-A' direction). In some cases, a box can be loaded using both directions. This can be accomplished, for example, by each platform 115*a* and 115*b* including a rotational mechanism that allows a corresponding box to be loaded and unloaded along different directions. The rotational mechanism can further facilitate loading and unloading of boxes across a range of different angles other than the approximately 90° angle between the A-A' and the B-B' directions. In this manner, the apparatus 100 can readily accommodate spatial restrictions in the environment that can arise during loading and/or unloading.

For example, when loading a box onto a platform, the suction cups 165 of that platform (e.g., the platform 115*a*) can be mechanically coupled to the box (e.g., the box 120*a*) on a shelf via operation of the pump of the apparatus 100. Then, the push-pull mechanism can be activated to pull the box 120*a* onto the platform 115*a*. When unloading the box off the platform, the push-pull mechanism can be activated to push the box 120*a* off the platform 115*a* and onto a shelf. The suction cups 165 can remain activated to retain the box on the platform once it is loaded onto the platform. Alternatively, the suction cups 165 can be inactivated after the box is loaded onto the platform. The lift engine provides a way to move the platforms 115*a* and 115*b* to different heights to facilitate the loading and/or unloading of boxes onto shelves at different heights.

Herein, the apparatus 100 can be configured to use boxes of varying size, dimensions, and/or shapes. In one example, the box can be a plastic, non-collapsible, non-stackable Euro container (also referred to as a KLT box). The dimensions of the box can, be for example 40×30×22 cm (depth×width×height). The box can further include smooth walls with no holes. This can help, for example, the suction cups 165 of the push-pull mechanism form a better vacuum seal with the box to facilitate pulling of the box onto the platform.

Additionally, a fulfillment center can include various shelving and/or rack units to store the boxes that are retrieved and returned by the apparatus 100. For example, a shelf can have a depth of 40 cm, height of 25 cm, and width of 70 cm. In this manner, two KLT boxes of 30 cm depth can be placed on each shelf with some additional space to account for any impression during loading and unloading of the boxes.

FIGS. 1A and 1B further show the apparatus 100 can include a picker robot 125 to pick and move items between the boxes 120*a* and 120*b*. The picker robot 125 can be mounted on a track 145*c*, which in turn is coupled to the frame 110. In some cases, the picker robot 125 can be movably coupled to the frame 110 and the lift engine. The lift engine can thus move the picker robot 125 up and down along a vertical Z axis, as illustrated in FIG. 1B. Alternatively, a separate robot motor for the robot 125 can be used to change its height along the Z axis. The movement of the picker robot 125 can further be controlled by a processor of the apparatus 100. The picker robot 125 can be configured to, when the box 120*a* and/or the box 120*b* is in motion along their respective tracks 145*a*, 145*b*, to be generally disposed within a gap 161 between platforms 115*a* and 115*b*, to prevent collisions between the box(es) and the robot 125.

The picker robot 125 can include a robotic arm that is compliant and/or moves within a horizontal X-Y plane (e.g., translational movement along an X-axis, translational movement along a Y-axis, and rotation about a Z axis). The robotic arm can further move an end effector (e.g., a handle, a gripper) along the Z axis (e.g., using a linear actuator). Thus, the robotic arm shown in FIG. 1A can independently control up to four degrees of freedom. For example, the picker robot 125 can be a 4-axis articulated robotic arm, such as a SCARA (Selective Compliance Articulated Robot Arm) robot.

In one example, the robotic arm of the picker robot 125 can include a set of arms 125*a*-125*c*. In FIG. 1B, the robotic arm is shown to have three arms. More generally, the robotic arm can include more or fewer arms. As shown, a first joint 130*a* can mechanically couple the arms 125*a* and 125*b* and a second joint 130*b* can mechanically couple the arms 125*b* and 125*c*. The joints 130*a* and 130*b* can each define an axis Z-Z' that are parallel to each other as well as to the Z axis of the track 145*c*. The joints 130*a* and 130*b* can be configured to be rotary joints that permit up to full 360-degree relative rotation in the X-Y plane between their respective coupled arms while accounting for spatial limitations such as, for example, to avoid collisions with portions of the frame 110 and/or the track 145*c*.

In some cases, the arm 125*a* can be mounted to the track 145*c* in a manner that allows vertical movement up and down the track, but not in the X-Y plane, thus providing another axis of motion for the picker robot 125. The joint 130*a* can then permit rotary motion of the arm 125*b* about its ZZ' axis. The apparatus 100 can further include one or more joint motors (e.g., a gimbal motor) for controlling the joints 130*a*, 130*b*, with each joint motor in turn being controllable by the processor of the apparatus 100. With the joints 130*a* and 130*b* being configured in this manner, the loading on the joint motor(s) while the picker robot 125 is holding an item can be appreciably reduced or, in some instances, eliminated entirely, with the robot motor (or the lift engine) being subjected to the load instead. In this manner, the joint motors can be smaller, more nimble, and relatively cheaper than the robot motor (or lift engine).

It should be appreciated that the 4-axis robotic arm of the picker robot 125 described above is a non-limiting example. More generally, the mobile picker apparatuses described herein can include a picker robot with a multi-axis robotic arm capable of controlling four degrees of freedom, five degrees of freedom, or six degrees of freedom. For example, the picker robot can include a 4-axis robotic arm, a 5-axis robotic arm, or a 6-axis robotic arm. Compared to a 5-axis or a 6-axis robotic arm, the 4-axis robotic arm of the picker robot 125 described above is appreciably simpler and, thus, typically less expensive to implement. Nevertheless, it can be beneficial to include a robotic arm that provides more axes of motion and/or control over more degrees of freedom. For example, a 6-axis robotic arm that can rotate about the X axis and the Y axis of FIG. 1B (in addition to the four axes of motion described above with respect to the robotic arm of the picker robot 125) can execute more complex maneuvers to position and/or orient the gripper compared to a 4-axis robotic arm. These additional axes of motion, in turn, can be used to execute, for example, more complex trajectories for collision avoidance (see Section 1.1.1 for further details) and/or provide more flexibility to pick and place items in different orientations (e.g., stack picked items in a particular arrangement in the destination box).

In one example, a 5-axis robotic arm can include the arms 125*a*-125*c* and the joints 130*a* and 130*b* described above with the addition of a third rotary joint coupled to the joint 130*a*. The third rotary joint can rotate about an axis parallel to the X-Y plane. As an illustrative non-limiting example, the third rotary joint can be oriented to rotate about the X axis. Thus, the example 5-axis robotic arm can provide translational movement of an end effector along the X, Y, and Z axes and rotational movement about the X axis and the Z axis. In another example, a 6-axis robotic arm can include the arms 125*a*-125*c*, the joints 130*a* and 130*b*, and the third rotary joint described in the preceding example of a 5-axis robotic arm with the addition of a fourth rotary joint coupled to the third rotary joint that rotates about an axis parallel to the X-Y plane and perpendicular to the rotation axis of the third rotary joint. For example, the third rotary joint can rotate about the X axis and the fourth rotary joint can rotate about the Y axis. Thus, the example 6-axis robotic arm can provide translational movement and rotational movement along and about the X, Y, and Z axes.

It should also be appreciated that while the picker robot 125 and, in particular, the robotic arm can be designed as bespoke components, off-the-shelf robotic systems can also be readily used in the mobile picker apparatuses described herein. In particular, off-the-shelf articulated robotic arms can be readily used to form the picker robot 125. For example, an off-the-shelf SCARA robotic arm can be mounted to the frame 110 and modified to include the desired end effector (e.g., a gripper with sufficient reach to pick items) to pick and place items for order fulfillment. In another example, an off-the-shelf 6-axis robotic arm (e.g., ABB IRB 1010, Mecademic Meca500) can be integrated in a similar manner, e.g., by mounting the robotic arm to the frame 110 and modified to include the desired end effector pick and place items. In some cases, an off-the-shelf robotic arm can include an end effector configured for item picking, such as a suction cup and a pump that provides vacuum suction at the suction cup, as described in further detail below.

The picker robot 125 can further include an end effector coupled to the robotic arm. For example, the end effector can be a handle, opening, and/or any suitable mechanism 140 (referred to hereon as a handle for simplicity) formed with or coupled to the terminal arm 125*c* for securely holding and/or being coupled to a gripping mechanism/gripper 150. During operation, the picker robot 125 can be configured to position the gripper 150 over a desired target item in the source box (e.g., the box 120*a*) by a combination of vertical movement up and/or down the track 145*c* via operation of the robot motor (or the lift engine), and horizontal movement of the arms 125*a*-125*c* via operation of the joint motor(s), lower the gripper 150 to permit the gripper to engage with the item, raise the gripper 150 to pick up the item (e.g., by action of the robot motor/lift engine), move the item over a desired drop location in the destination box (e.g., the box 120*b*, via operation of the joint motor(s)), then (optionally) lower the gripper 150 to a desired height so that the gripper can release the item into the box 120*b*. In some cases, the picker robot 125 can optionally include its own controller/processor (also sometimes referred to as a robot controller) to control operation of the picker robot. Generally, a controller of the picker robot 125 can be useful for features such as, but not limited to, generating direct current to power the robot motor and/or the joint motor(s) of the robotic arm, execute a manufacturer's operating system, implement safety controls, provide the functionality associated with a robotic pendant of the picker robot, and/or the like.

The gripper 150 can include or be coupled to a suction cup configured to manipulate items, such as to pick, transfer, and/or place items. For example, the gripper 150 can include suction tubing that is securely held and manipulated by the handle 140 with the tubing being coupled to the suction cup at one end and a pump at the other end. As an example, the suction cup have a diameter ranging from approximately 0.5 cm to approximately 15 cm, including all values and sub-ranges in between. The term "approximately," when used to describe the diameter of the suction cup on the gripper 150, is intended to cover variations due to manufacture. For example, "about 1 cm" can correspond to the following ranges: 0.99 to 1.01 cm (+/−1% variability), 0.98 to 1.02 cm (+/−2% variability), 0.97 to 1.03 cm (+/−3% variability), 0.96 to 1.04 cm (+/−4% variability), 0.95 to 1.05 cm (+/−5% variability), including all values and sub-ranges in between.

In some cases, the gripper 150 can include a linear or 2-dimensional array of suction cups of varying sizes according to the dimensional ranges recited above. The gripper 150 or the suction cup coupled to the gripper 150 can be oriented at different angles so that items can be picked form different directions. In cases where the apparatus 100 includes multiple picker robots 125, as described below, each picker robot can include a gripper 150 with a suction cup that is the same size or a different size than the other gripper(s) and/or have the same or different number of suction cups than the other gripper(s). It is understood that any suitable gripping mechanism and/or gripper can be employed in addition to or alternatively to a suction cup such as, for example, a two-finger gripper, or multiple-finger gripper, and/or a combined gripper (e.g., suction cup combined with two fingers). In some cases, the apparatus 100 can include a robotic tool exchanger to automatically exchange different types and/or sizes of the gripper and/or suction cup without manual intervention. The robotic tool exchanger can be disposed onboard the apparatus 100 and provide a way for the picker robot 125 to change the gripper 150 to suit a particular item.

The apparatus 100 can further include a pressure meter and a pump fluidly coupled to the suction cup to manipulate the suction force applied to the suction cup. In some cases, in addition or alternative to the pressure meter, a flow sensor or flow meter can be employed to measure flow rate. The pump can be any suitable device such as, for example, a capture pump (e.g., a cryopump, a sputter ion pump, etc.), a transfer pump, a kinetic pump (e.g., a turbomolecular pump, a vapor diffusion pump, etc.), a positive displacement pump (e.g., an oil sealed rotary vane pump, a liquid ring pump, a diaphragm pump, a scroll pump, a roots style pump, a claw pump, a screw pump, etc.), a venturi device, an industrial blower, and/or the like. In another example, the pump can include an industrial vacuum generator connected to a compressed air supply by a Venturi tube (e.g., Festo OVEM-14-H-B-GO-CE-N-2P).

The pressure meter can measure relative vacuum pressure, i.e., negative pressure compared to ambient or atmospheric pressure. The pressure meter can further have a configurable pressure threshold, which can be fixed during operation and configured to return a binary value (e.g., to a processor of the apparatus 100, to the master server, and/or the like). The binary value can indicate whether the measured pressure exceeds the pressure threshold or not and/or whether the suction cup is holding an item or not. This approach can be useful for picking one or a few kinds of items with similar surfaces. In some cases, the pressure meter can dynamically report the measured pressure in real time to the processor of the apparatus 100 and/or the master server, which can then compare the measured pressure against a predetermined threshold specific for the item being picked to determine whether a pick has been successfully made. For example, when picking porous items, such as socks, the pressure threshold can be set to permit some leakage and/or loss of suction. In another example, when picking items with a solid plastic surface, the pressure threshold can be set to permit little or no leakage, since any leakage would indicate that the item has not been properly attached.

Overall, the picker robot 125 can have a load bearing capacity of about 5 kg or less, about 5 kg, about 8 kg, or about 10 kg or more, including all values and sub-ranges in between. The term "about," when used to describe the weight of the picker robot 125, is intended to cover variations due to manufacture and assembly. For example, "about 5 kg" can correspond to the following ranges: 4.95 to 5.05 kg (+/−1% variability), 4.9 to 5.1 kg (+/−2% variability), 4.85 to 5.15 kg (+/−3% variability), 4.8 to 5.2 kg (+/−4% variability), 4.75 to 5.25 kg (+/−5% variability), including all values and sub-ranges in between.

The apparatus 100 can also include multiple picker robots, such as a dual-robot assembly with two picker robots. The dual-robot assembly can be mounted on the track 145*c* or on separate tracks. The inclusion of multiple picker robots can improve picking speed. For example, one picker robot can be configured to pick relatively smaller and/or lighter items and another picker robot can be configured to pick relatively larger and/or heavier items.

The mobile picker apparatus 100 can further include one or more cameras 160 for item identification, tracking, and so on. The camera(s) can include, for example, a scanning device, 3-dimensional (3D) camera(s) stereoscopic camera (s), conventional cameras (e.g., including at least an aperture and a film or digital sensor) that can be in greyscale or color. In some cases, the camera(s) include at least one conventional camera configured to detect the texture of the item to be manipulated. In some cases, the camera(s) include at least one 3D camera capable of detecting the texture of the item by generating a point cloud. The camera(s) can be communicably coupled to the processor of the apparatus 100 for control of operation thereof. In some cases, the camera setup can be generally as that disclosed in U.S. Pat. No. 10,965,891 (e.g., at least in FIGS. 28 and 29 of the '891 patent), the entire disclosure of which is incorporated by reference herein.

As shown in FIG. 1A, one or more of the cameras (e.g., the camera 160) can be physically mounted on the apparatus 100, such as on a top bar 110*c* of the frame 110 in a location with an unobstructed view of the contents of the boxes 120*a* and 120*b* for at least some portion of the time during operation. For example, the apparatus 100 can be configured such that the camera 160 has an unobstructed view of the content of a source box (without the picker robot 125 obstructing its view) to permit decision making with regard to the item(s) to be picked and their location within the source box.

1.1.1 An Example Operation of the Picker Robot

As described above, the picker robot 125 of the mobile picker apparatus 100 can generally facilitate the picking of an item from a source box and placing the item into a destination box, for example, when fulfilling an order. In this section, an example operation of how the picker robot 125 can be used to pick an item from the box 120*a* containing multiple items is described. First, the apparatus 100 can receive a command from a master server to move an item from the box 120*a* to the box 120*b* for purposes of order fulfilment. The processor of the apparatus 100 (also sometimes referred to as a picker processor) can be configured to receive the command, execute it, and provide feedback (e.g., an indication of success, failure, other details, and/or the like) back to the master server.

Once the command is received, the picker processor can be further configured to plan a trajectory for the picker robot 125 that is collision-free. In particular, a trajectory can be generated such that any portion of the robotic arm, the suction cup 165, and (once picked) the picked item does not strike or bump into other objects, such as other portions of the apparatus 100 (e.g., the frame 110), the sides of the boxes 120*a* and 120*b*, and/or the like. The trajectory for the picker robot 125 can be generated in several ways. In some cases, the picker processor can generate a random potential trajectory for the picker robot 125, beginning in the start position (e.g., over an item to be picked from a source box), and ending in the desired position (e.g., a destination box).

For example, approaches based on "motion primitives"—short, kinematically feasible, motions—can be employed to generate one or more trajectories. Approaches based on motion primitives first discretize the space, then create motion primitives between neighboring points, and then perform a graph search to find a path between a start point and an end point.

In another example, the picker processor can employ a stochastic trajectory optimization framework known as STOMP (Stochastic trajectory optimization for motion planning), as briefly described herein. STOMP generates noisy trajectories to explore the space around an initial (possibly infeasible) trajectory, and these trajectories are then combined to produce an updated trajectory with lower cost. A cost function based on a combination of obstacle and smoothness cost can be optimized in each iteration. No gradient information may be required by optimization algorithm employed, so general costs for which derivatives may not be available (e.g., costs corresponding to constraints and motor torques) can be included in the cost function. The stochastic nature of STOMP can allow it to overcome local minima that gradient-based methods like CHOMP can get stuck in.

In another example, CHOMP (Covariant Hamiltonian optimization for motion planning) can be employed. Briefly, CHOMP capitalizes on covariant gradient and functional gradient approaches at the optimization stage to design a motion planning algorithm based entirely on trajectory optimization. Given an infeasible naïve trajectory, CHOMP reacts to the surrounding environment to pull the trajectory out of collision while simultaneously optimizing dynamical quantities such as joint velocities and accelerations. It can rapidly converge to a smooth collision-free trajectory.

In another example, a man-in-the-middle approach can be used for trajectory planning. As an illustrative example, assume the trajectory includes motion between points A and B. A midpoint C is chosen somewhere between the A and B, and recursively, AC and CB trajectories are generated. If at least one of the trajectories AC and CB cannot be successfully generated (e.g., is not collision free), the point C is moved farther away from the midpoint between A and B, and the process is repeated till both AC and CB can be successfully generated.

The generated trajectory is then checked to be collision free using mathematical calculations in a simulated environment around the picker robot 125 such as, for example, a cube-shaped space defined by or based on how far the picker robot 125 can reach. The reach of the picker robot 125 can generally be about 0.25 m, about 0.5 m, about 1 m, about 1.5 m, about 2 m or more, including all values and sub-ranges in between. The term "about," when used to describe the reach of the picker robot 125, is intended to cover variations and/or tolerances due to manufacture and assembly. For example, "about 1 m" can correspond to the following ranges: 0.99 to 1.01 m (+/−1% variability), 0.98 to 1.02 m (+/−2% variability), 0.97 to 1.03 m (+/−3% variability), 0.96 to 1.04 m (+/−4% variability), 0.95 to 1.05 m (+/−5% variability), including all values and sub-ranges in between.

The trajectory in the simulated environment can be finely divided into many points with a predetermined step size (e.g., 0.1 mm or even less). Then, each of these points in the trajectory can be checked to determine whether the model of the picker robot 125 (e.g., represented as a polyhedron, or set of polyhedrons) at that point of the trajectory collides with the simulated environment. The simulated environment can be scanned to include an arrangement of items corresponding to the items in a source box or initialized with pre-defined objects in the simulated environment. The process of checking whether a collision will occur can be accomplished by checking whether the polyhedron(s) representing the picker robot 125 geometrically intersect with other objects (e.g., also represented as polyhedrons) or with points of the 3D point cloud. If a (possible) collision is found, the trajectory is rejected and another one is generated. This process can repeat until a trajectory is found that will result in no collisions.

Multiple trajectories can be simultaneously generated and evaluated via any approach described herein and a single trajectory can be selected according to various criteria. For example, the shortest, collision-free trajectory can be selected for execution by the picker robot 125 to reduce motion time. In another example, the first trajectory found to be collision free can be selected for motion of the picker robot 125 in order to save analysis time. In yet another example, trajectories can be generated for each item of a set of pickable items, and a confidence value can be associated with each trajectory indicating a likelihood of success of picking and/or placing that item. The trajectory with the high confidence value, and its corresponding item, can then be selected. The multiple trajectories generated can include, for example, a first set of trajectories for picking an item and a second set of trajectories for placing the item, as disclosed herein. Alternatively, a single set of trajectories, encompassing both the picking and placing of an item, can be generated and evaluated as described herein.

To pick an item, the picker processor can employ/execute any suitable non-machine-learning (non-ML) based approach to recognize the items to be picked such as, for example, geometric analysis of the surface of the item to identify an attachment point. In some cases, the picker processor can employ/execute a suitable ML approach, such as a convolutional neural network (CNN). For example, an instance segmentation network can be used to recognize multiple instances of the items to be picked, such as from a bin holding multiple items. Of the multiple items, a single item can be selected for picking. For example, the item selected can be associated with a selected trajectory having the highest confidence value as described herein. In another example, all items associated with trajectories having a confidence value greater than a predetermined threshold are selectable, and the item among these that is first identified is then selected for picking and placing.

Thereafter, a geometric center of the item can be estimated (e.g., as a pseudo indicator of a center of gravity) to select the pick point. For example, the geometric center of the smoothest area of the object/item can be estimated and selected as the pick point. In another example, a neural network is used to (directly) choose points in areas where the gripper is expected to attach successfully, without recognizing specific instances of the objects. In another example, a CNN is employed. Instead of recognizing the items, the CNN can evaluate a depth map and generate a surface "fitness" value for each point in the map, in order to identify points where it is possible or best to attach to the item based on the fitness values. In cases where the suction cup of the gripper 150 is oblong or elliptical in profile, the neural network can also determine a desired orientation of the suction cup when picking an object, e.g., to align the longer axis of the suction cup with a longer dimension of the item to be picked.

Generally, the picker robot 125 can be configured to use multiple, different approaches for different items. The approach to be used for a particular item can be pre-defined in an initial configuration/setup of the picker processor, or can be dynamically defined when that specific item is introduced to the fulfillment center and/or otherwise added to an inventory managed by the warehouse. The different approaches described herein can also be cycled such as, for example, when an unsuccessful pick attempt occurs with one approach, the picker processor communicates with the picker robot 125 to use another approach.

Once a particular approach is selected, the picker processor is further configured to manipulate the picker robot 125 such that the gripper 150 is placed above the item and the pump is activated, resulting in the item being picked by the gripper 150. Then the picker processor is further configured to manipulate the picker robot 125 (e.g., by raising or lowering its position on the track 145*c*, by engaging the joint motor(s), etc.) to move the item along a collision-free path to a location above where the item is to be placed. Then, the vacuum suction at the gripper 150 is released (e.g., by deactivating the pump) with an (optional) ejection of air to separate the item from the gripper 150. During the process of picking and moving, the picker processor can monitor the pressure in the suction cup, for example, by measuring the pressure directly in the suction cup, measuring the pressure within the pump as an indicator of the pressure in the suction cup, reading a line pressure from a pressure meter, and/or the like. According to the measured pressure, the picker processor can determine whether the item is attached firmly, is not attached, or is attached only loosely. If it is determined that the item is not attached (e.g., the item did not attach, or was lost during movement) or is not firmly attached, the process of picking can be repeated a) by attempting to pick the same item again, or b) by attempting to pick another item (e.g., another item identical to the previous item) from the same box.

In situations when there is continued failure (e.g., five or more failures) to pick up the item and/or another item identical to that item, the picker processor is further configured to employ other approaches. For example, the picker processor can, via control of the picker robot 125, push or poke the items in the box to change their different position and/or orientation to make picking items possible and/or more efficient. In another example, the picker processor can be configured to pause operation and then generate and exhibit (or transmit to the master server) a notification (e.g., an audio notification via an onboard speaker, and/or a visual notification via an onboard display, such as the interface 660) to seek assistance from a remote or on-site human operator to manually select the desired pick point on an item. In yet another example, the picker processor can be configured to pause operation and then generate and request for manual intervention to pick the item. For example, the apparatus 100 can move to a predetermined area in the fulfillment center with personnel who can manually pick the item. In yet another example, the picker processor can be configured to stop picking items from that box and thereafter mark or indicate the box as problematic and/or not to be picked from and return that box to the shelf or another area of the fulfillment center for manual inspection. In yet another example, the picker processor can be configured to then load a new box, and then pick the item from the new box.

In another example, the apparatus 100 can receive a command from the master server to move an item from the box 120*a* to the box 120*b*, which can be carried out as shown in FIGS. 2A-2D. Upon receipt of the command, the apparatus 100 can acquire texture frame/information and point cloud information from its camera 160, feed the point cloud data (e.g., in a form of a depth map) and texture information to a neural network that can recognize potentially multiple instances of the item to be picked. The location(s) of the found items are then evaluated, for example, by checking whether they are accessible by the gripper 150 and the picker robot 125 without any collisions, as determined by calculating and identifying a trajectory for the picker robot 125 to reach that position without collision with other objects and/or its environment. Multiple grasping points and multiple positions of the gripper 150 can be used for a single item while searching for a collision-free trajectory. The item for which a trajectory is calculated first, or the item that appears more advantageous or the least-risky (such as having the highest precision value reported by the neural network) is selected for the picking.

The picker robot 125 then executes the trajectory, for example, as depicted in FIGS. 2A-2D. First, FIG. 2A shows the picker robot 125 can change its vertical position to be relatively higher on the track 145*c*, and to then move the arms 125*a*-125*c* so that the gripper 150 at or near the end of the arm 125*c* is at the desired gripping position over or near the item. Then, FIG. 2B shows the picker robot 125 can continue to execute the trajectory by changing its vertical position to be relatively lower on the track 145*c*, within a desired distance from the item or in physical contact with the item, for the vacuum suction at the suction cup 165 to be effective in picking up the item. At a time or shortly before the time the gripper 150 reaches this desired gripping position, the gripper is activated, i.e., the pump is activated to generate vacuum suction at the suction cup 165. The picker robot 125 can then move vertically back up the track 145*c* (e.g., to a position similar to that shown in FIG. 2A), so that the gripper 150 and/or the picked item does not hit the edges of the box 120*a* when moving the item over to the box 120*b*. FIG. 2C shows the picker robot 125 at a relatively higher position on the track 145*c* and, after engagement of the joint motors, the gripper being positioned over the box 120*b*. Thereafter, FIG. 2D shows the picker robot 125 can then move down the track 145*c* to a desired placement location for releasing the item in the box 120*b*. After reaching the desired placement position, the item is released, e.g., by turning off the pump. Optionally, this can be followed by a short air pulse to ensure ejection of the item from the gripper 150.

Once the picker robot 125 completes the process of picking an item, the picker robot 125 can return to a predetermined default/home position, and the result of the picking can then be reported as a success to the master server. In case of an error, e.g., the item is released prematurely, no suitable objects to be picked are found, or no trajectories are found, an error can be reported to the master server. As described herein, different strategies of grasping can be used for items, such as modulating the speed of movement of the robotic arm (during or after grasping), manipulating the picker robot 125 to gently push or poke the items (especially in case of previous error) to change their position and/or orientation, and/or the like.

The apparatus 100 disclosed herein can also be used to automate batch picking, which closely resembles a manual picking operation. The picking can happen 'on-site', i.e., on the mobile picker apparatus itself, which means that the picking can commence as quickly as the source box required for a specific picking operation is loaded onto the apparatus 100, and can even continue while the apparatus 100 is in motion.

Generally, multiple apparatuses 100 can be readily deployed in a fulfillment center. Additionally, the apparatus 100 can be deployed in fulfillment centers that also include a stationary picker apparatus. These aspects can guard against a single point of failure in the fulfillment center, since multiple options for picking are available. Examples of a stationary picker apparatus can be found in U.S. Provisional Application No. 63/238,470 (hereafter referred to as the '470 application), filed Aug. 30, 2021 and entitled, "SYSTEMS, APPARATUSES, AND METHODS FOR WAREHOUSE OPERATION AND AUTOMATIC ORDER FULFILLMENT", the entire disclosure of which is incorporated herein by reference.

In yet another example of a typical operation that can be executed by the apparatus 100, the apparatus 100 can load a source box (e.g., the box 120*a*) based on an order received from the master server, and pick one or more items from the source box into a destination box (e.g., the box 120*b*). The apparatus 100 can then place the source box back on a shelf of the fulfillment center and move to the location of another source box that contains items for the order. The foregoing process can then be repeated until all the items are picked for the order. In some cases, when human/manual assistance is needed to pick an item (e.g., a bulky item, an item that is difficult to attach to the gripper 150), the apparatus 100, after loading the requisite source box, can move to the nearest or desired human picker (e.g., at a predetermined picking location within the fulfillment center), where the item can be manually picked from the source box to the destination box. Once the order in the destination box is complete, the apparatus 100 can move the destination box to a predetermined location/shelf (e.g., the consolidation shelves 1030*a* and 1030*b* in FIG. 12A), or to a human processor, for further processing.

1.2 An Example Mobile Picker Apparatus with a Single Frame Arm

Figure 3:
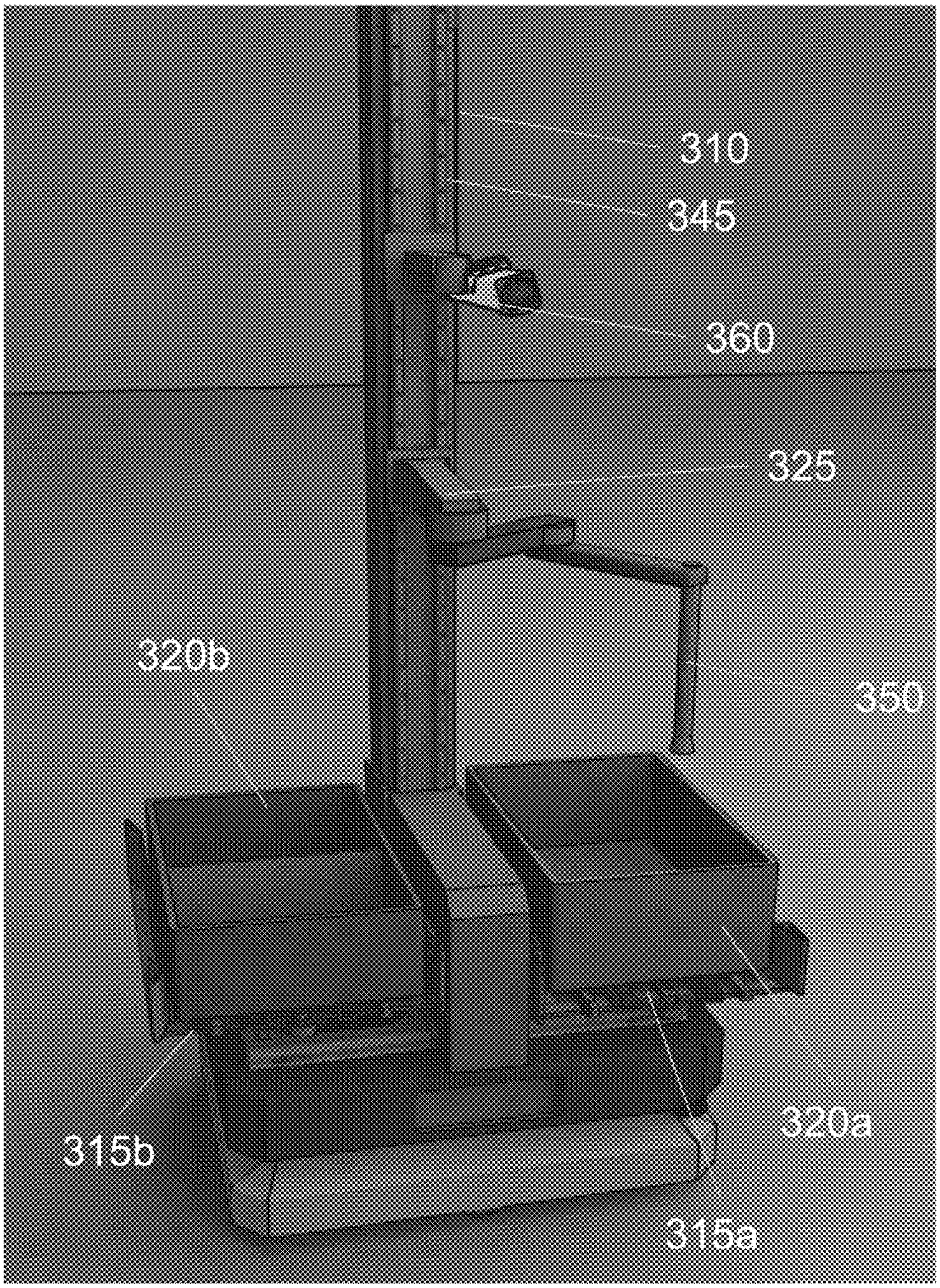
FIG. 3 shows another example mobile picker apparatus with a single frame arm.

FIG. 3 shows another example mobile picker apparatus 300 with a picker robot 325 and a camera 360 both mounted on the same track 345. The apparatus 300 may include several of the same features, components, and/or subsystems as the apparatus 100. The apparatus 300 can further operate in a similar manner to the apparatus 100, unless indicated otherwise. For brevity, repeated discussions of these features may not be provided below.

The picker robot 325 can be used to pick and place items between a source box 320*a* and a destination box 320*b* supported, respectively, by platforms 315*a* and 315*b*, similar to the apparatus 100 shown in FIGS. 1A and 1B. The camera 360 can be mounted to the track 345 in several ways. In one example, the camera 360 can be fixedly coupled to the track 345 (e.g., bolted into place), such that the vertical position of the camera 360 along the track 345 remains fixed during operation. In another example, the camera 360 can be movably coupled to the track 345 such that, similar to the picker robot 325, it can translocate up and down along the track 345 during operation. In this manner, the vertical position of the camera 360 can be dynamically changed during operation for reasons such as, but not limited to, accommodating the vertical translocation of the robot 325 and improving the view of the camera 360 of the box 320*a* and/or the box 320*b* such that it is not substantially impeded, or is not impeded beyond some predetermined degree. Another benefit of having a movable camera 360 is the ability to combine point clouds (described above) from multiple views to generate a more complete 3D image and/or render of items in the box(es). The positioning of the camera 360 can be controlled by a separate motor (not shown), which, in turn, can be controlled by the picker processor.

The apparatus 300 also includes a single frame arm 310 compared to the two frame arms 110*a* and 110*b* of the apparatus 100. Herein, a frame arm can be a unitary component or an assembly of components that functions as a single structural element onto which other components may be mounted, such as the platforms 315*a* and 315*b*, the picker robot 325, and/or the camera 360. This can simplify the design of the apparatus 300 and, in turn, reduce material cost and/or simplify the computation of a trajectory for the picker robot 325. For example, the inclusion of only a single frame arm 310 imposes fewer constraints on the picker robot 325 since the motion of the picker robot 325 does not have to account for an opposing frame arm (e.g., opposite to the frame arm the picker robot 325 is coupled to). Additionally, the picker robot 325 can be configured to have a larger length and/or reach.

Figure 4A:
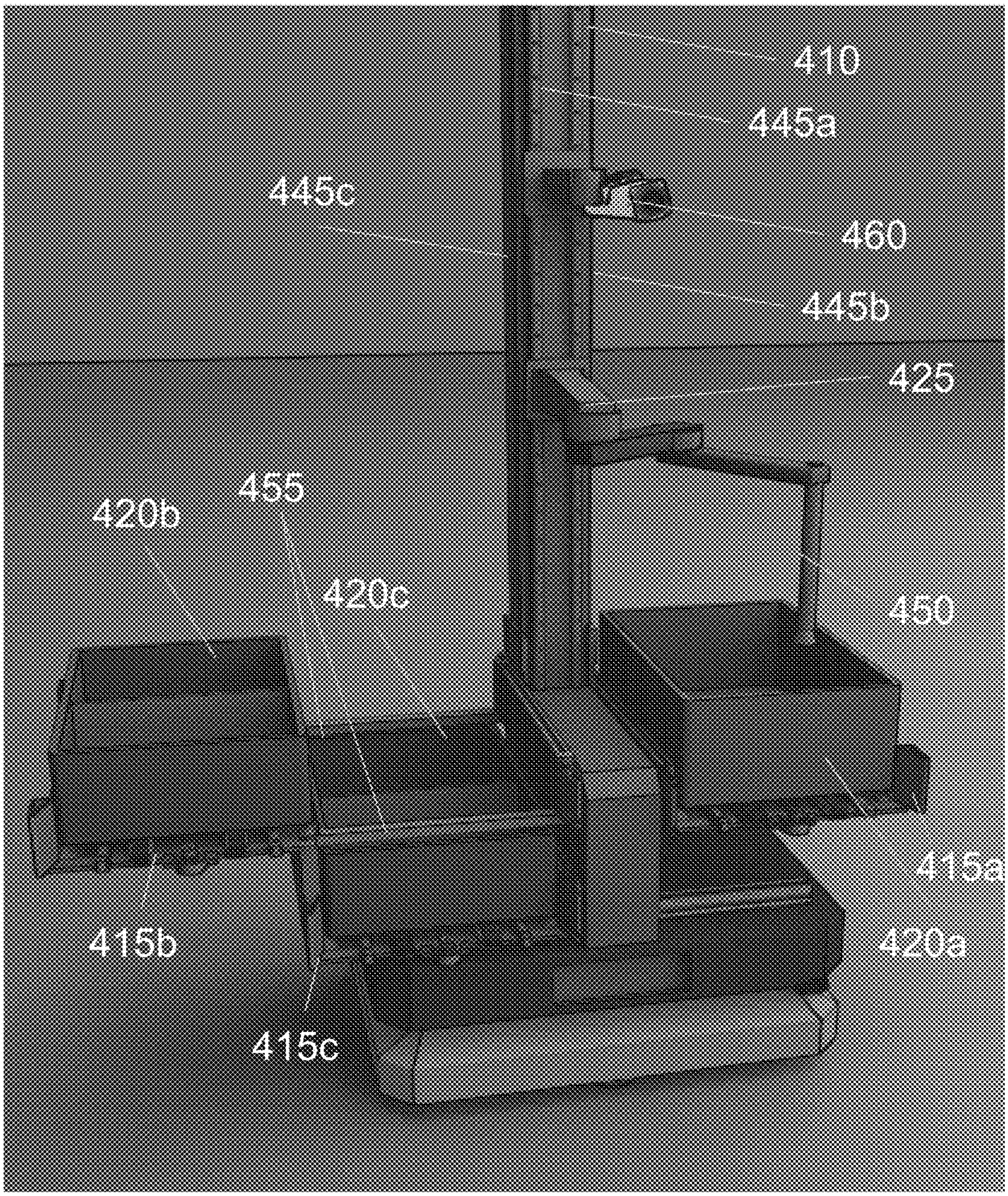
FIG. 4A shows another example mobile picker apparatus with a single frame arm and two destination boxes. An upper destination box is shown slid outwards to permit access to a lower destination box.
Figure 4B:
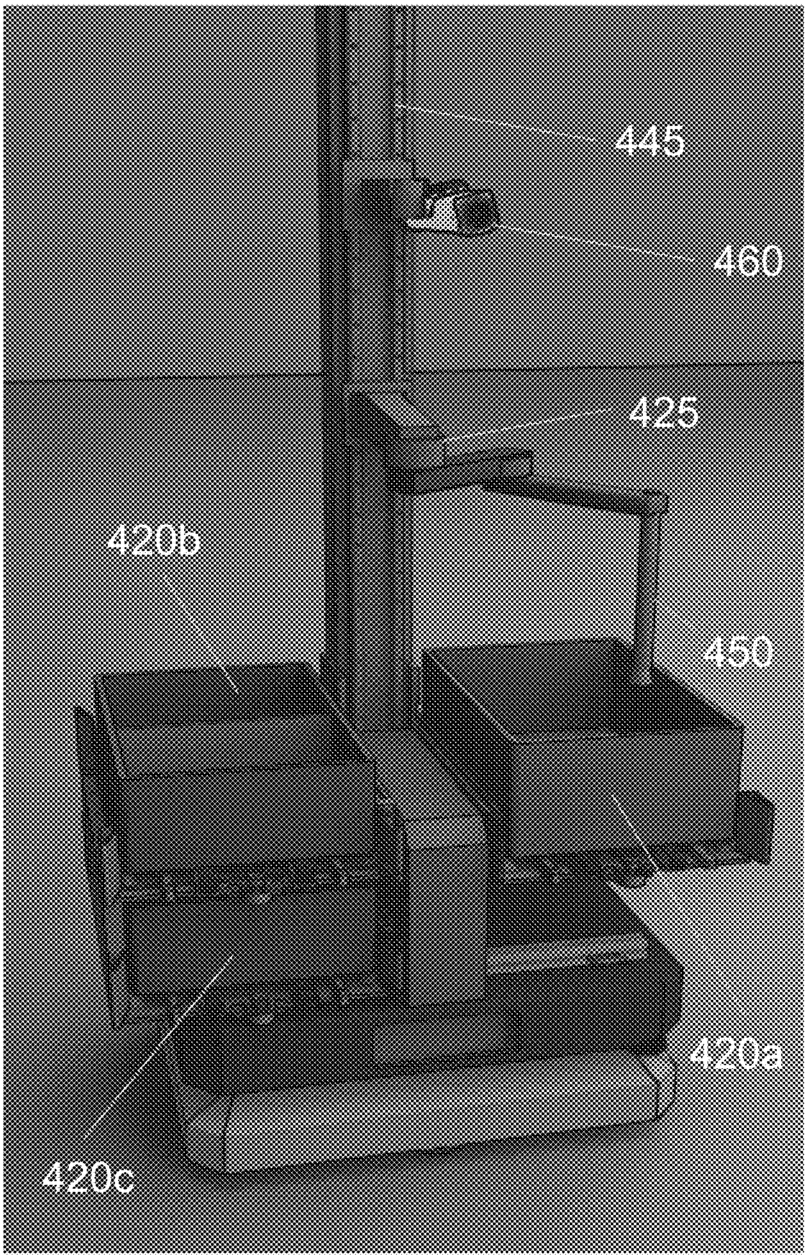
FIG. 4B shows the apparatus of FIG. 4A with the upper and lower destination boxes vertically stacked.

1.3 An Example Mobile Picker Apparatus Supporting Multiple Destination Boxes FIGS. 4A and 4B show another example mobile picker apparatus 400 with a picker robot 425 and a camera 460 both mounted on the same track 445*a*. The apparatus 400 may include several of the same features, components, and/or subsystems as the apparatuses 100 and 300. The apparatus 400 can further operate in a similar manner to the apparatuses 100 and 300, unless indicated otherwise. For brevity, repeated discussions of these features may not be provided below.

In this example, the apparatus 400 can support a source box 420*a* and two destination boxes 420*b* and 420*c*. It should be noted that herein, the 'source' and 'destination' designations of these boxes can be interchangeable. As shown, the apparatus 400 includes a platform 415*a* to support the box 420*a*, which can be used to manipulate the box 420*a* for loading, unloading, and/or the like as described above for the platforms 115*a* and 115*b* of the apparatus 100. The apparatus 400 can further include platforms 415*b* and 415*c* to support the boxes 420*b* and 420*c*, respectively. As shown in FIGS. 4A and 4B, the platforms 415*b* and 415*c* can be vertically disposed above one another such that the boxes 420*b* and 420*c* are stacked at two different heights. Each of the platforms 415*b* and 415*c* can be used to manipulate the boxes 420*a* and 420*b*, respectively, for loading, unloading, and/or the like. Each of the platforms 415*b* and 415*c* can be further mechanically coupled to a frame arm 410.

As shown in FIG. 4A, the frame arm 410 can include a track 445*b* along which the platform 415*a* can vertically translocate, e.g., for loading or unloading the box 420*a*. Similarly, the frame arm 410 can include a track 445*c* along which the platforms 415*b* and 415*c* can vertically translocate, e.g., for loading or unloading of the boxes 420*b* and 420*c*. Each of the platforms 415*a*-415*c* can be operably coupled to separate motors to provide independent operation of each platform and the picker processor. As described above for the picker robot 125, the picker robot 425 can be configured to be moved and/or positioned such that it avoids collisions with the boxes 420*a*, 420*b*, 420*c* as they vertically translocate on the frame arm 410 via their respective tracks.

Further, the platform 415*b* can be configured to move from a first position where the platform 415*b* is located directly above the platform 415*c*, resulting in the boxes 420*b* and 420*c* being vertically stacked (see FIG. 4B) and preventing the picker robot 425 from accessing the box 420*c*, to a second position where the box 420*b* is moved away from the frame arm 410 such that the picker robot 425 has partial or substantially full access to the box 420*c* for picking (see FIG. 4A). The movement of the platform 415*b* from the first position to the second position (and vice-versa) can be accomplished by incorporating a sliding mechanism 455 in the platform 415*b* to controllably roll or move the box 420*b*. For example, the sliding mechanism 455 can include tracks (e.g., telescoping tracks) and/or a smooth gliding surface.

Alternatively or in addition to, the platform 415*c* can include a sliding mechanism (e.g., the sliding mechanism 455) to move the box 420*c* from a first position (e.g., the position shown in FIG. 4B) to a second position where the box 420*c* is moved away from the frame arm 410 in the manner shown for the box 420*b* in FIG. 4A, such that the picker robot 425 has partial or substantially full access to the box 420*c* for picking. The incorporation of a sliding mechanism provides a way for picking to be carried out between all the boxes 420*a*-420*c* at the same time. For example, items can be picked from the box 420*a* and placed in both boxes 420*b* and 420*c*.

Although not shown, it should be appreciated that the apparatus 400 can include two or more platforms disposed on the same side as the platform 415*a* supporting two or more boxes from which the picker robot 425 can access for picking or placement of items. More generally, any suitable number of platforms can be disposed on either side of the frame arm 410 with each platform supporting a box. Each platform can be independently movable both up and down the frame arm 410 and movable sideways towards and away from the frame arm 410. In some cases, picking can also be done only between the boxes 420*b* and 420*c* by the picker robot 425, which can reduce the picking time/cycle due to the relatively shorter distance that the robot 425 should travel to move items between the boxes 420*b* and 420*c*.

1.4 an Example Mobile Picker Apparatus that Includes a Camera Assembly with a Locking Mechanism FIGS. 5A-5G show several views of another example mobile picker apparatus 900. The apparatus 900 may include several of the same features, components, and/or subsystems as the apparatuses 100, 300, and 400. The apparatus 900 can further operate in a similar manner to the apparatuses 100, 300, and 400, unless indicated otherwise. For brevity, repeated discussions of these features may not be provided below.

Figure 5A:
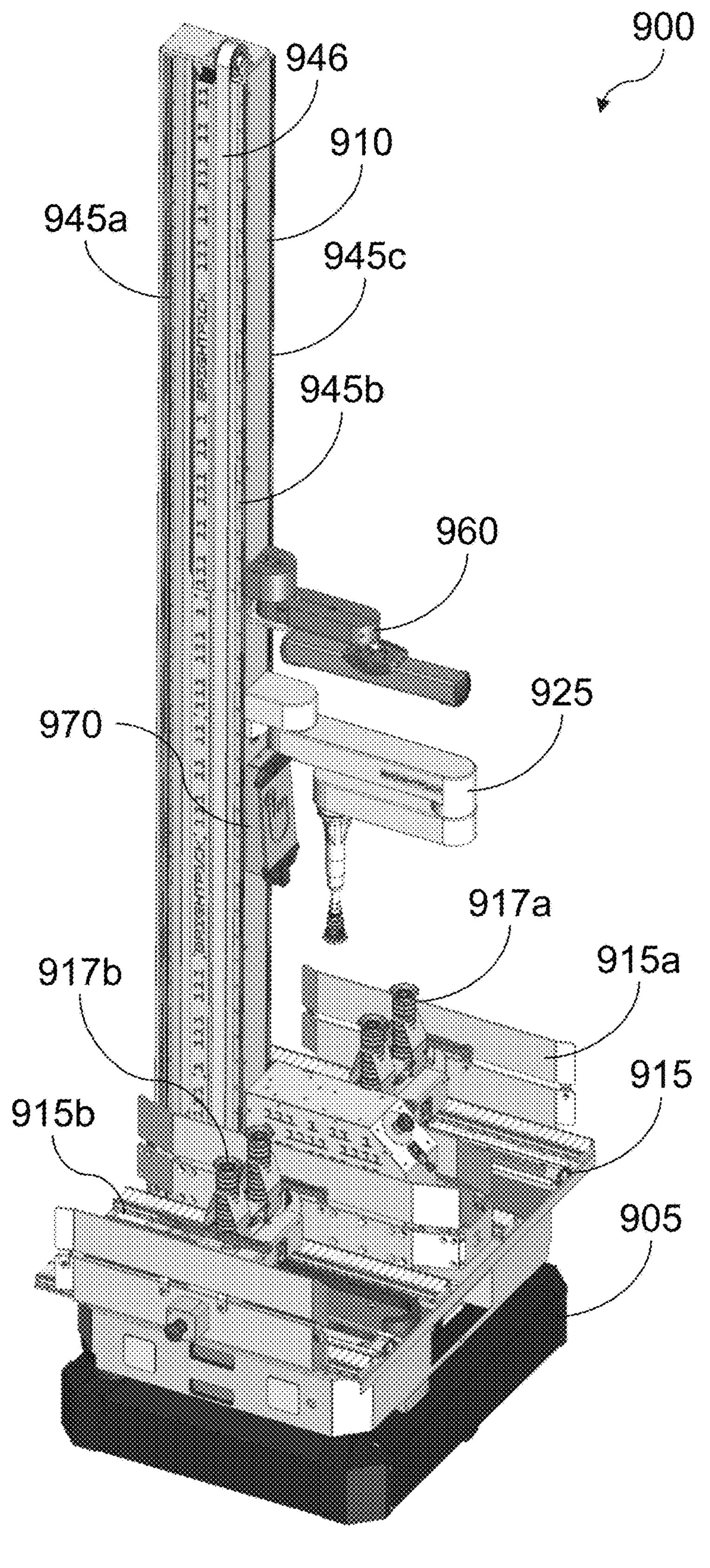
FIG. 5A shows a top, front, left-side perspective view of another example mobile picker apparatus that includes a single frame arm and a camera assembly with a locking mechanism.
Figure 5B:
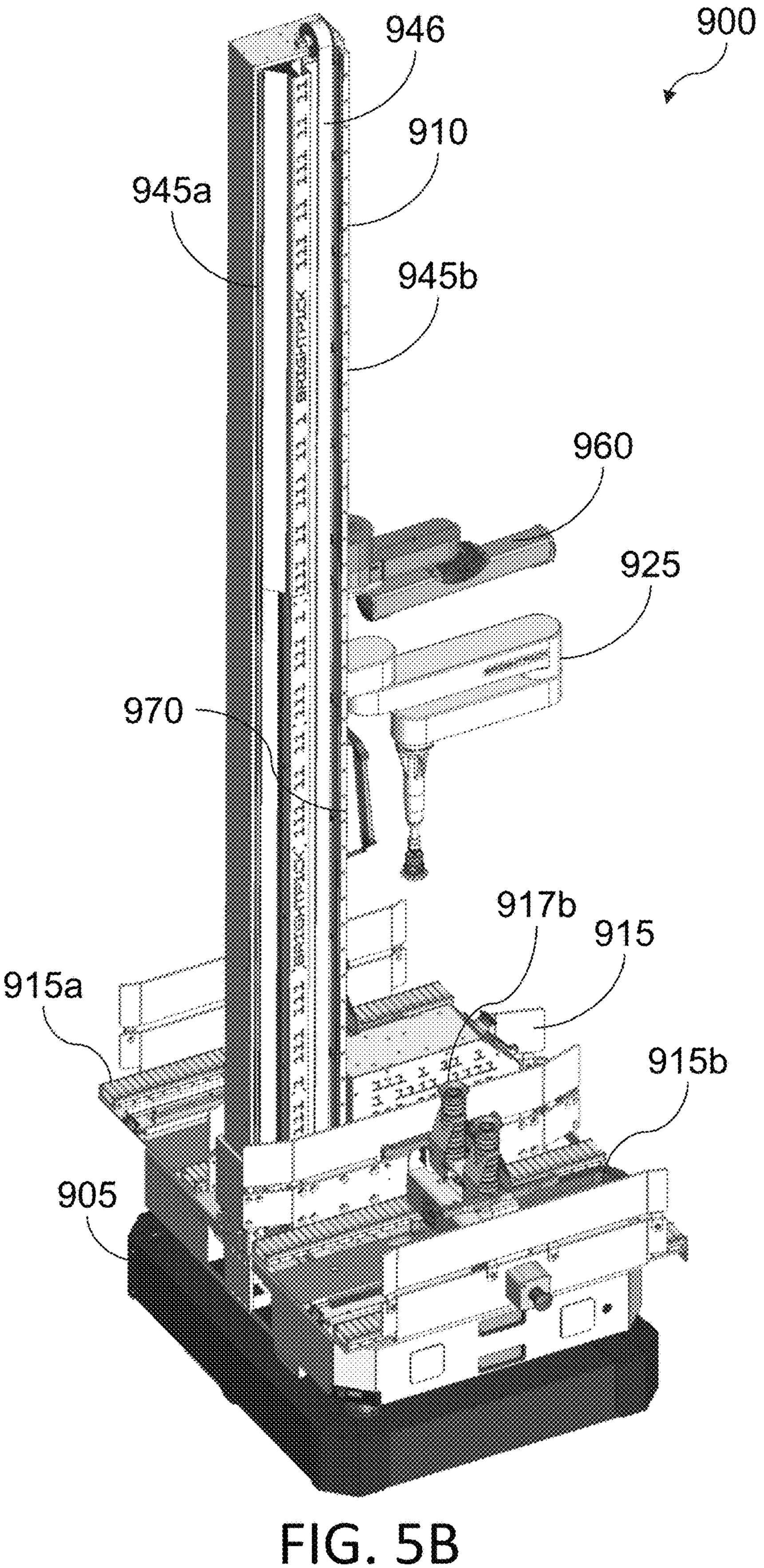
FIG. 5B shows a top, rear, left-side view of the apparatus of FIG. 5A.
Figure 5C:
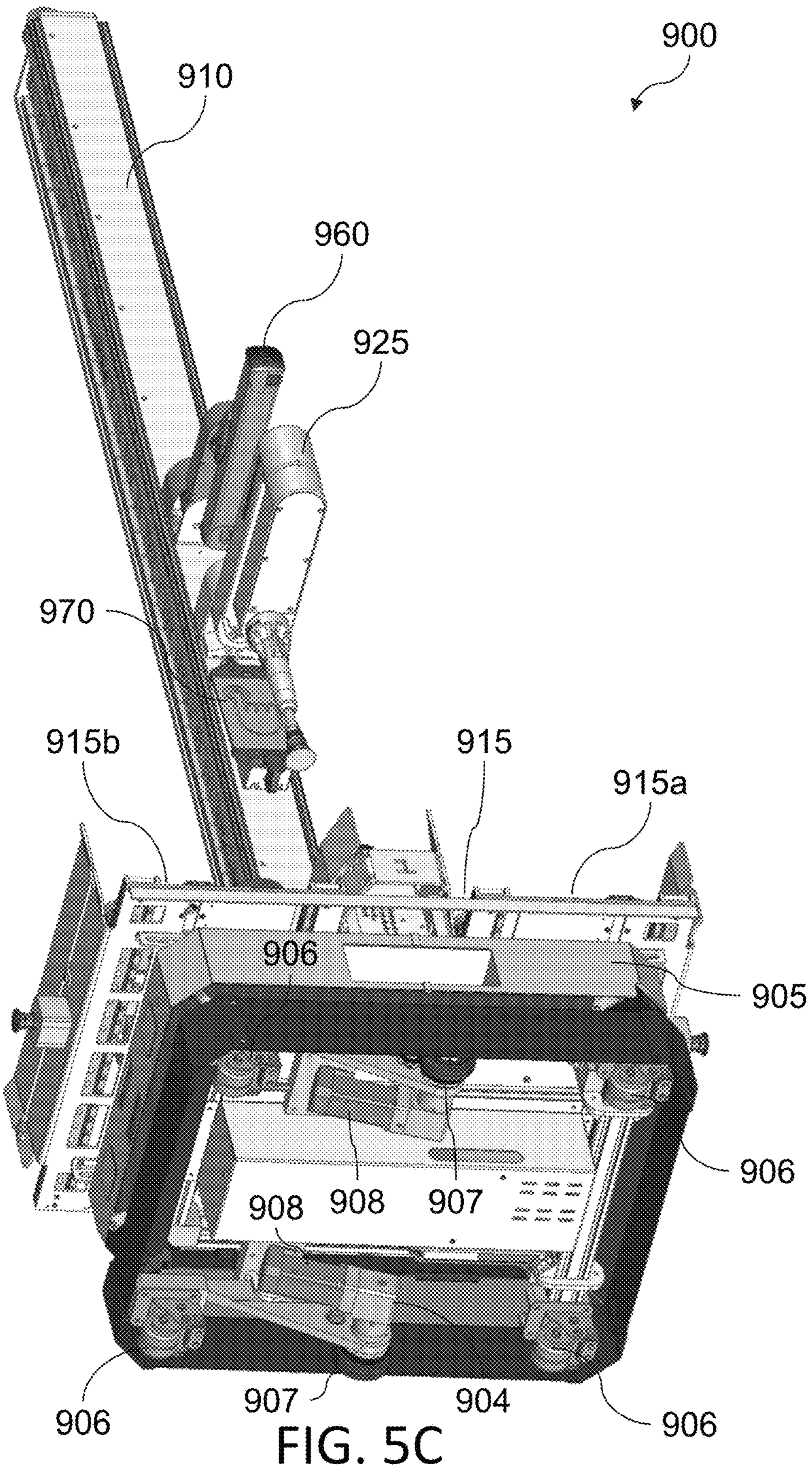
FIG. 5C shows a bottom, front, left-side view of the apparatus of FIG. 5A.
Figure 5D:
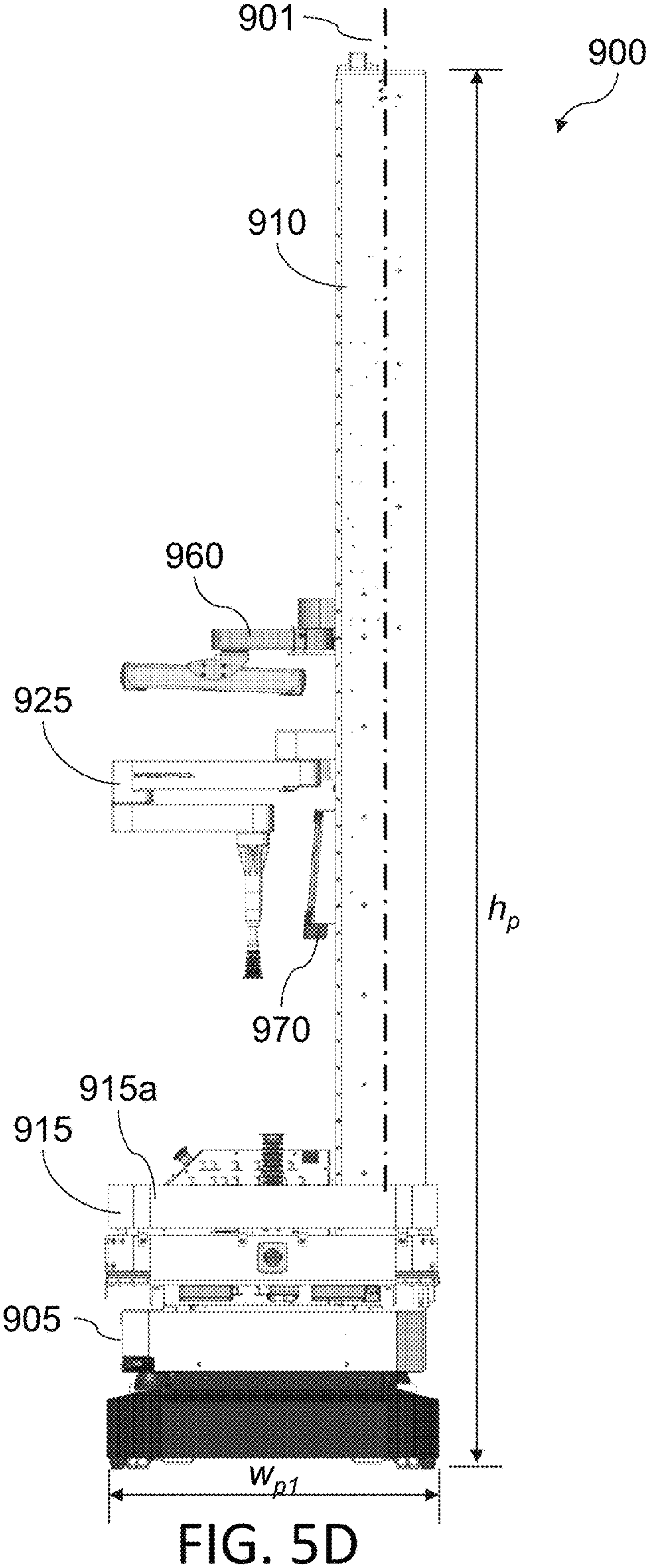
FIG. 5D shows a right-side view of the apparatus of FIG. 5A.

As shown, the apparatus 900 includes a body portion 905 to support, for example, a drivetrain 904 to facilitate movement of the apparatus 900 in an environment (e.g., a warehouse of a fulfillment center). As shown in FIG. 5C, the drivetrain 904 can include multiple passive wheels 906 (e.g., wheels that are not mechanically driven) and multiple motorized wheels 907 coupled to motors 908. The wheels 906 and 907 can be arranged to move the apparatus 900 in a sideways direction (e.g., a direction normal to the left/right-sides of the apparatus 900). This allows the apparatus 900 to face, for example, a shelving unit as it moves along a storage section of the fulfillment center (e.g., see storage section 1010 of the warehouse 1000). Generally, the drivetrain 904 can include at least two motorized wheels 907 to provide propulsion and turning. For example, the two motorized wheels 907 can be driven in the same direction to move the apparatus 900 towards its left or right. In another example, the two motorized wheels 907 can be driven in opposite directions to turn the apparatus 900.

The body portion 905 can further support other components of the apparatus 900. These components can include, but are not limited to, one or more sensor(s) (e.g., proximity sensors used to facilitate navigation and/or detection of obstacles near the apparatus 900), a communication system (e.g., a wireless transceiver), a battery to power the apparatus 900, a charging interface (e.g., electrical contacts configured to contact a charging apparatus in the fulfillment center), and an onboard processor and memory to control the operation of the apparatus 900.

The apparatus 900 further includes a single frame arm 910 coupled to the body portion 905 defining a vertical axis 901. The frame arm 910 can support a set of platforms 915 (e.g., the platforms 915*a* and 915*b*), a picker robot 925, a camera assembly 960, and an interface 970 located at different vertical positions along the vertical axis. As described above, the use of a single frame arm 910 can simplify the design of the apparatus 900 by using fewer components, thus reducing material costs. Moreover, there are fewer obstructions that may, for example, impede the movement of the picker robot 925 (e.g., when picking items from boxes supported by the platforms 915*a* and 915*b*), or block access to the boxes by a human operator.

The apparatus 900 can generally be shaped and/or dimensioned to accommodate a range of shelving units and/or storage systems used in a fulfillment center. For example, the apparatus 900 can have a height, $h_p$, of about 3 meters (m). The apparatus 900 can further be dimensioned to have a width $w_{p1}$ less than or equal to about 1 m to accommodate the width of the aisles typically used in a storage system. The apparatus 900 can further have a width $w_{p2}$ ranging from about 1.4 m to 1.6 m.

Figure 5E:
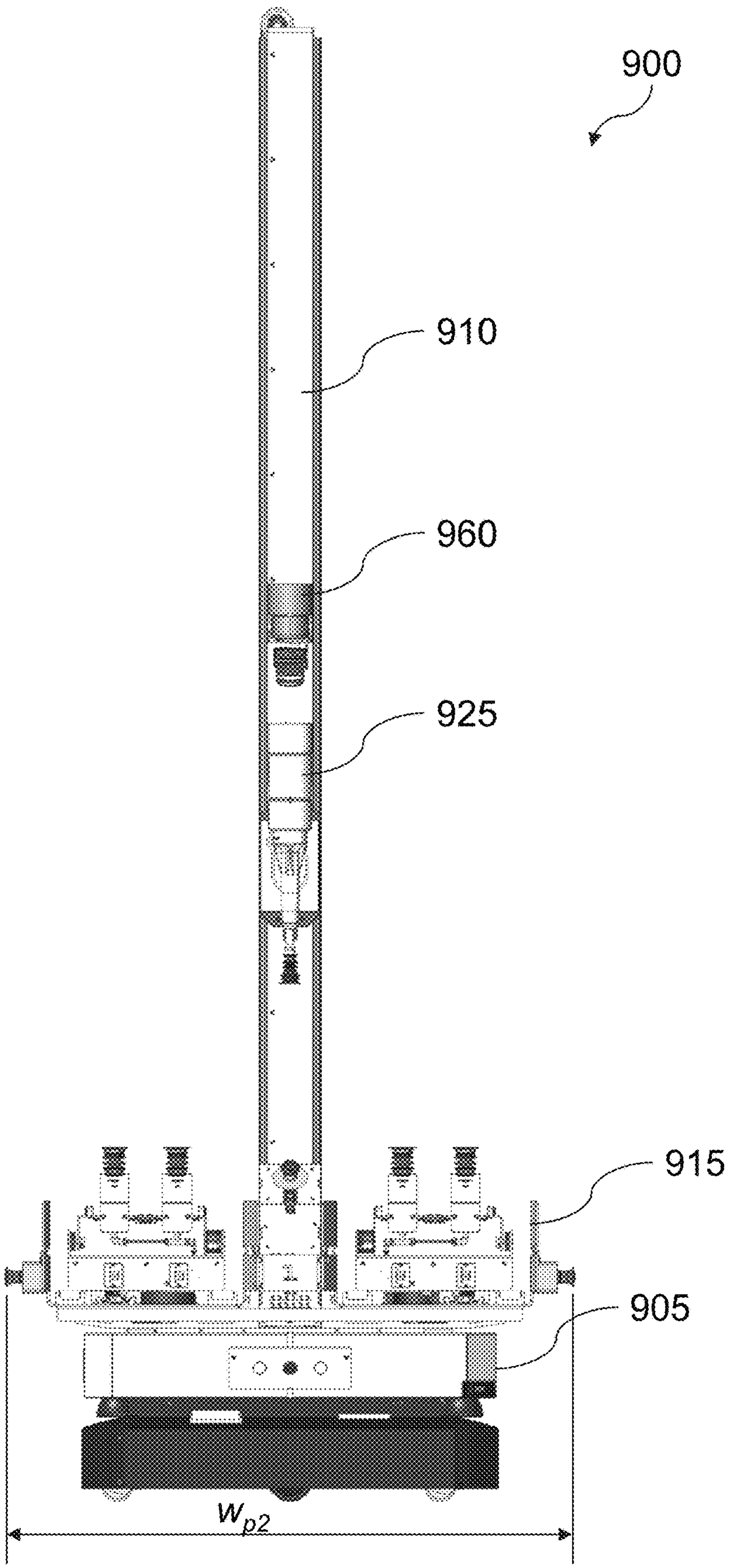
FIG. 5E shows a front view of the apparatus of FIG. 5A.
Figure 5F:
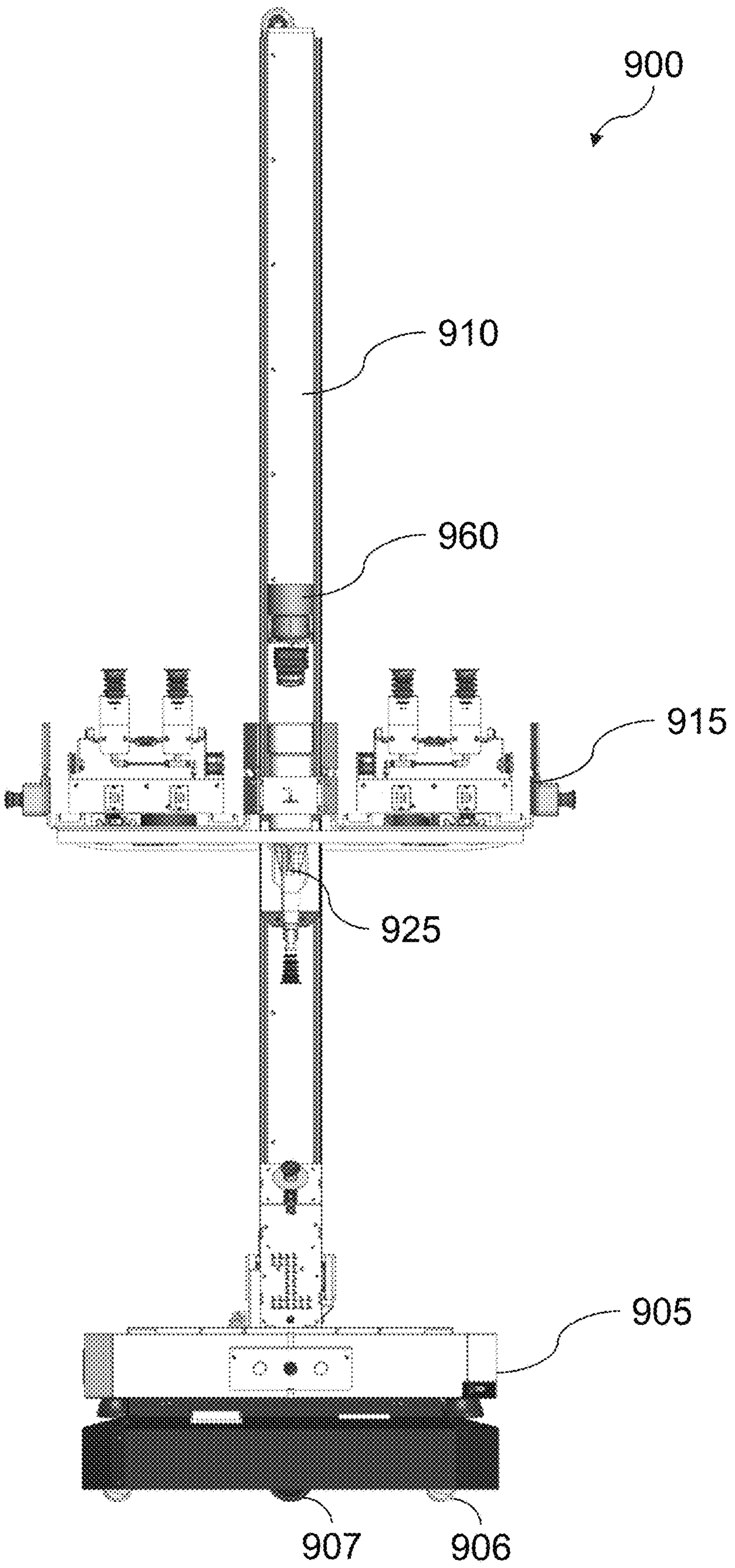
FIG. 5F shows another front view of the apparatus of the FIG. 5A where a set of platforms of the apparatus is raised vertically to a vertical position that overlaps with a picker robot of the apparatus.
Figure 5G:
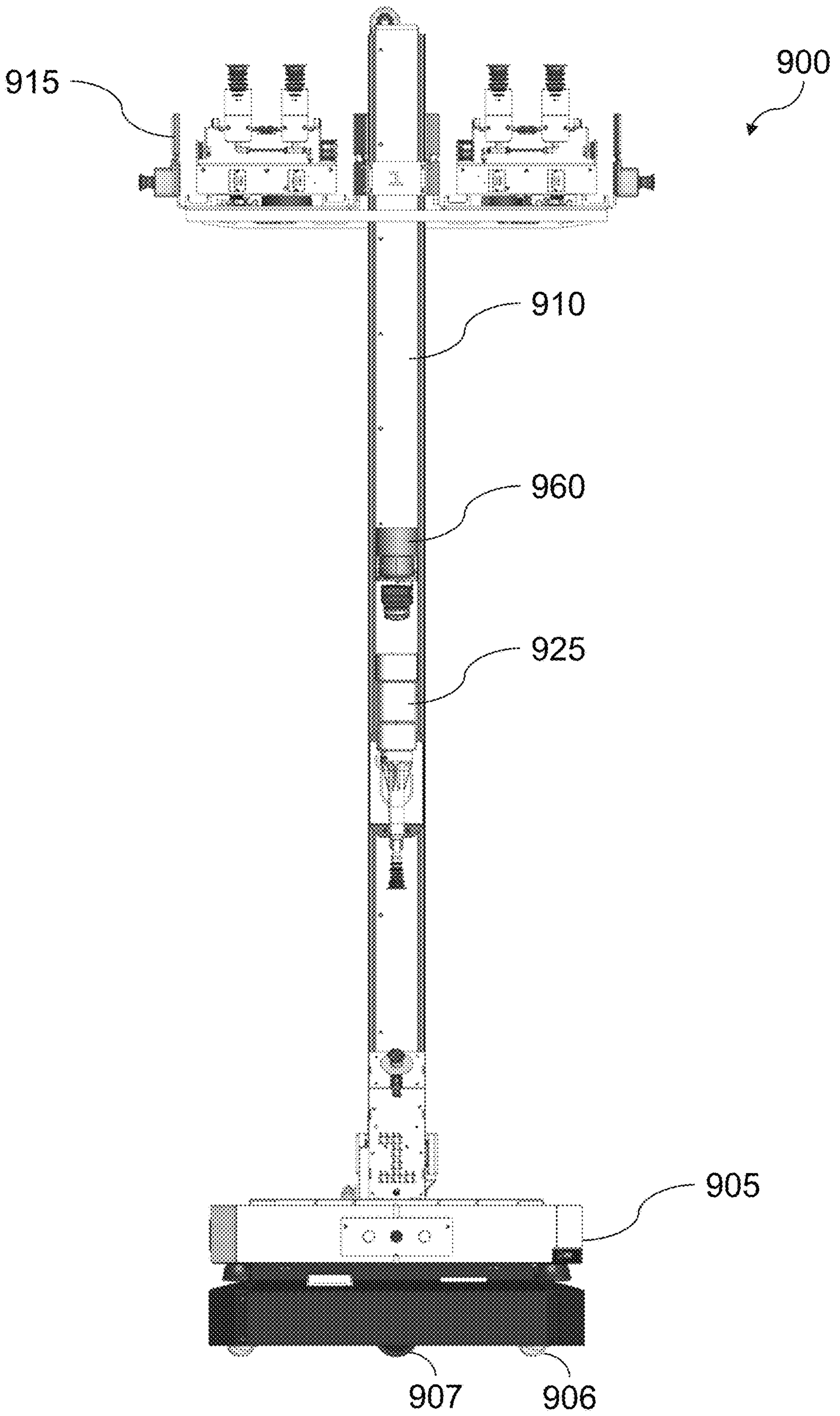
FIG. 5G shows another front view of the apparatus of the FIG. 5A where the set of platforms of the apparatus is raised vertically to a vertical position at the top of the frame arm.

The set of platforms 915 can be movably coupled to the frame arm 910 to facilitate loading and/or unloading of boxes at different heights (e.g., different shelves of a shelving unit located at different heights). This can be accomplished, for example, by the set of platforms 915 being slidably coupled to tracks 945*a*, 945*b*, and 945*c* on the frame arm 910. Additionally, the set of platforms 915 can be coupled to a belt 946, which in turn is coupled to a lift engine (not shown). In this example, the platforms 915*a* and 915*b* can be mechanically constrained to move together. Generally, the lift engine and the belt 946 can move the set of platforms 915 to any desired vertical position along the frame arm 910. A few example vertical positions are shown in FIGS. 5E, 5F, and 5G. Thus, the apparatus 900 can accommodate different shelving units having shelves located at different heights.

For example, the set of platforms 915 can be moved from a vertical position measured from the ground ranging from about 0.3 m to about 4 m, including all values and subranges in between. In another example, the set of platforms 915 can be moved from a vertical position ranging from about 0.5 m to about 3 m, including all values and subranges in between. The vertical range of travel of the platforms 915 can range from about 2 m to about 4 m, or about 3 m. The term "about," when used to describe the range of vertical positions and/or the vertical range of travel of the platforms 915, is intended to cover variability in the precision of movement. For example, "about 1 m" can correspond to the following ranges: 0.99 to 1.01 m (+/−1% variability), 0.98 to 1.02 m (+/−2% variability), 0.97 to 1.03 m (+/−3% variability), 0.96 to 1.04 m (+/−4% variability), 0.95 to 1.05 m (+/−5% variability), including all values and sub-ranges in between.

Figure 6:
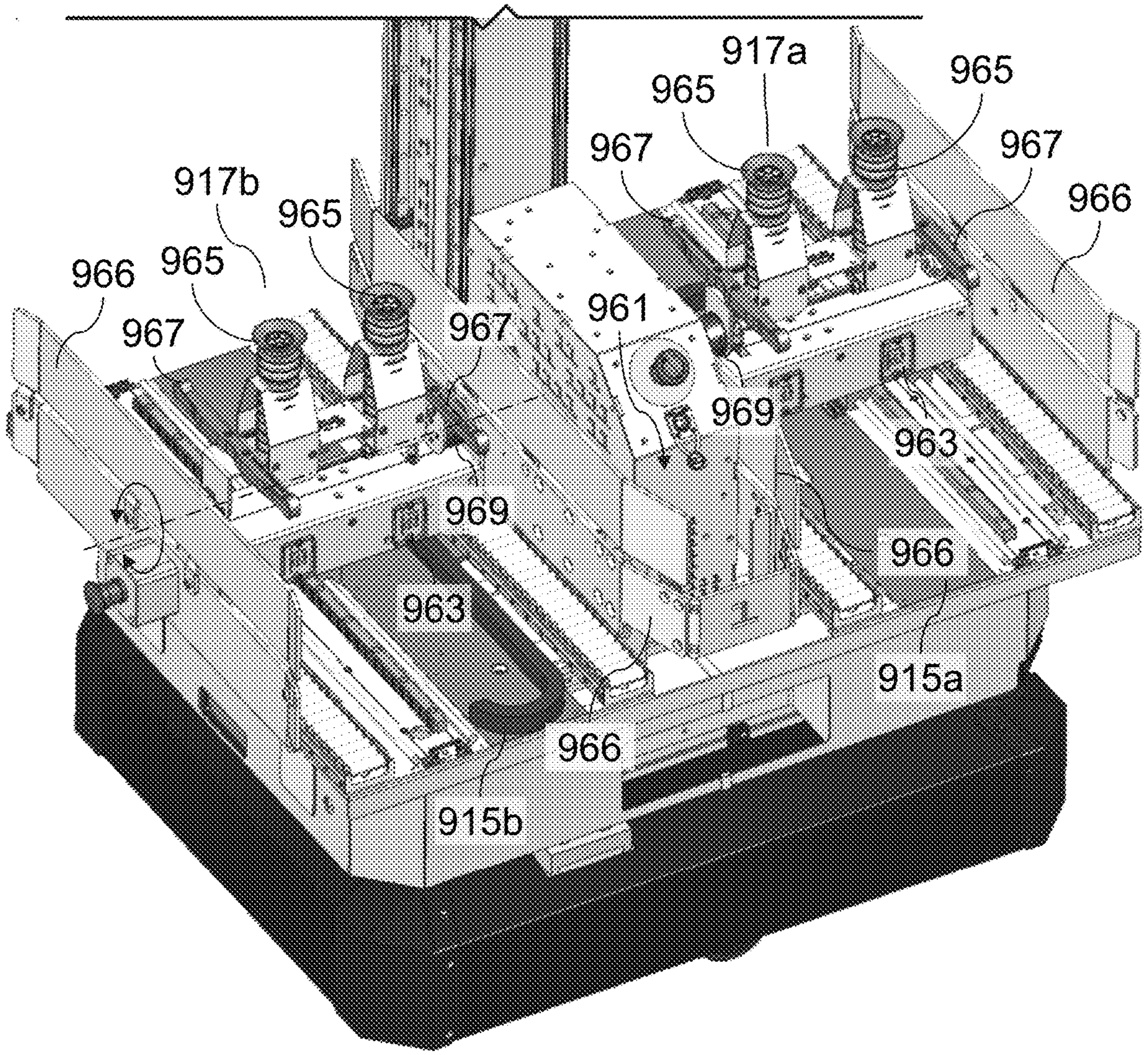
FIG. 6 shows a magnified top, front, left-side perspective view of the set of platforms of the apparatus of FIG. 5A.

FIG. 6 further shows a magnified view of the set of platforms 915. As shown, the platforms 915*a* and 915*b* can be arranged to be on the same vertical level. The platforms 915*a* and 915*b* can further be separated by a gap 961. The gap 961 provides space to move the platforms 915*a* and 915*b* past other components mounted to the frame arm 910 (e.g., the picker robot 925, the camera assembly 960, the interface 970), as described in further detail below. Each platform 915*a* and 915*b* can include guide walls 966 to guide a box as it is loaded or unloaded from a platform. The guide walls 966 can include a tapered end portion to align the box as it is loaded onto a platform if the box is, for example, oriented at an angle or shifted in position on the shelf relative to its expected orientation and position.

Each platform 915*a* and 915*b* can further include one or more cameras 963 to scan a box. For example, during operation, the apparatus 900 can receive instructions from a master server to retrieve items from a particular source box and the source box's location. The apparatus 900 can then navigate to the location of the source box. Before loading the source box, the apparatus 900 can use the camera(s) 963 to scan a machine-readable code on the source box (e.g., a quick response (QR) code) to verify the identity of the source box. In this manner, the apparatus 900 provides a way to check the integrity of the data stored by the master server on the location of the stock items in a fulfillment center. If the identity of the source box is verified, the apparatus 900 can transmit an indication to the master server that the correct source box is found and thereafter proceed to load the source box for picking. If the identity of the source box cannot be verified, the apparatus 900 can transmit an indication to the master server that the source box cannot be found and flag the source box that was checked for inspection. It should be appreciated that codes can also be placed onto destination boxes, for example, to verify and track different orders particularly if they are loaded and unloaded from one apparatus 900 to another apparatus 900. At least one camera 963 on each platform 915*a* and 915*b* can further include a light source to illuminate the code to facilitate acquisition of the imagery of that code.

Each platform 915*a* and 915*b* can further include push-pull mechanisms 917*a* and 917*b* (referred to more generally as the push-pull mechanism 917), respectively, to facilitate loading and unloading of a box. The push-pull mechanism 917 can generally be mounted to linear axis motor (not shown) that can push or pull a box. As described above with respect to the apparatus 100, the push-pull mechanism 917 can include one or more suction cups 965 configured to attach to a box to facilitate pulling of the box onto the platform. The suction cup(s) 965 can be operably coupled to a pump onboard the apparatus 900 to produce a vacuum at the suction cup(s) 965 to securely couple the box to the push-pull mechanism 917. The push-pull mechanism 917 can further include one or more push sticks 967 configured to push a box off the platform. The suction cup(s) 965 and the push stick(s) 967 can be further mounted onto a motorized rotary joint 969 such that only one of the suction cup(s) 965 or the push stick(s) 967 can physically interact with a box.

When loading a box, the rotary joint 969 can rotate such that the suction cup(s) 965 face forwards. Thereafter, the push-pull mechanism 917 can move forwards until the suction cup(s) 965 physically contacts the box. The pump can then be activated to suction the box to the suction cup(s) 965. Then, the push-pull mechanism 917 can move rearwards to pull the box onto the platform. If the pump remains active (e.g., to hold the box on the platform), the pump can first be deactivated when unloading the box. Thereafter, the rotary joint 969 can rotate such that the push stick(s) 967 face forwards. If the pump is not active, the rotary joint 969 can rotate immediately when unloading the box. Then, the push-pull mechanism 917 can move forwards to push the box via the push stick(s) 967 off the platform and onto, for example, a shelf. Then, the push-pull mechanism 917 can move rearwards to a default position until another box is loaded.

The picker robot 925, as described above, is used to pick an item from one box (e.g., a source box supported by the platform 915*a*) and place the item in another box (e.g., a destination box supported by the platform 915*b*). Generally, the picker robot 925 can include a robotic arm 926 and a gripper 950. The robotic arm 926 can provide multiple degrees of freedom of movement to manipulate and move the gripper 950 when picking and placing items. In this example, the platforms 915 supporting the boxes can be moved relative to the picker robot 925 to assist with the picking process. This, in turn, can simplify the picker robot 925 since the picker robot 925 can be affixed to the frame arm 910 rather than being movably coupled to the frame arm 910. For example, the platforms 915 can be used to move an item vertically into engagement with the gripper 950. Additionally, a robotic arm 926 with relatively fewer axes of motion and/or control over a relatively fewer number of degrees of freedom can be used. For example, the robotic arm 926 can be configured to move in a similar manner as the robotic arm of the picker robot 125 in FIG. 1A. Thus, the robotic arm 926 can provide control of up to four degrees of freedom and/or be a 4-axis robotic arm, such as a SCARA robot as described in Section 1.1. It should be appreciated that the 4-axis robotic arm of the picker robot 925 is a non-limiting example. More generally, the picker robot 925 can include a robotic arm with control over more degrees of freedom (e.g., five degrees of freedom, or six degrees of freedom) and/or with more axes of motion (e.g., a 5-axis robotic arm, or a 6-axis robotic arm), as described above in Section 1.1 for the picker robot 125 of the mobile picker apparatus 100.

Figure 7A:
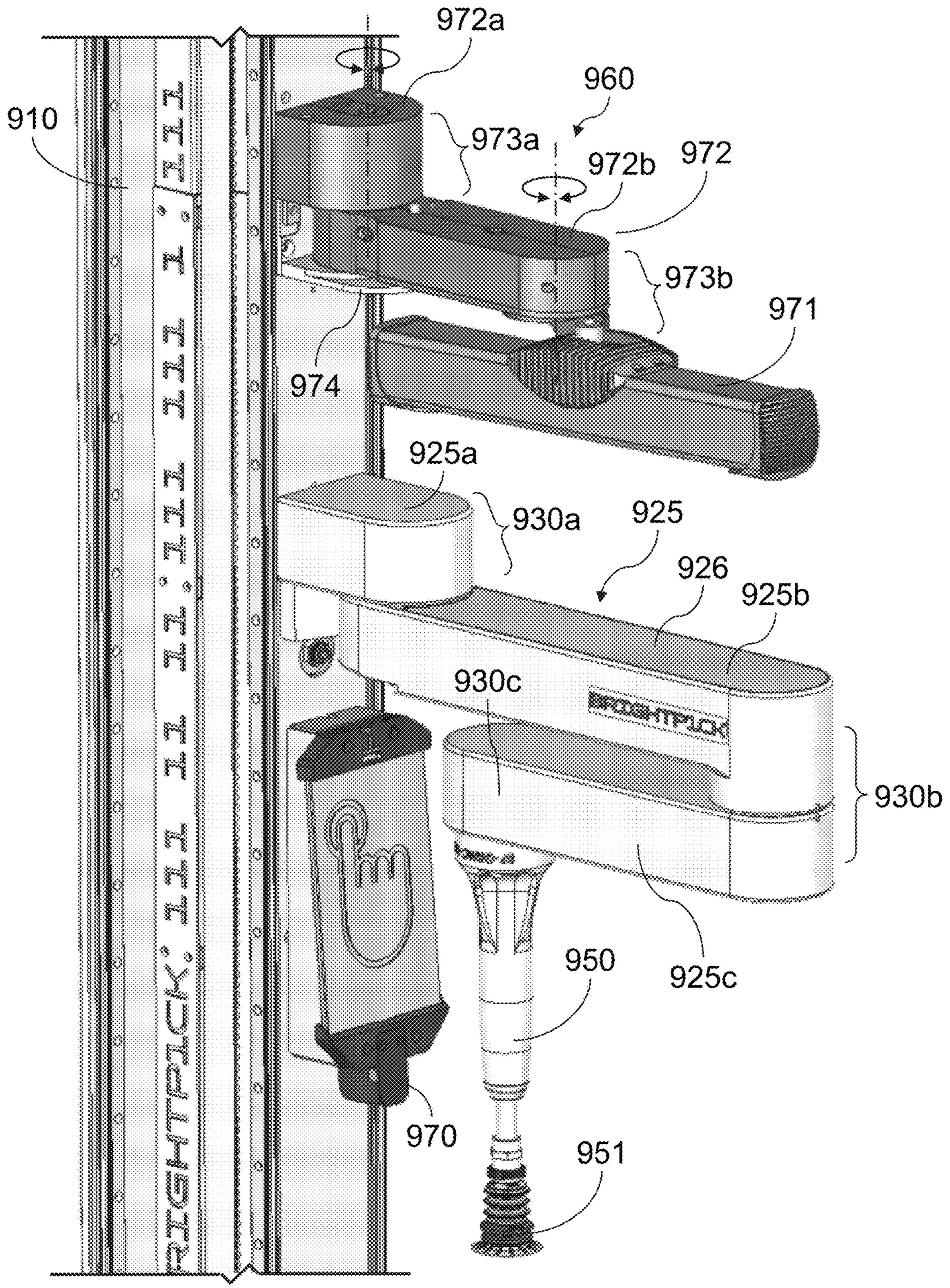
FIG. 7A shows a magnified top, front, left-side perspective view of the picker robot and a camera assembly of the apparatus of FIG. 5A.

The picker robot 925 can be rigidly coupled to the frame arm 910. As shown in FIG. 7A, the robotic arm 926 can include a first arm 925*a* rigidly coupled to the frame arm 910, a second arm 925*b* rotatably coupled to the first arm 925*b* via a rotary joint 930*a*, and a third arm 925*c* rotatably coupled to the second arm 925*b* via a rotary joint 930*b*. The gripper 950 can then be rotatably coupled to the arm 925*c* via a rotary joint 930*c*. The gripper 950 includes a suction cup 951, which is operably coupled to a pump (not shown) onboard the apparatus 900 to provide vacuum suction to facilitate attachment of an item to the suction cup 951. The gripper 950 can further be moved vertically with respect to the arm 925*c* with a limited range of travel. Each of the rotary joints 930*a*, 930*b*, and 930*c* can be oriented to provide rotation about a vertical axis similar to the rotation axes of the picker robot 125.

The picker robot 925 can be configured to have a home pose (also referred to herein as a "pose") that allows the platforms 915 to move vertically past the picker robot 925 without colliding with the picker robot 925. For example, the arms 925*a*-925*c* and the gripper 950 can be positioned and/or oriented as shown in FIG. 5E such that no portion of the picker robot 925 extends over and above the platforms 915. This, in turn, allows the picker robot 925 to fit in the gap 961 between the platforms 915*a* and 915*b* as the platforms 915 move past the picker robot 925, as shown in FIG. 5F. In some cases, the picker robot 925 can be moved into this home pose every time before the platforms 915 are moved. This home pose can be calibrated and stored in memory on the apparatus 900 so that the picker robot 925 can be readily commanded to return to this home pose as desired. In some cases, the picker robot 925 can further include a built-in locking mechanism to lock the picker robot 925 in the home pose, e.g., to prevent any unintended motion of the picker robot 925 as the platforms 915 move past the picker robot 925. For example, each rotary joint can include a clamp that, when engaged, clamps onto a gear or a belt of the motor in the rotary joint to prevent rotation. The clamp can be configured to engage only when the picker robot 925 is in the home pose.

The camera assembly 960 is used to acquire imagery of items contained in the boxes supported by the platforms 915*a* and/or 915*b*. The imagery, as described above, can be used to identify and locate items for picking within a source box. The camera assembly 960 can include a robotic arm 972 and a camera 971 as shown in FIGS. 7A-7D. The robotic arm 972 can provide multiple degrees of freedom of movement to manipulate and move the camera 971 to acquire imagery with a desired field of view. For example, the camera 971 can be moved over a box supported by the platform 915*a* (via the robotic arm 972) to acquire imagery of the items in that box.

Figure 7B:
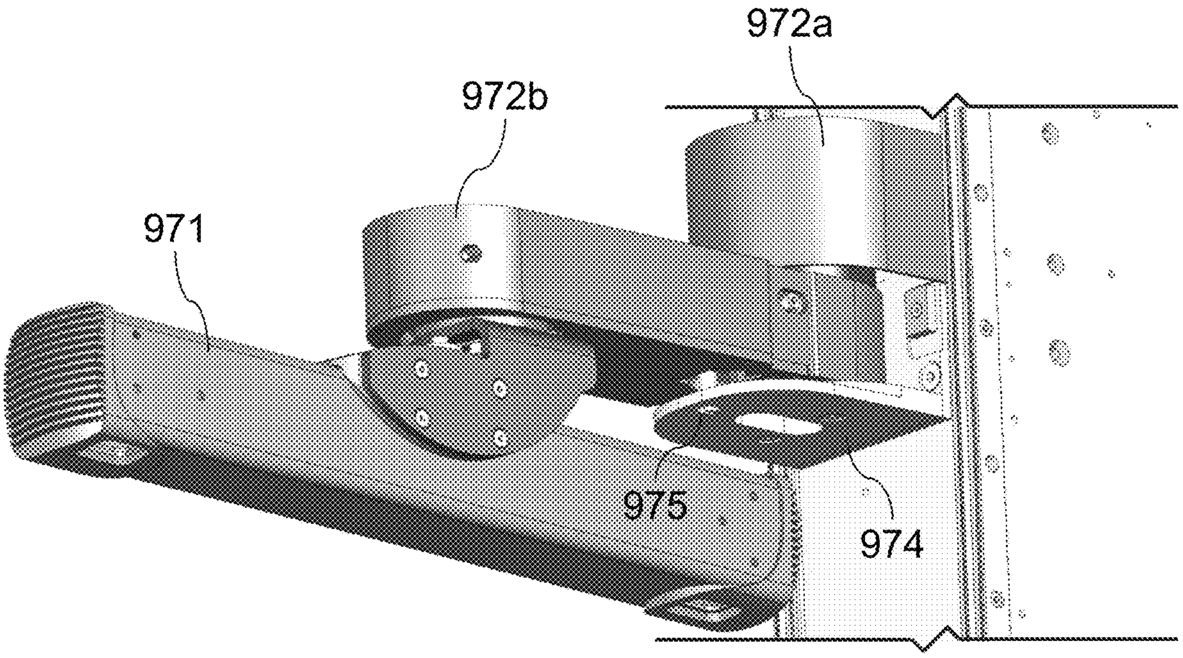
FIG. 7B shows a bottom, front, right-side perspective view of the camera assembly of FIG. 7A.
Figure 7C:
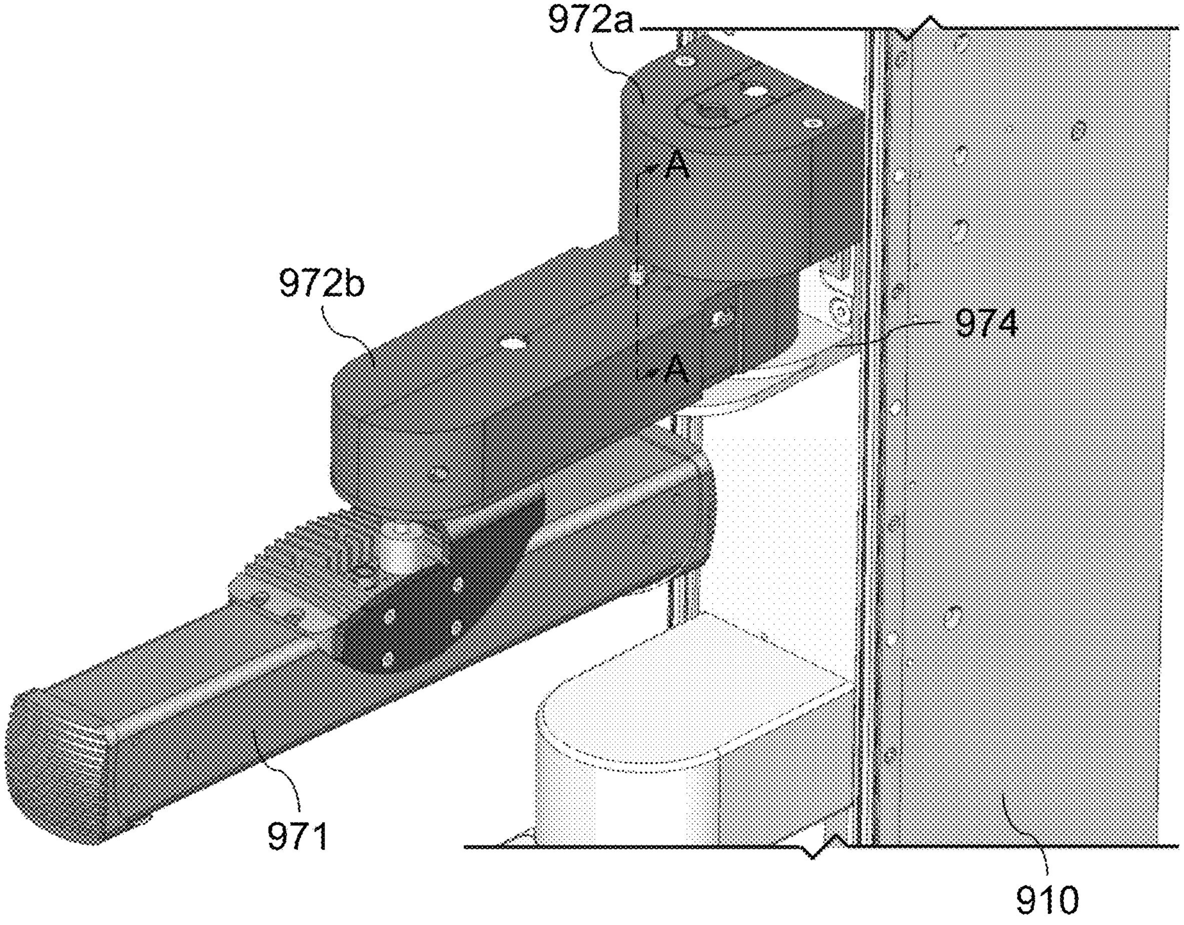
FIG. 7C shows a top, front, right-side perspective view of the camera assembly of FIG. 7A.
Figure 7D:
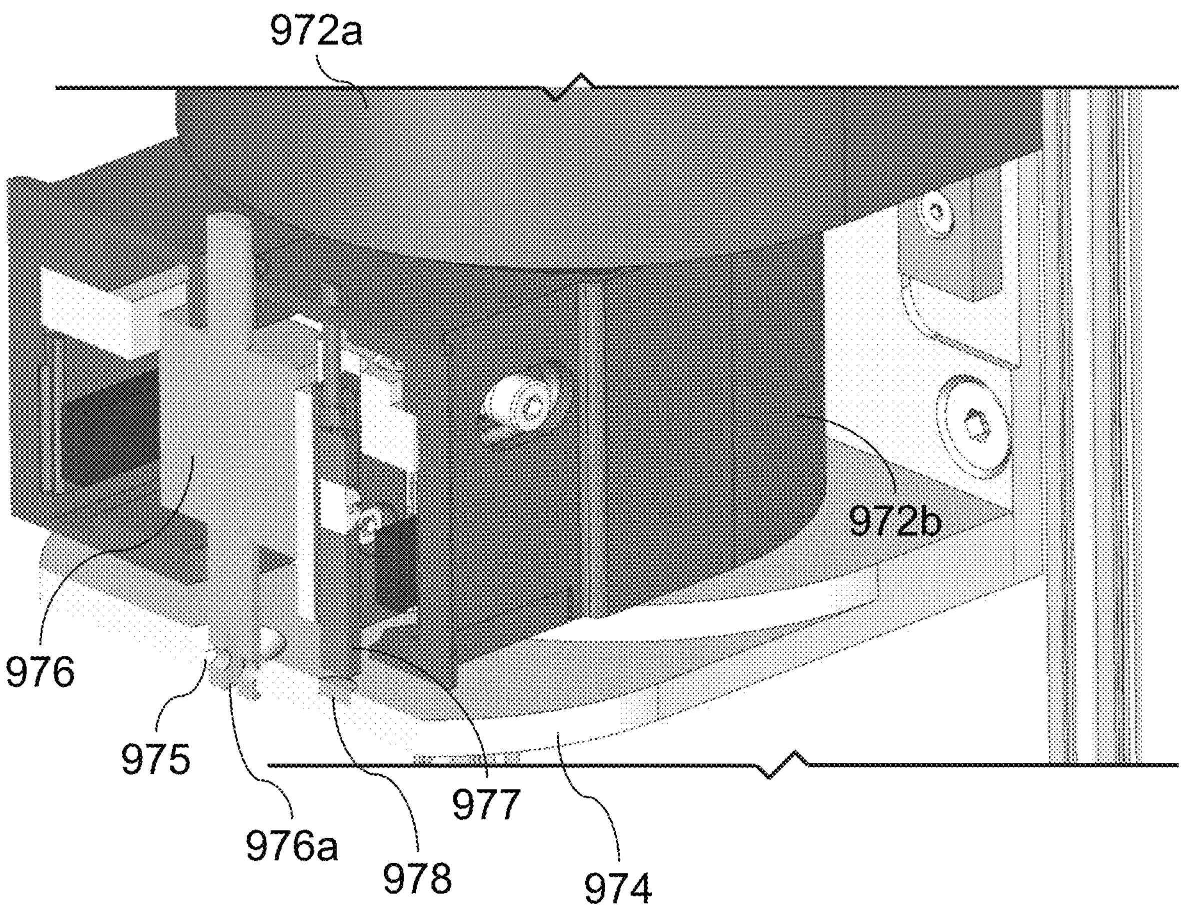
FIG. 7D shows a cross-sectional top, front, right-side perspective view of the camera assembly of FIG. 7A. where the cross-section corresponds to the plane A-A of FIG. 7C.

The camera assembly 960 can be rigidly coupled to the frame arm 910. As shown in FIGS. 7A-7C, the robotic arm 972 can include a first arm 972*a* rigidly coupled to the frame arm 910 via a mounting plate 974 and a second arm 972*b* rotatably coupled to the first arm 972*a* via a rotary joint 973*a*. The camera 971 can be rotatably coupled to the second arm 972*b* via a rotary joint 973*b* and oriented downwards towards the boxes (e.g., when the platforms 915 are positioned below the camera assembly 960). Each of the rotary joints 973*a* and 973*b* can be oriented to provide rotation about a vertical axis. Thus, the robotic arm 972 may only provide movement of the camera 971 within a horizontal plane.

The camera assembly 960 can be configured to have a home pose (also referred to herein as a "pose) that allows the platforms 915 to move vertically past the camera assembly 960 without colliding with the camera assembly 960. For example, the arms 972*a* and 972*b* and the camera 971 can be positioned and/or oriented as shown in FIG. 5E such that no portion of the camera assembly 960 extends over and above the platforms 915. This, in turn, allows the camera assembly 960 to fit in the gap 961 between the platforms 915*a* and 915*b* as the platforms 915 move past the camera assembly 960. In some cases, the camera assembly 960 can be moved into this home pose every time before the platforms 915 are moved. This can be facilitated, in part, by the arm 972*b* including a magnetic sensor 977 and the mounting plate 974 including the magnet 978. The magnet 978 can be positioned such that the magnetic sensor 977 only detects the magnet 978 when the arm 972*b* is in this home pose. Said another way, the magnetic sensor 977 can be used to detect when the arm 972*b* is in the home pose. This pose can also be calibrated and stored in memory on the apparatus 900 so that the camera assembly 960 can be readily commanded to return to this home pose as desired with additional verification provided by the magnetic sensor 977. For example, the robotic arm 972 can be commanded to move the home pose and if the magnetic sensor 977 detects the magnet 978, the command is determined to be successfully executed.

In some cases, the camera assembly 960 can further include a locking mechanism that locks the robotic arm 972 and the camera 971 in the home pose shown in FIG. 5E to prevent any unwanted movement of the camera assembly 960, e.g., when the platforms 915 move past the camera assembly 960. For example, the locking mechanism can include a push pull solenoid actuator 976 disposed within the arm 972*b* with a shaft 976*a* that can be extended or retracted on command. When the arm 972*b* is in the home pose, the shaft 976*a* is aligned with an opening 975 on the mounting plate 974. To engage the locking mechanism, the shaft 976*a* is extended through the opening 975, thus preventing the arm 972*b* from rotating relative to the arm 972*a*. In this manner, the arm 972*b* can be locked in the home pose of the camera assembly 960. The rotary joints 973*a* and 973*b* can further include built-in locking mechanisms to lock the camera 971 in the home pose. For example, each rotary joint 973*a* and 973*b* can include a clamp that, when engaged, clamps onto a gear or a belt of the motor in the rotary joint to prevent rotation. The clamp can be configured to engage only when the camera assembly 960 is in the home pose.

The interface 970 can be rigidly coupled to the frame arm 710 and communicatively coupled to the processor of the apparatus 900 and/or the master server. As shown in FIG. 5E, the interface 970 can be shaped and/or dimensioned to fit within the gap 961 between the platforms 915 so that the platforms 915 do not collide with the interface 970 as they move past along the frame arm 910. The interface 970 can include a screen to display information related to the operation of the apparatus 900. The interface 970 can further include a user input device (e.g., a touchscreen) to allow the human operator to interact with the interface 970. For example, if the apparatus 900 is unable to pick an item after repeated attempts, the apparatus 900 can seek out a human operator for assistance. The screen can display a notification to the human operator which item is at issue and to guide the human operator to pick the item from a source box and place the item in a destination box. Once the item is picked, the human operator can touch the interface 970 to indicate the item is picked and the apparatus 900 can thereafter continue with fulfilling the order. In another example, the screen can display a notification that the apparatus 900 requires maintenance (e.g., the battery is low, a component has failed).

In one example use case, the apparatus 900 can pick an item as follows. First, the apparatus 900 can navigate to a shelving unit to access a shelf with a source box containing an item to be picked. During this time, the apparatus 900 can hold a destination box on the platform 915*b*. Upon arriving at the shelving unit, the platforms 915 can be moved vertically in alignment with the shelf. The picker robot 925 and the camera assembly 960 can be moved into their respective home poses before the platforms 915 are moved. Once the platforms are aligned to the shelf, the camera 963 of the platform 915*a* can scan a QR code on the box to verify its identity. Upon verifying the identity of the source box, the push-pull mechanism 917*a* can load the source box onto the platform 915*a* (e.g., via the suction cup(s) 965 described above).

The set of platforms 915 can then be moved to a predetermined distance below the camera assembly 960 that is within the scanning range (e.g., the focal range) of the camera 971. The robotic arm 972 of the camera assembly 960 can then move the camera 971 above the source box to acquire imagery of the items contained in the source box. Thereafter the camera assembly 960 can return to its home pose and the processor of the apparatus 900 (or the master server) can analyze the imagery and determine a) where the item to be picked is located and b) a trajectory to move the item from the source box to the destination box.

Then, the set of platforms 915 can be moved below the picker robot 925. The robotic arm 926 can then move the gripper 950 above the item to be picked and the set of platforms 915 can then be moved upwards until the item makes physically contact with the suction cup 951 of the gripper 950. When this occurs, the pump can be activated to suction the item to the suction cup 951. Thereafter, the set of platforms 915 can be lowered before the robotic arm 926 moves the gripper 950 and the item over towards the destination box according to the trajectory. The set of platforms 915 can then be raised again to place the item into the destination box. Once the item is within a predetermined distance from the destination box (e.g., a distance sufficient to drop the item without damaging the item), the pump can be deactivated to release the item from the gripper 950 into the destination box.

Thereafter, the picker robot 925 can return to its home pose. The set of platforms 915 can then move in alignment with the shelf from which the source box was originally located. The push-pull mechanism 917*a* can then be used to unload the source box onto the shelf (e.g., via the push stick(s) 967). It should be appreciated that the source box can be unloaded onto another shelf of a the same or different shelving unit or moved to a replenishment shelf to restock the source box with the item. The apparatus 900 can then transmit an indication to the master server that the pick is complete. The apparatus 900 can then proceed to pick another item or unload the destination box according at a consolidation shelf based on the instructions from the master server.

2. EXAMPLES OF MOBILE RUNNER APPARATUSES

In this section, several examples of a mobile runner apparatus are presented that can retrieve and hold multiple boxes (e.g., a source box, a destination box) and place the boxes into different areas of the environment (e.g., a shelf storing source boxes, a consolidation shelf storing destination boxes). The mobile runner apparatus can thus be used to move boxes to different locations of the fulfillment center and operate together with a separate picker apparatus, such as the stationary picker apparatus disclosed in the '470 application, or a picking station operated by a human operator. For example, the mobile runner apparatus can retrieve one or multiple source boxes from multiple shelves, deliver the source box(es) to a picking station, and place the source box(es) back onto the shelves after picking is complete. In another example, the mobile runner apparatus can carry multiple destination boxes containing different orders from a picking station to a consolidation shelf for further processing. In yet another example, the mobile runner apparatus can carry at least one source box and at least one destination box.

The mobile runner apparatus can include several of the same components as the mobile picker apparatuses described above, such as the body portion, the drivetrain, sensor(s) for navigation, a frame, and a set of platforms movably coupled to the frame. It should be appreciated that one or more components and/or features of one mobile runner apparatus can be readily combined or substituted with one or more components and/or features of another mobile runner apparatus provided the combination or substitution does not result in mutually inconsistent features. It should also be understood that unless indicated otherwise, components of the additional/alternative apparatuses described herein can be structurally and/or functionally similar to similarly referenced and/or similarly named components. For example, the platform 515*a* shown below in FIG. 8 can be structurally and/or functionally similar to the platform 115*a* shown in FIG. 1A, and so on.

2.1 An Example Mobile Runner Apparatus with Fixed Platforms

Figure 8:
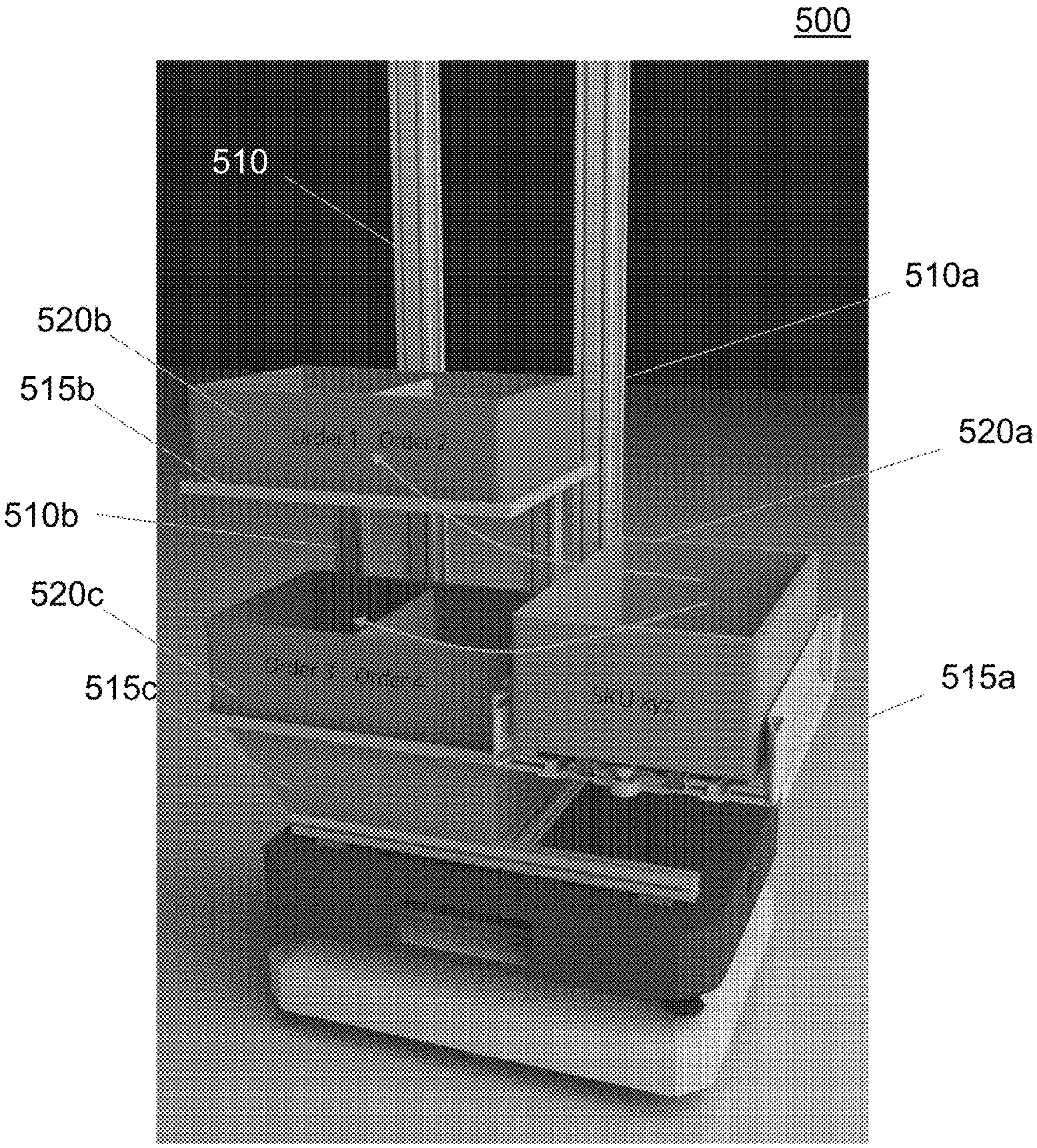
FIG. 8 shows an example mobile runner apparatus with fixed platforms.

FIG. 8 shows an example mobile runner apparatus 500 that includes a frame 510 and a set of platforms 515*a*, 515*b*, and 515*c* to support boxes 520*a*, 520*b*, and 520*c*, respectively. In this example, the platforms 515*b* and 515*c* can be rigidly fixed to the frame 510. The apparatus 500 may include several of the same features, components, and/or subsystems as the apparatuses 100, 300, 400, and 900. The apparatus 500 can further execute some operations in a similar manner to the apparatuses 100, 300, 400, and 900 unless indicated otherwise (e.g., the process of retrieving or placing boxes). For brevity, repeated discussions of these features may not be provided below.

As shown, the platform 515*a* is disposed on one side of the frame arm 510*a* and also movably coupled to the frame arm 510*a*. The apparatus 500 further includes a lift engine (not shown) operably coupled to the platform 515*a* to change the vertical position of the platform 515*a* in a manner similar to the platforms 115*a* and 115*b* of the apparatus 100. The platforms 515*b* and 515*c* are disposed on another side of the frame 510*a* and coupled to frame arms 510*b* such that the platform 515*b* is disposed above the platform 515*c*. Thus, the boxes 520*b* and 520*c* are stacked above one another. Unlike the platform 515*a*, the platforms 515*b* and 515*c* are rigidly fixed to the frame arms 510*b* and thus cannot move along the frame 510. Accordingly, the boxes 520*b* and 520*c* should be loaded and/or unloaded manually by a human operator. It should be appreciated that the platforms 515*b* and 515*c* are not limited to supporting destination boxes, but can also support source boxes too.

In some situations, manual picking of items may be required or is desirable, for example, when fragile items, large items, and/or non-standardized items (e.g., produce) are picked. The apparatus 500 can be used, for example, to improve the ease of manual picking by automating the process of transporting items for picking. For example, FIG. 8 shows the box 520*a* can be a source box and the boxes 520*b* and 520*c* and can be destination boxes configured to contain items for multiple orders (e.g., orders 1 and 2 in box 520*b*, and orders 3 and 4 in box 520*c*). Thus, a human operator can readily pick items from the box 520*a* and place the items in the boxes 520*b* and 520*c*. Generally, the apparatus 500 can be used in situations where manual picking (e.g., by a human operator) is more efficient than an automated picking process. Moreover, the apparatus 500 can be used together with the other mobile robots described herein.

In one example use case, the apparatus 500 can be used to retrieve the box 520*a* (e.g., from a shelf) and thereafter move to a human operator in the fulfillment center. The operator can then place the boxes 520*b* and 520*c* on the platforms 515*b* and 515*c*, respectively, and proceed to move items from the box 520*a* to the boxes 520*b* and 520*c* for order fulfillment. As shown in FIG. 8, each of the boxes 520*b* and 520*c* can include two compartments. The compartments can be used to contain items for different orders. Thus, the operator can move items to the respective compartments of the boxes 520*b* and 520*c* to at least partially fulfill up to four orders (shown as "Order 1" and "Order 2" for the box 515*b*, and as "Order 3" and "Order 4" for the box 515*c*). The apparatus 500 can then move away from the operator, replace the box 520*a* with another source box, and then return to the same operator (or, alternatively, approach another operator) so that the operator can pick another set of items. It should be appreciated that the source boxes can also include compartments to store, for example, low volume stock items that don't require an entire source box. In some cases, each compartment can be configured to contain different stock items according to a stock keeping unit (SKU) and/or a universal product code (UPC).

In some cases, the apparatus 500 can include an interface (e.g., a touchscreen) coupled to a processor of the apparatus 500 and/or to the master server to present order information (e.g., number of items to be picked for each order) to the operator to guide the operator when picking items for the boxes 520*b* and 520*c*. The interface can additionally permit the user to indicate when the fulfillment/partial fulfillment of the order is complete, which can, in turn, can trigger the apparatus to leave the operator as described above to continue order processing.

FIG. 8 also shows the boxes 520*b* and 520*c* can be presented to the operator along their longer sides to provide more ergonomic ease of access to the compartments for different orders. However, it should be appreciated that the apparatus 500 can support any suitable orientation of the boxes 520*a*-520*c*.

2.2 Example Mobile Runner Apparatuses with Only Movable Platforms

Figure 9A:
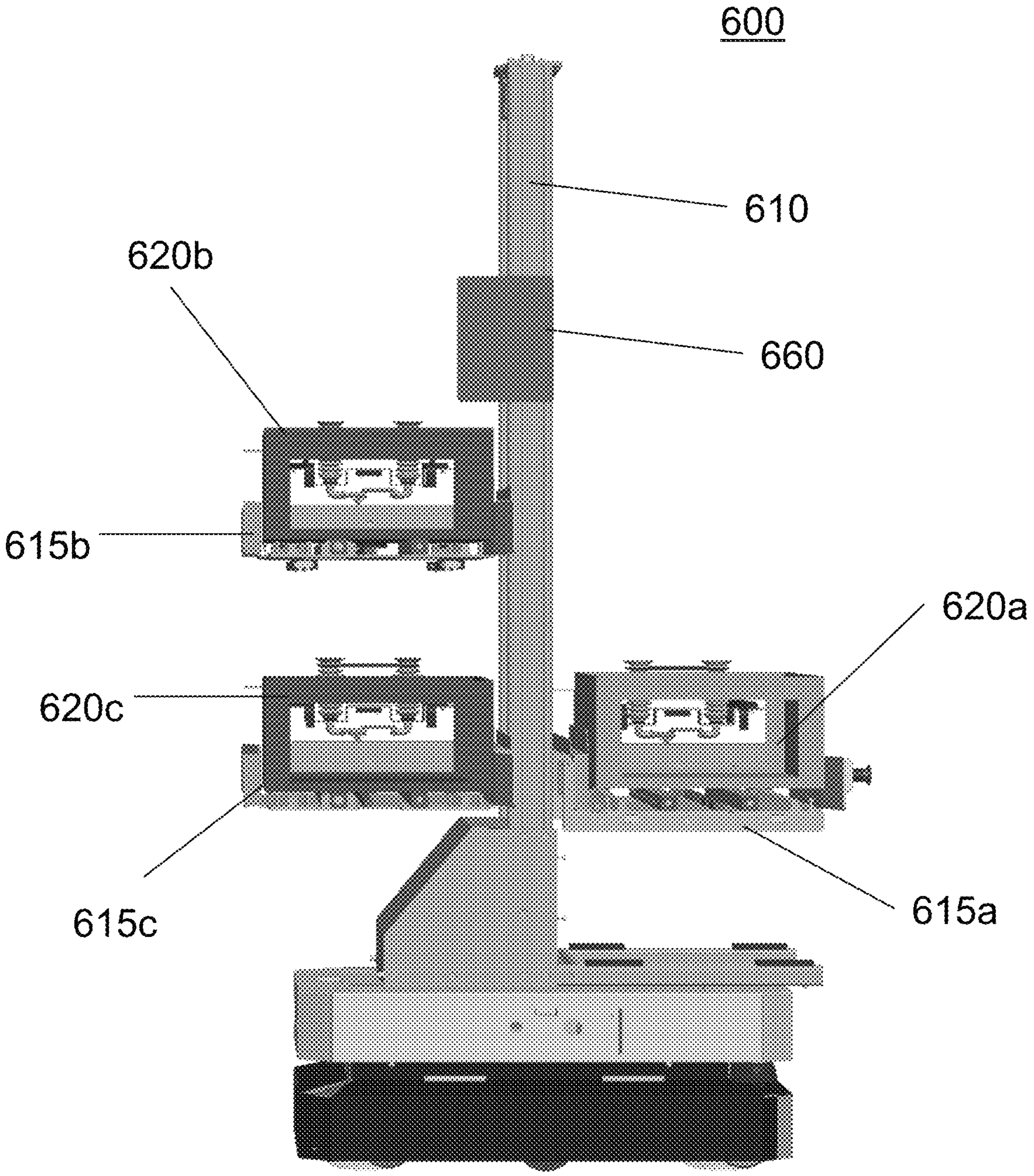
FIG. 9A shows a front view of another example mobile runner apparatus with only movable platforms.
Figure 9B:
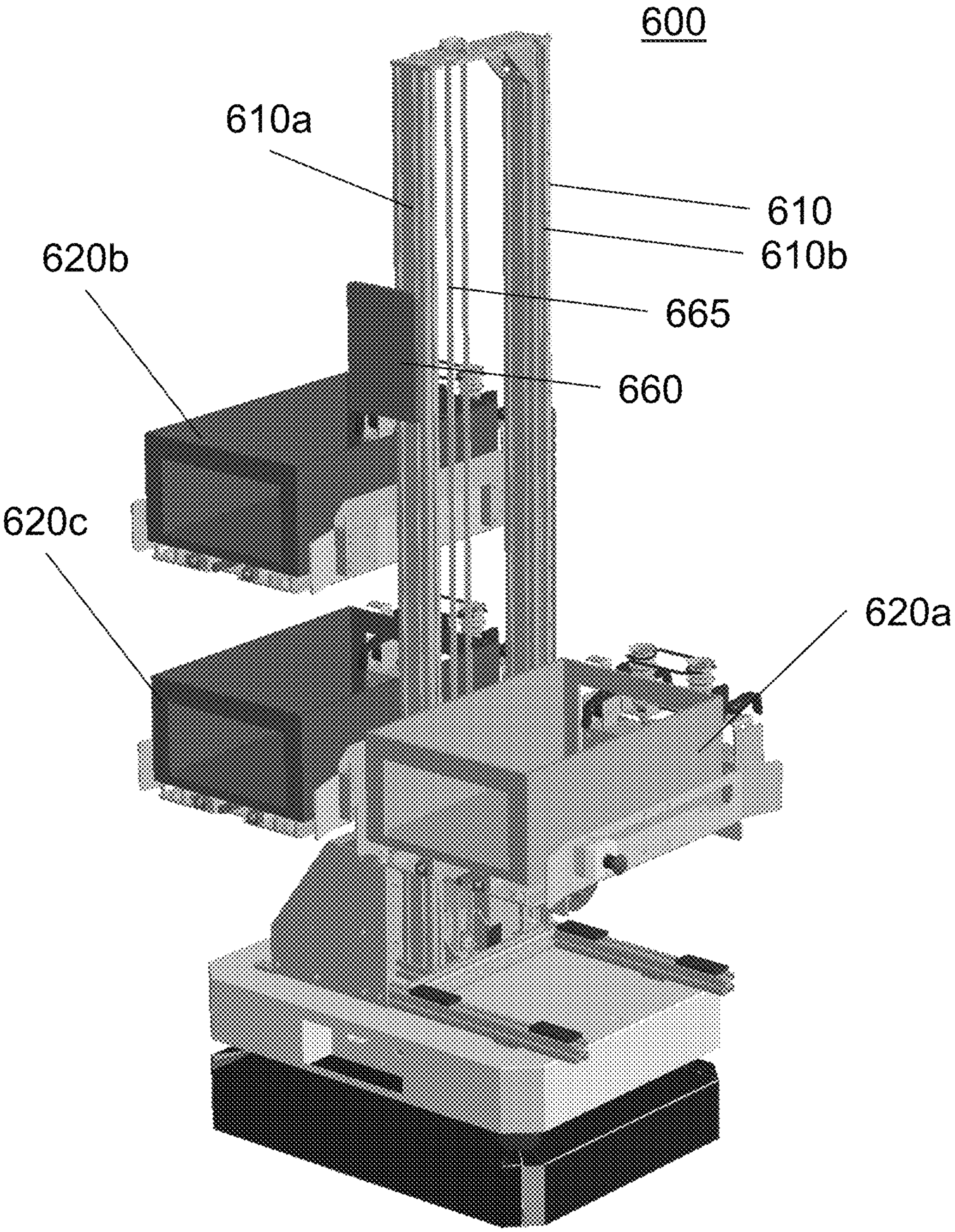
FIG. 9B shows a perspective view of the apparatus of FIG. 9B.
Figure 9C:
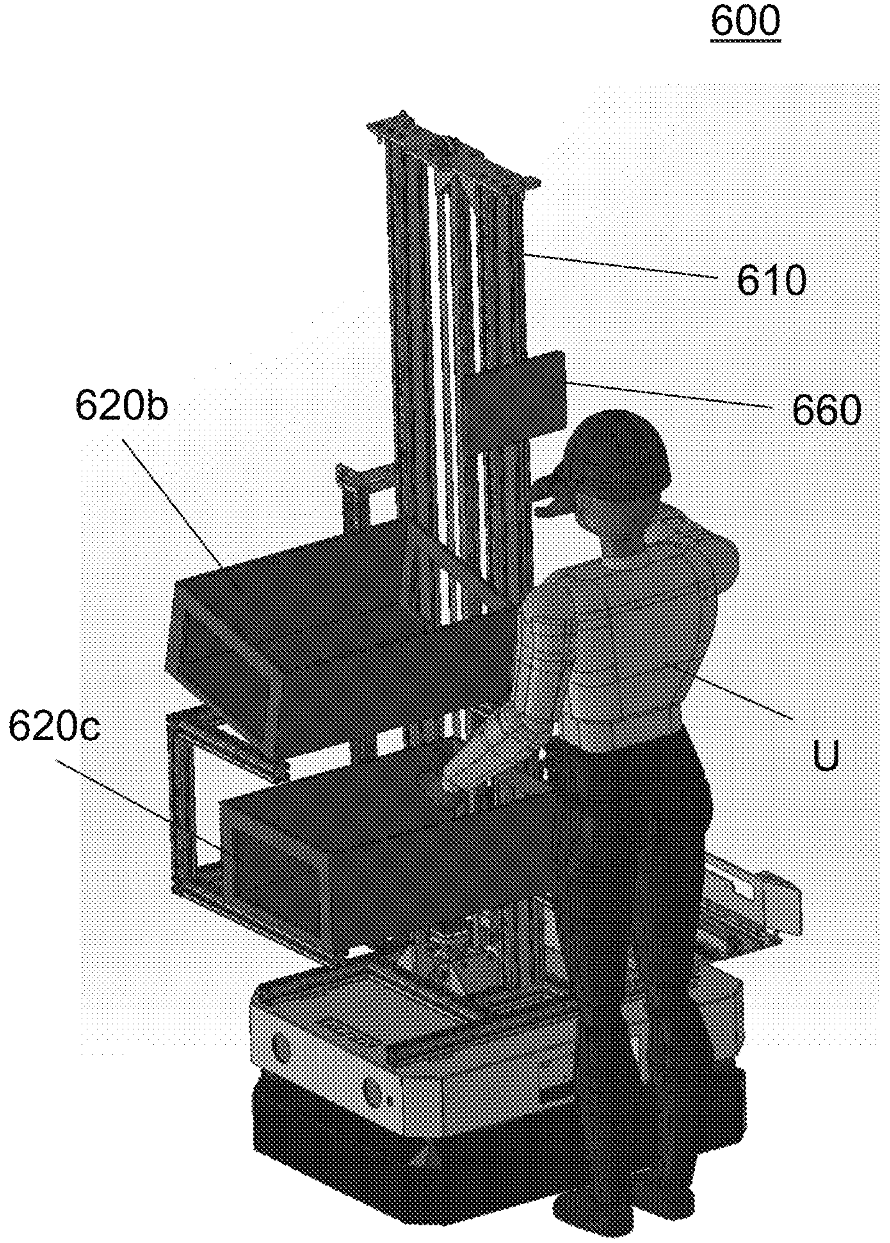
FIG. 9C shows the apparatus of FIG. 9A with the destination boxes placed such that the longer side of the boxes faces the user during use.

FIGS. 9A-9C show another example mobile runner apparatus 600 that can be used to improve the ease of manual picking by automating the process of retrieving and moving items to and from a human operator (shown as operator U in FIG. 9C) for picking. In this example, the apparatus 600 includes platforms 615*a*, 615*b*, and 615*c* supporting boxes 620*a*, 620*b*, and 620*c*, respectively. The platforms 615*a*, 615*b*, and 615*c* can each be movably coupled to a frame 610. Similar to the apparatus 500, the apparatus 600 can be used in scenarios where some manual picking is required and/or desired, such as for fragile items, large items, and/or non-standardized items. The apparatus 600 may include several of the same features, components, and/or subsystems as the apparatuses 100, 300, 400, 500, and 900. The apparatus 600 can further execute some operations in a similar manner to the apparatuses 100, 300, 400, 500, and 900 unless indicated otherwise (e.g., the process of retrieving or placing boxes). For brevity, repeated discussions of these features may not be provided below.

As shown, the apparatus 600 includes a frame 610 with frame arms 610*a* and 610*b*. The platform 615*a* can be disposed on one side of the frame 610 of the apparatus 600 and the platforms 615*b* and 615*c* can be disposed on another side of the frame 610 opposite to the platform 615*a*. The apparatus 600 further includes a set of belts 665 (shown here as a single belt for simplicity) that can be coupled to a lift engine (not shown). The lift engine and the belts can facilitate movement of the platforms 615*a*-615*c*. In some cases, each of the platforms 615*a*-615*c* can be independently movable to different heights along the frame 610. The platforms 615*a*-615*c* can thus be moved to different vertical positions along the frame 610, e.g., to facilitate loading and/or unloading of the boxes 620*a*-620*c*. Accordingly, each of the platforms 615*a*-615*c* can include a push-pull mechanism, such as the push-pull mechanism in the platforms 115*a* and 115*b* of the apparatus 100, to automate the loading and unloading of a box. For example, the platforms 615*b* and 615*c* can be moved to a desired vertical position to unload the boxes 620*b* and 620*c* onto a consolidation shelf. In another example, the platform 615*a* can be moved into alignment with a shelf to load or unload the box 620*a*. It should also be appreciated that the boxes 620*a*-620*c* can also be manually placed and/or removed by the operator U.

The apparatus 600 can further include an interface 660 (e.g., a touchscreen) to display information to the operator U, such as the number of items to be picked for each order. The interface 660 can be communicatively coupled to the processor of the apparatus 600 and/or the master server.

In one example use case, the apparatus 600 can retrieve the box 620*a* (e.g., as a source box from a shelf) and, optionally, the boxes 620*b* and 620*c* (e.g., from an area of the fulfillment center containing boxes for orders) and move the operator U. If there the boxes 620*b* and 620*c* are not placed on the apparatus 600, the operator can place the boxes 620*b* and 620*c* on the platforms 615*a* and 615*b*, respectively. The operator U can then proceed to move items from the box 620*a* to the boxes 620*b* and 620*c* for order fulfillment in a similar manner as the apparatus 500 described above.

It should be appreciated that the apparatus 600 can support the boxes 620*a*-620*c* in different orientations. For example, FIGS. 6A and 6B show the boxes 620*b* and 620*c* can be presented to the operator U along their shorter side and FIG. 6C shows the boxes 620*b* and 620*c* can be presented to the operator U along their longer side. More generally, any suitable orientation of any of the boxes 620*a*-620*c* is within the scope of the apparatuses described herein.

2.3 An Example Mobile Runner Apparatus with Platforms that Move Together

Figure 10:
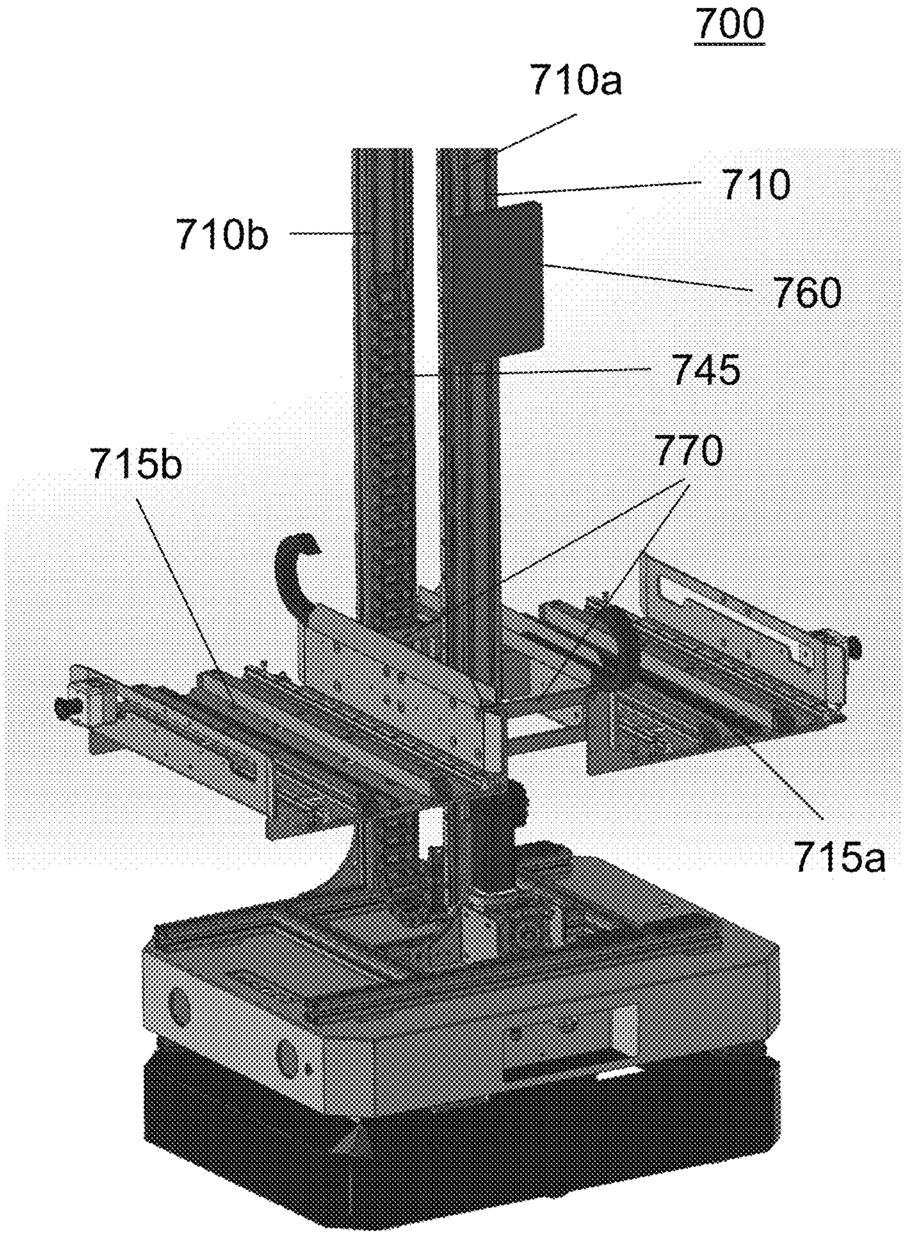
FIG. 10 shows another example mobile runner apparatus with movable platforms constrained to move together.

FIG. 10 shows another example mobile runner apparatus 700 that can be used to improve the ease of manual picking by automating the process of retrieving and moving items to and from a human operator for picking. In this example, the apparatus 700 includes a set of platforms 715*a* and 715*b* that are coupled together via one or more interconnects 770 and movably coupled to a frame 710. Thus, the platforms 715*a* and 715*b* are constrained to translocate together vertically up and down a track 745 of the frame 710. Similar to the apparatus 500 and 600, the apparatus 700 can be used in scenarios where some manual picking is required and/or desired, such as for fragile items, large items, and/or non-standardized items. The apparatus 700 may include several of the same features, components, and/or subsystems as the apparatuses 100, 300, 400, 500, 600, and 900. The apparatus 700 can further execute some operations in a similar manner to the apparatuses 100, 300, 400, 500, 600, and 900 unless indicated otherwise (e.g., the process of retrieving or placing boxes). For brevity, repeated discussions of these features may not be provided below.

As shown, the apparatus 700 includes a frame 710 with frame arms 710*a* and 710*b*. The platforms 715*a* and 715*b* are movably coupled to the frame arms 710*a* and 710*b*. Although not shown, each of the platforms 715*a* and 715*b* can support a box, which can be loaded and/or unloaded using respective push-pull mechanisms in the platforms 715*a* and 715*b* (e.g., the push-pull mechanisms of the apparatus 100). By constraining the platforms 715*a* and 715*b* to move together along the frame arms 710*a* and 710*b* (e.g., via the interconnects 770), the apparatus 700 can be appreciably simplified. For example, the apparatus 700 can include a single motor and/or belt to move the platforms 715*a* and 715*b* along the frame 710 rather than multiple motors and/or belts to independently move the platforms 715*a* and 715*b*, thus reducing material costs. Additionally, the platforms 715*a* and 715*b* can be arranged to be at the same vertical position along the frame, which can make it easier for a human operator to pick between the boxes.

As shown, the apparatus 700 can further include an interface 760 (e.g., a touchscreen) for an operator to interact with the apparatus 700, such as for order fulfillment. The interface 760 can be communicatively coupled to the picker processor and/or the master server.

Figure 11A:
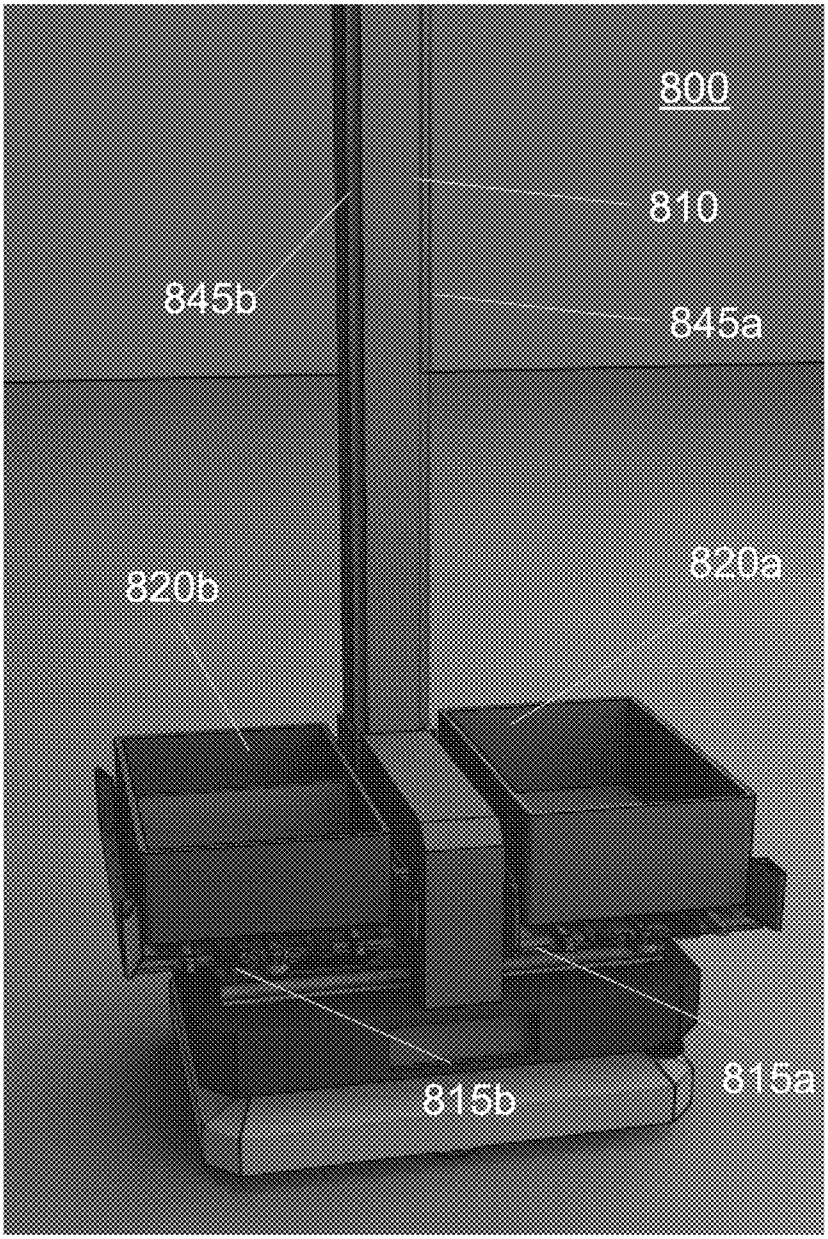
FIG. 11A shows another example mobile runner apparatus configured for use with a stationary automatic picker apparatus.
Figure 11B:
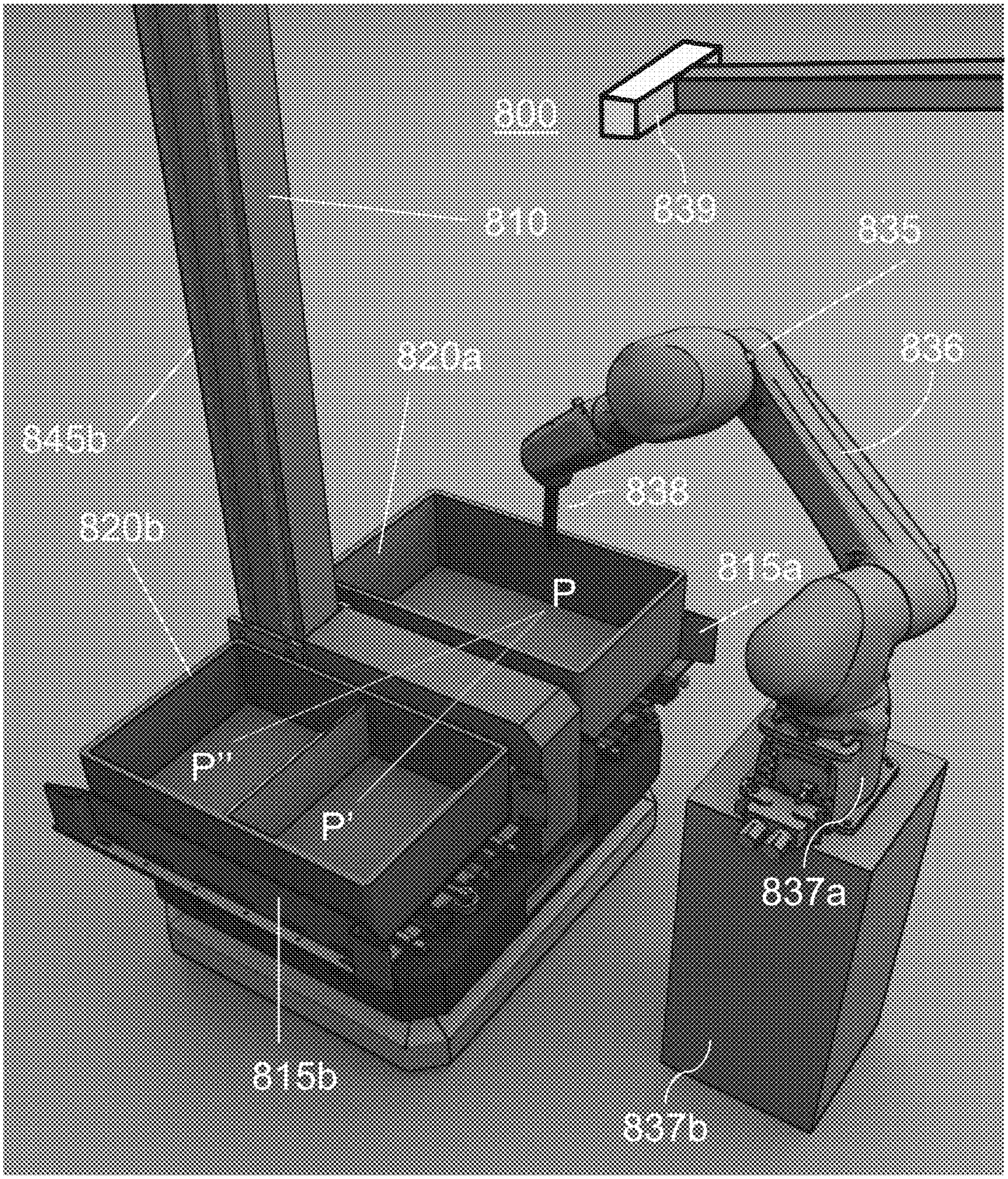
FIG. 11B shows the mobile runner apparatus of FIG. 11A near an example picker apparatus where the picker apparatus is shown picking between the boxes disposed on the mobile runner apparatus.

2.4 an Example Mobile Runner Apparatus Used with a Stationary Picker Apparatus FIGS. 11A-11D show an example mobile runner apparatus 800. In this example, the apparatus 800 is configured for use with a stationary automated picker apparatus 835. For example, FIG. 11B shows the picker apparatus 835 picking between boxes 820*a* and 820*b* supported by the apparatus 800. The apparatus 800 can thus be used to improve the ease of automated picking, in part, by providing a design that does not impede the movement of the picker apparatus 835 when interacting with the apparatus 800. The apparatus 800 may include several of the same features, components, and/or subsystems as the apparatuses 100, 300, 400, 500, 600, 700, and 900. The apparatus 800 can further execute some operations in a similar manner to the apparatuses 100, 300, 400, 500, 600, 700, and 900 unless indicated otherwise (e.g., the process of retrieving or placing boxes). For brevity, repeated discussions of these features may not be provided below.

The picker apparatus 835, which is shown in FIG. 11B, can be similar to or the same as the automated picker apparatuses described in the '470 application. In brief, the picker apparatus 835 can include a robotic arm 836. The robotic arm 836 can be fixedly attached to a base 837*a* and/or a pedestal 837*b*, or even the floor of the warehouse (not shown), to prevent translocation, for mechanical support, and/or the like. In some cases, the robotic arm 836 is a 4-axis, 5-axis, or 6-axis robotic arm with a reach (e.g., horizontal reach from its affixed location) of about 0.5 m, about 1 m, about 2 m or more, including all values and sub-ranges in between. The term "about," when used to describe the reach of the picker apparatus 835, is intended to cover variations and/or tolerances due to manufacture and assembly. For example, "about 1 m" can correspond to the following ranges: 0.99 to 1.01 m (+/−1% variability), 0.98 to 1.02 m (+/−2% variability), 0.97 to 1.03 m (+/−3% variability), 0.96 to 1.04 m (+/−4% variability), 0.95 to 1.05 m (+/−5% variability), including all values and sub-ranges in between.

The arm 836 includes or is coupled to a gripper 838 configured to manipulate items, such as to pick, transfer, and/or place items. Generally, the arm 836 and the gripper 838 can operate in a similar or same manner as the picker robot 125 described above with respect to the mobile picker apparatus 100. As an example, the gripper 838 can include one or more suction cups with a diameter ranging from approximately 0.5 cm to approximately 15 cm, including all values and subranges in between. The suction cups can further be operably coupled to a pump (e.g., on board the picker apparatus 835 or located elsewhere in the fulfillment center). In some cases, the gripper 838 can include a linear or 2-dimensional array of suction cups of varying sizes according to the dimension ranges recited above. The arm 836 can have a load bearing capacity of about 5 kg or less, about 5 kg, about 8 kg, about 10 kg or more, including all values and sub-ranges in between. In some cases, the picker apparatus 835 can include a dual-arm assembly with two arms to improve picking speed. For example, one arm can be used to pick relatively smaller/lighter items and another arm can be used to pick relatively larger/heavier items where each arm has its own set of suction cups. The suction cups used for the arms can be the same size (of an individual suction cup) or different and have the same or different number of suction cups.

Additionally, a camera assembly 839 can be deployed near the picker apparatus 835 to acquire imagery of the items in the boxes 820*a* and 820*b*, which can be used to guide the picker apparatus 835 when picking items, for example, from the box 820*a*. The camera assembly 839 can include the same components as the camera assembly 160 described above with respect to the apparatus 100 and operate in the same manner. As shown in FIG. 11B, the camera assembly 839 can be mounted to another structure in the fulfillment center. The camera assembly 839 can further be communicatively coupled to the picker apparatus 835 and/or the apparatus 800.

Generally, the camera assembly 839 can be disposed in any location where it can scan the volume of a box presented by one or more mobile runner apparatuses (e.g., the box 820*a*) when in position around the picker apparatus 835, i.e., where the box is within a scanning range of the camera assembly 839. This arrangement can result in quicker operation and shorter cycle time (e.g., time to move an item from a source box to a destination box), since scanning can begin immediately after the apparatus 800 arrives proximate to the picker apparatus 835.

The picker apparatus 835 can further include one or more processors to operate the picker apparatus 835 and a memory/database. The process of picking an item from a source box and placing the item into a destination box can be similar to the approaches described above for the picker robot 125. The picker apparatus 835 can also be communicatively coupled to the master server and/or the different mobile robots (e.g., one or more mobile picker apparatuses, one or more mobile runner apparatuses) in the fulfillment center to coordinate operation.

As shown, the apparatus 800 includes a set of platforms 815*a* and 815*b* movably coupled to a single frame arm 810. Specifically, the platforms 815*a* and 815*b* can vertically translocate up and down along the frame arm 810 via tracks 845*a* and 845*b*. The frame arm 810 can be positioned such that the picker apparatus 835 is unimpeded by the frame arm 810 when moving items between the boxes 820*a* and 820*b* along a selected trajectory (e.g., the shortest path) between the boxes 820*a* and 820*b*, as shown in FIG. 111B. For example, FIG. 11B shows two example trajectories: 1) a first path P-P' from the box 820*a* to a first compartment of the box 820*b*; and 2) a second path P-P" from the box 820*a* to a second compartment of the box 820*b*. The inclusion of boxes with multiple compartments can provide appreciably space savings particularly for fulfillment centers that stock a relatively large number of different low-volume stock items.

Figure 11C:
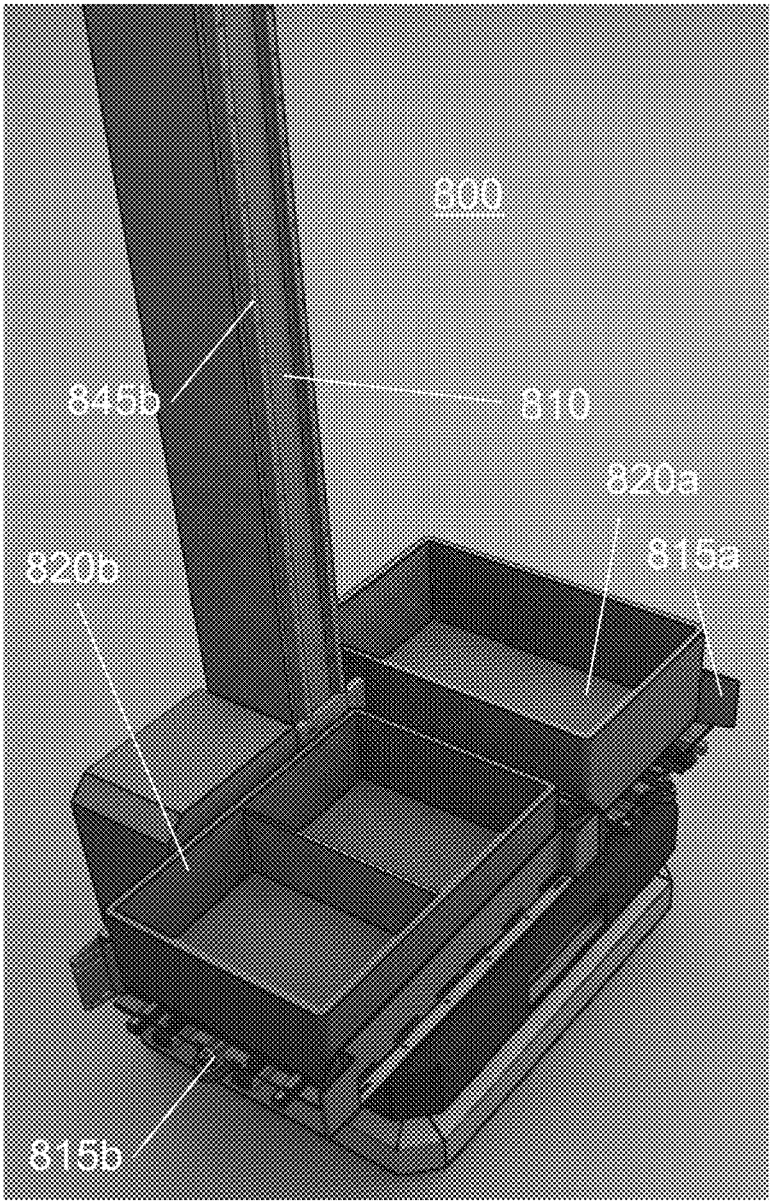
FIG. 11C shows the mobile runner apparatus of FIG. 11A with a destination box placed such that the longer side of that box faces the picker apparatus during use.

FIG. 11C shows an alternative design of the apparatus 800 where the platform 815*b* is oriented such that a box 820*b* (e.g., a destination box) supported by the platform 815*b* is presented to the picker apparatus 835 along its longer side. As a result, the track 845*b* is disposed on a side of the frame arm 810 that faces the picker apparatus 835.

3. EXAMPLE LAYOUTS OF A FULFILLMENT CENTER

Aspects disclosed herein are directed to the use and/or deployment of various combinations of the apparatuses 100, 300, 400, 500, 600, 700, 800, and 900 described herein, depending on the warehouse design, the items in a specific order to be fulfilled, and/or the like. In one example, one type of mobile picker apparatus can be deployed throughout the fulfillment center, which can simplify picking since any of the apparatuses can perform picking. In another example, based on speed requirements and/or cost factor, a suitable mix of mobile runner apparatuses and mobile picker apparatuses can be deployed, with the former providing just a runner capability and the latter providing both runner and picker capabilities. For instance, in typical fulfillment centers, there are often some items that are unsuitable for automated picking (e.g., fruits, glass items, frozen items, and/or the like), and it is desirable to have a human operator to pick those items. The benefits of faster picking can still be realized with mobile runner apparatuses bringing and presenting these items to the human operator. The remainder of the items at the fulfillment center can be processed by automated picking using the mobile picker apparatuses.

The fulfillment center can further include one or more picker apparatuses and/or one or more runner apparatuses as described in the '470 application. For example, the center can include one or more mobile picker apparatuses and/or mobile runner apparatuses described herein, and further include a) one or more picker apparatuses as described in the '470 application, b) one or more runner apparatuses as described in the '470 application, or both.

Generally, a fulfillment center as described herein can include a master server to control the various mobile picker apparatuses and/or mobile runner apparatuses deployed in the fulfillment center. The various apparatuses described herein can further be organized into logical groupings and/or physically constrained groupings (e.g., apparatuses confined to one section of the fulfillment center) referred to as segments. Each segment can generally include at least one apparatus capable of picking (e.g., the mobile picker apparatuses 100, 300, 400, and 900, the picker apparatus 835) and/or at least one mobile apparatus capable of retrieving and returning boxes (e.g., the mobile picker apparatuses 100, 300, 400, and 900, the mobile runner apparatuses 500, 600, 700, and 800, or the runner apparatuses as described in the '470 application). A separate management server/device can communicate with the fulfillment center (e.g., the master server in particular) to carry out order fulfillment and other activities.

Figure 12A:
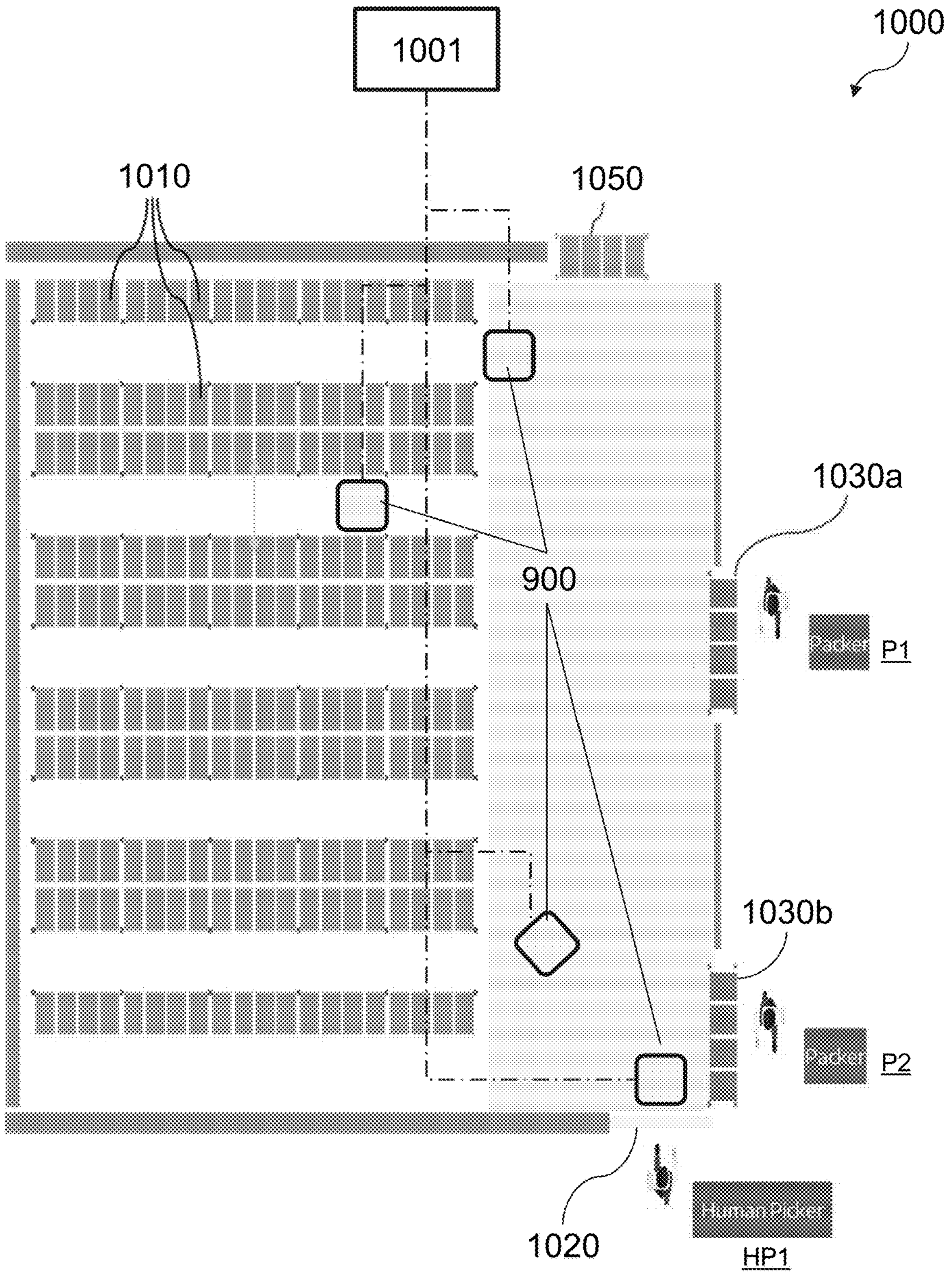
FIG. 12A shows an example layout of a warehouse that includes multiple mobile picker apparatuses.

FIG. 12A shows an example layout of a warehouse 1000 for a fulfillment center that includes the mobile picker apparatuses 900 disclosed herein. It should be appreciated that any of the mobile picker apparatuses 100, 300, or 400 can also be used. As shown, the warehouse 1000 includes a master server 1001 communicatively coupled to the apparatuses 900. During operation, the master server 1001 can transmit instructions to each apparatus 900 (e.g., instructions on what source boxes to retrieve and their location, what items to pick from the source boxes, which destination box to place the picked items, where to place the source boxes after picking, and so on). This can be accomplished, for example, via a network (not shown) where the master server 1001 and each of the apparatuses 900 are communicatively coupled to the network via a wireless connection (e.g., via an antenna onboard the apparatus 900) or a wired connection (e.g., an Ethernet cable connection to the master server 1001).

The warehouse 1000 includes a storage system 1010, which can include multiple shelving units that each have multiple shelves disposed at various heights to store source boxes of stock items. The shelving units can be arranged in rows or aisles such that the mobile picker apparatus 900 can navigate and access any source box in the storage system 1010. The warehouse 1000 further includes output/consolidation shelves 1030*a* and 1030*b* for the apparatuses 900 to place destination boxes with complete orders (i.e., all the items in the order are picked and placed into a destination box). A human packer P1 can manage the contents of the shelf 1130*a* from the other side.

Figure 13:
FIG. 13 shows an example shelf unit with multiple shelves supporting boxes for retrieval and placement.

In one example, FIG. 13 shows an example shelving unit 1012 in the storage system 1010 with apparatuses 900*a* and 900*b* interacting with the shelving unit 1012 (e.g., retrieving a source box 1020). As shown, the shelving unit 1012 includes multiple shelves 1014 located at different heights that are configured to support multiple source boxes 1020. In one example, the shelving unit can be a standard shelving unit with a height, $h_1$, of about 3 meters. The lowest shelf can generally be located above the lowest vertical position of the platforms 915*a* and 915*b*. For example, the lowest shelf can be located at a height, $h_2$, of about 0.3 meters to about 0.5 meters off the ground. Generally, the height of each shelf can be similar to or the same as the height of the box to increase the packing density of the stock items stored on the shelving unit 1012. The term "about," when used to describe the dimensions of the shelving unit 1012, is intended to cover variations due to manufacture and assembly. For example, "about 1 m" can correspond to the following ranges: 0.99 to 1.01 m (+/−1% variability), 0.98 to 1.02 m (+/−2% variability), 0.97 to 1.03 m (+/−3% variability), 0.96 to 1.04 m (+/−4% variability), 0.95 to 1.05 m (+/−5% variability), including all values and sub-ranges in between.

The mobile robots described herein can generally accommodate shelving units of different heights, shelving units with a different number of shelves, and/or shelves located at different heights. For example, the mobile robot can be calibrated to use a particular shelving unit before operation. This can be accomplished, for example, by providing the mobile robot (e.g., via transmission from the master server), calibration data on the heights of each shelf in the shelving unit. This calibration data can then be stored in onboard memory of the mobile robot and referenced whenever the mobile robot interacts with the shelving unit.

FIG. 12A further shows the warehouse 1000 includes a manual picking station 1020 operated by a human picker HP1. The manual picking station 1020 can be used, for example, to pick items that are too bulky, fragile, and/or otherwise unmanageable or unpickable by the apparatuses 900. The human picker HP1 can interface the apparatus(es) 900 holding source boxes with these items and manually sort them. For example, the human picker HP1 can place these items onto a designated apparatus 900 with boxes to carry these items. The designated apparatus 900 can, in turn, move and offload the boxes with these items onto the consolidation shelf 1030*b*. In this manner, the human picker HP1 can perform the picking process instead of the apparatus 900. However, the runner capabilities of the apparatus 900 can still be utilized. Another human packer P2 can then manage the contents of the shelf 1030*b*.

FIG. 12A also shows the warehouse 1100 includes a replenishment shelf 1050, which can be used to replenish stock items in a particular source box and/or compartment of the source box. The apparatus 900 can detect when a stock item in a particular source box is running low. This can be accomplished, for example, using the camera assembly 960 to acquire imagery of the items contained in a source box. Based on this imagery, it can be determined (e.g., by the processor of the apparatus 900, and/or the master server 1001) whether any stock items are running low. For example, a stock item can be considered to be running low when its quantity is equal to zero or falls below a threshold number. The threshold number can further be different for different stock items. If a stock item is determined to be running low, the apparatus 900 can move the source box to the replenishment shelf 1050.

As shown, the packers P1, P2 and the human picker HP1 can operate from outside the walls of the warehouse 1000 for safety purposes. However, it should be appreciated that, in some warehouse layouts, human operators can work in the same environment as the apparatuses disclosed herein. For example, each apparatus 900 can be configured to detect the presence of human workers in the environment. If the apparatus 900 is going to collide with the human worker (e.g., based on the velocity of the apparatus 900 and the distance between the apparatus 900 and the human worker), the apparatus 900 can be configured to either stop or modify its route to avoid the collision.

Figure 12B:
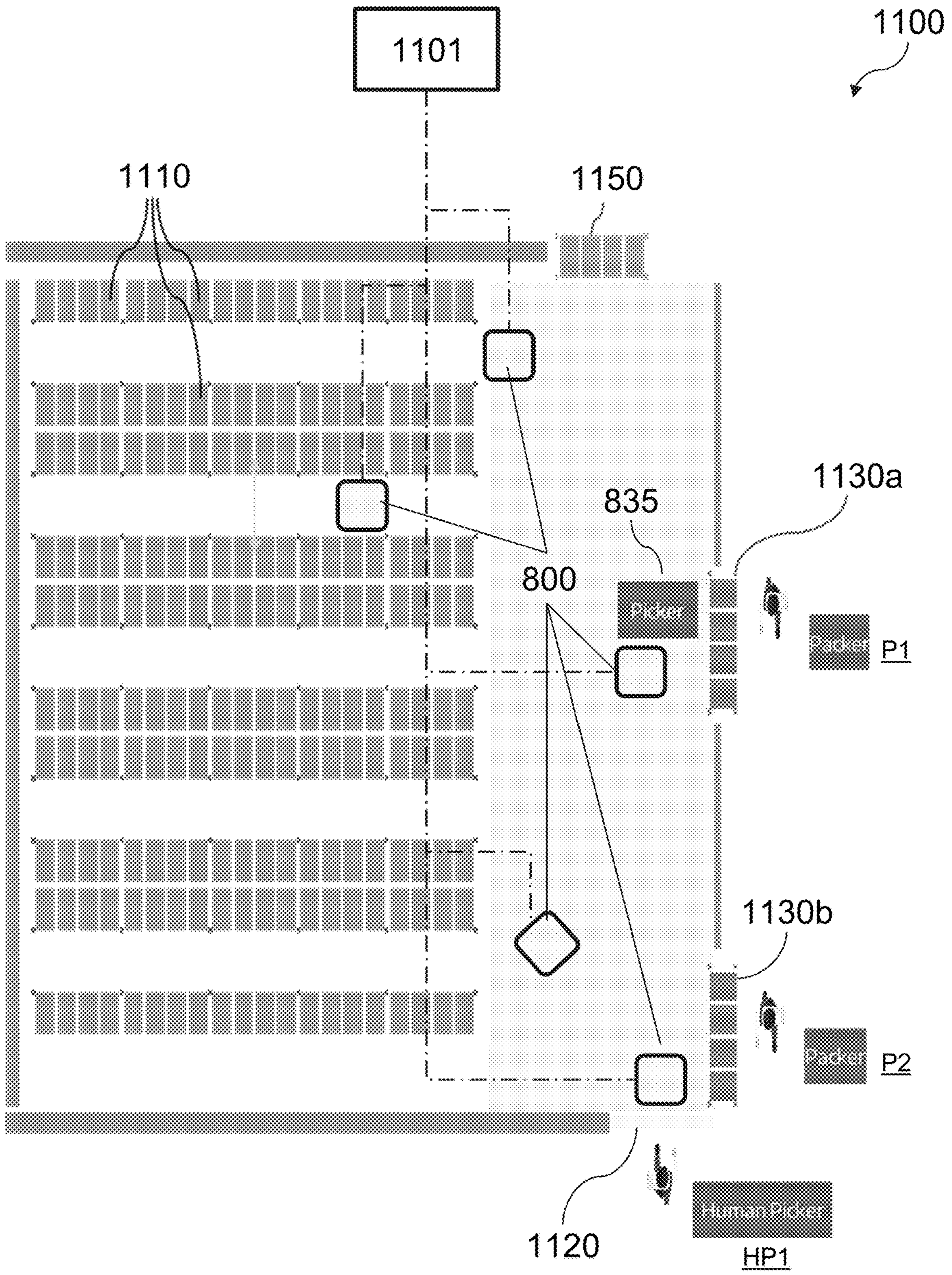
FIG. 12B shows an example layout of a warehouse that includes multiple mobile runner apparatuses.

FIG. 12B shows another example layout of a warehouse 1100 for a fulfillment center that includes multiple mobile runner apparatuses 800 as disclosed herein. It should be appreciated that any of the mobile runner apparatuses 500, 600, or 700 can also be used. As shown, the warehouse 1100 includes a single picker apparatus 835 though it should be understood more picker apparatuses 835 can be deployed. The apparatuses 800 can move source boxes storing items from shelves in the storage system 1110 to the picker apparatus 835 for picking. This can be facilitated, in part, by a master server 1101 transmitting instructions to each apparatus 800 to follow (e.g., instructions on what source boxes to retrieve and their location, where to place the source boxes after picking, and so on). The apparatuses 800 can also support destination boxes containing items for one or more orders. Once the picker apparatus 835 picks items from a source box and places the items into a destination box, the apparatus 800 can either return the source box to the storage system 1110 and retrieve another source box containing another item in the order or, if the order is complete, move the destination box to an output/consolidation shelf 1130*a*. Thereafter, the apparatus 800 can retrieve another destination box corresponding to another order and repeat the process. In some cases, the picker 835 can be operably coupled to the output/consolidation shelf 1130*a*. Thus, the picker 835 can pick items from source boxes and place them directly into destination boxes located at the output/consolidation shelf 1130*a*. A human packer P1 can manage the contents of the shelf 1130*a* from the other side.

FIG. 12B further shows the warehouse 1100 includes a manual picking station 1120 operated by a human picker HP1. The manual picking station 1120 can be used, for example, to pick items that are too bulky, fragile, and/or otherwise unmanageable or unpickable by the picker apparatus 835. The human picker HP1 can interface the apparatus (es) 800 holding source boxes with these items and manually sort them. For example, the human picker HP1 can place these items onto a designated apparatus 800 with boxes to carry these items. The designated apparatus 800 can, in turn, move and offload the boxes with these items onto another shelf 1130*b*. In this manner, the human picker HP1 replaces the automated picker apparatus 835 for these items. Another human packer P2 can then manage the contents of the shelf 1130*b*.

FIG. 12B also shows the warehouse 1100 includes a replenishment shelf 1150, which can be used to replenish stock items in a particular source box and/or compartment of the source box. The automated picker 835 can detect when a stock item in a particular source box is running low. This can be accomplished, for example, using a camera assembly operably coupled to the picker 835, such as the camera assembly 839, to acquire imagery of the items contained in a source box. Based on this imagery, it can be determined (e.g., by the processor of the picker 835, the processor of the apparatus 800, and/or the master server 1101) whether any stock items are running low. For example, a stock item can be considered to be running low when its quantity is equal to zero or falls below a threshold number. The threshold number can further be different for different stock items. If a stock item is determined to be running low, the apparatus 800 can move the source box to the replenishment shelf 1150.

3.1 Warehouse Mapping

Any of the mobile robots described herein (e.g., the apparatuses 100, 300, 400, 500, 600, 700, 800, and 900) can be configured to use a digital map of the environment of the fulfillment center (e.g., the warehouse) to approximate its position within the environment. For example, if multiple mobile robots are deployed to operate in a fulfillment center (e.g., one or more mobile picker apparatuses and/or one or more mobile runner apparatuses, as disclosed herein), a single apparatus can be employed to map out the entire warehouse and/or environment of the fulfillment center. Thereafter, the same digital map can be distributed to other apparatuses for use in guiding the different apparatuses through the environment (e.g., by the master server). In another example, each apparatus can be configured to generate its own digital map, update its own digital map (e.g., in real time), and/or transmit updates to the digital map (e.g., in real time) as it traverses the environment during routine operation. In this manner, each apparatus can update the global digital map for other apparatuses based on changes to the layout of the environment (e.g., movement of furniture, addition or removal of shelving units, relocation of picking stations, and/or the like).

In the following, an approach is described to generate a digital map using a mobile robot. For simplicity, this explained with respect to the apparatus 100, but this approach can be executed by any other mobile robot disclosed herein. The processor of the apparatus 100 can use any suitable simultaneous localization and mapping (SLAM) approach to construct and update a digital map of the environment. In some cases, no status indication of position information (e.g., magnetic tracks, optical codes, and/or the like) are employed. Additionally, the process of updating the digital map can be dynamic and substantially in real time.

Briefly, the apparatus 100 can be configured to read its wheel-coupled odometry sensors to determine its approximate position. It should be appreciated that other tracking techniques (e.g., spatial tracker devices, magnetic tracking tape, optical marks, etc.) can be employed. Then, using cameras and/or other sensors onboard the apparatus 100, the apparatus 100 can scan its surroundings to locate known landmarks, objects, and/or surfaces expected to be seen at this position. If the landmark is closer or farther than expected, it uses that information to adjust its approximate position. SLAM approaches can also be used to update the digital map of the apparatus 100. For example, if the apparatus 100 encounters a new (previously unseen) landmark, or an old/known landmark (previously detected) is not detected, but a sufficient/threshold number of other old landmarks are detected, that particular landmark is added or removed, respectively. The combination of odometry and sensor-based approaches can result in more precise position approximation of the apparatus 100.

During operation, the apparatus 100 can follow a series of commands/instructions from the master server, which can include, for example, a desired target location where to move (target location and orientation), and where to put a particular box, from where to take the box (including height of the box), what items to move between boxes loaded onto the picker apparatus 100, and/or the like. The commands/instructions can sometimes define a waiting time such as, for example, a time period in which the picker apparatus 100 moves to, and couples to, a charging station within the fulfillment center and stays in place to recharge. In some cases, the commands/instructions can also define optional midpoint(s) of a desired route for the apparatus 100 to yield a faster route, and/or a route that produces a more predictable behavior. For example, if there is an obstacle on the route and the apparatus 100 moves too close to the obstacle due to imprecision in positioning or localization, it would eventually stop, withdraw/reverse, and ultimately correct its position, which can be time consuming. However, if a midpoint has been previously defined that in turn defines a curve with a large diameter that would circumvent the obstacle, the apparatus 100 can use that curved route to just move around the obstacle instead. Midpoints can also be useful for avoiding potential crossings where routes of two or more apparatuses intersect. In such cases, since there is some probability of multiple apparatuses being at that intersection at the same time, the use of midpoints can be used for maneuvering in those circumstances.

In some cases, the commands/instructions can also define speed and/or acceleration of the apparatus 100 on different parts of its prescribed route. This can provide for safer and smoother movement such as, for example, when rounding a curve or corner where it is desirable to slow down to avoid tipping the apparatus 100, to prevent any box the apparatus 100 is carrying from falling off its platform, to prevent items from falling out of the box due to inertia, to prevent-inertia driven errors due to the apparatus 100 performing a picking operation while moving, and/or the like.

3.2 Charger/Charging Station

The mobile robots described herein can interface with one or more charging stations placed at known, defined locations around the fulfillment center for charging. For example, the master server can monitor the charging status of the apparatuses (e.g., based on battery status, charge level, and/or other battery-related information received from each apparatus), and instruct any apparatus to move to a designated charging location to charge a rechargeable battery of that apparatus. Generally, any suitable charging strategy can be independently applied for each apparatus such as, off-peak, when-needed, and/or the like. As an example, some apparatuses can employ a lead-acid battery, and it may be preferable to deep-cycle its re-charging, i.e., permit the batter to substantially fully discharge, and then fully recharge the battery, which can take some time that is not desirable during business hours. In such cases, the master server can be configured to affect charging of that apparatus during off-peak hours, during evening hours, overnight, and/or the like.

In another example, some apparatuses can employ batteries that are relatively agnostic to partial charge-discharge. In such cases, the master server can be configured to recharge all apparatuses with battery levels below a predetermined threshold before peak/busy hours of operation.

In yet another example, some apparatuses can employ lower capacity batteries such as, for example, super-capacitor-based batteries, that recharge rapidly. In such cases, the master server can be configured to charge them, for example, during box presentation, i.e., at a charging station near a picker apparatus, after an order is fulfilled (e.g., after placing the destination box onto a consolidation shelf and before loading another empty destination box for another order), and/or the like. Said another way, the apparatus can get recharged every few runs.

4. ADDITIONAL EXAMPLES

Following below are additional examples of mobile robots and methods for using a mobile robot to provide order fulfillment.

4.1 Example 1

In another illustrative example, a mobile picker apparatus configured to operate in an environment to facilitate order fulfillment includes a body portion, a set of wheels coupled to the body portion to move the apparatus within the environment, a frame coupled to the body portion, a set of platforms movably coupled to the frame, and a picker robot coupled to the frame configured to pick an item from the first box and place the item in the second box. The set of platforms further include a first platform configured to support a first box, a first push-pull mechanism coupled to the first platform and configured to load the first box onto the first platform and unload the first box from the first platform, a second platform configured to support a second box, and a second push-pull mechanism coupled to the second platform and configured to load the second box onto the second platform and unload the second box from the second platform.

Each platform of the set of platforms can be independently movable. Each platform of the set of platforms can be configured to move together with other platforms of the set of platforms. The first platform and the second platform can be configured to move together along a vertical direction and the first platform can be located at a first vertical position along the frame and the second platform can be located at a second vertical position identical to the first vertical position along the frame. The set of platforms can further comprise a third platform configured to support a third box where the third platform includes a sliding mechanism configured to move the third box from a first position where the third box is disposed above the second box and prevents access, by the picker robot, to the second box, to a second position that provides the picker robot access to the second box. The set of platforms can be movable along a vertical direction with a vertical range of travel ranging from about 2 meters to about 4 meters. In some instances, the vertical range of travel can be equal to about 3 meters. The apparatus can have at least one horizontal dimension less than or equal to about 1 meter. The first push-pull mechanism can comprise a suction cup configured to pull the first box onto the first platform when loading the first box and a push stick configured to push the first box off the first platform when unloading the first box. The apparatus can further include a pump, operably coupled to the suction cup of the first push-pull mechanism, to generate vacuum suction at the suction cup to facilitate attachment of the first box to the suction cup.

The picker robot can include a Selective Compliance Articulated Robot Arm (SCARA) robotic arm. The picker robot can have six degrees of freedom. The picker robot can have less than six degrees of freedom. For instance, the picker robot can have four degrees of freedom. The picker robot can comprise a robotic arm and a gripper coupled to the robotic arm to pick the item. The set of platforms can be movable along a vertical direction with a first range of travel, the robotic arm can be rigidly coupled to the frame, the gripper can be movable, via the robotic arm, along the vertical direction with a second range of travel less than and overlapping the first range of travel, and the picker robot can be configured to pick the item from the first box only when the first platform is moved near the picker robot such that the item is within the second range of travel of the gripper. The robotic arm can comprise a set of arms and a set of rotary joints where each arm of the set of arms is coupled to another arm of the set of arms via a different rotary joint of the set of rotary joints and each rotary joint of the set of rotary joints has one rotation axis oriented vertically. The gripper can include a suction cup and the apparatus can further include a pump, operably coupled to the suction cup, to generate vacuum suction at the suction cup thereby facilitating attachment of the item to the gripper. The picker robot can be rigidly coupled to the frame. The picker robot can be movable along the frame.

The apparatus can further include a camera assembly, coupled to the frame, configured to acquire imagery of at least the item in the first box. The camera assembly can comprise a camera and a robotic arm, coupled to the camera and the frame, to change at least one of a position or orientation of the camera. The camera assembly can further include a locking mechanism, coupled to the robotic arm and the camera, to lock the robotic arm and the camera in a pose. The pose of the robotic arm and the camera can allow the set of platforms to move past the camera assembly along the frame without physically contacting the camera assembly. The robotic arm can be coupled to the frame via a mounting plate rigidly coupled to the frame with the mounting plate having an opening and the locking mechanism can include a push pull solenoid actuator with a movable shaft. The push pull solenoid actuator can extend the shaft through the opening of the mounting plate when engaging the locking mechanism and retract the shaft from the opening of the mounting plate when disengaging the locking mechanism. The camera assembly can further include a magnet coupled to the mounting plate and a magnetic sensor, coupled to the robotic arm, that detects the camera assembly is in the pose when the magnetic sensor is aligned to the magnet. The camera assembly can be rigidly coupled to the frame. The camera assembly can be movable along the frame.

The apparatus can further include at least one processor, memory, and a computer-readable storage medium, stored in the memory, which stores instructions that, when executed, cause the at least one processor to: A) move the apparatus to a shelf unit having a plurality of shelves; B) move the first platform in alignment with a first shelf of the plurality of shelves of the shelf unit, the first shelf containing the first box; C) load the first box from the first shelf to the first platform, the first box containing at least one item, the at least one item including an item for an order; D) acquire, by the camera assembly, imagery of the at least one item; E) determine, based on the imagery, a location of the item within the first box; F) pick, by the picker robot, the item from the first box based on the location; and G) place, by the picker robot, the item into the second box supported by the second platform.

The frame can include only one frame arm defining a vertical axis, the set of platforms can be directly coupled to the frame arm and movable along the vertical axis, and the picker robot can be directly coupled to the frame arm. The apparatus can further comprise a camera assembly directly coupled to the frame arm and configured to acquire imagery of at least the item in the first box where the camera assembly includes a robotic arm and a camera coupled to the robotic arm. The camera assembly can be rigidly coupled to the frame arm, the picker robot can be rigidly coupled to the frame arm, the camera and the robotic arm of the camera assembly can have a first pose such that, when the camera and the robotic arm is in the first pose and the set of platforms moves along the frame arm past the camera assembly, the set of platforms do not physically contact the camera assembly, and the picker robot can have a second pose such that, when the picker robot is in the second pose and the set of platforms moves along the frame arm past the picker robot, the set of platforms do not physically contact the picker robot.

The apparatus can further include the first box configured to contain a plurality of stock items and the second box configured to contain a plurality of picked items for one or more orders. The first box can include a plurality of compartments where each compartment of the plurality of compartments is configured to contain at least one stock item of the plurality of stock items. The respective compartments of the plurality of compartments can be configured to contain at least one stock item having a different stock keeping unit (SKU) or a universal product code (UPC). The second box can include a plurality of compartments where each compartment of the plurality of compartments is configured to contain at least one picked item of the plurality of picked items for a corresponding order. The respective compartments of the plurality of compartments are configured to contain at least one picked item for different orders.

4.2 Example 2

In another illustrative example, a mobile picker apparatus configured to operate in an environment to facilitate order fulfillment includes a body portion, a set of wheels coupled to the body portion to move the apparatus within the environment, a frame coupled to the body portion, a platform movably coupled to the frame along a vertical direction and configured to support a box, the platform having a first range of travel along the vertical direction, and a picker robot rigidly coupled to the frame. The picker robot includes a robotic arm having a first end rigidly coupled to the frame and a second end where the robotic arm provides less than six degrees of freedom of movement, and a gripper coupled to the second end of the robotic arm and movable, via the robotic arm, along the vertical direction. The gripper has a second range of travel along the vertical direction less than and overlapping with the first range of travel. The picker robot is configured to pick an item from the box only when the platform is moved near the picker robot such that the item is within the second range of travel of the gripper.

The picker robot can have less than six degrees of freedom. For instance, the picker robot has four degrees of freedom. The platform can be a first platform, the box can be a first box, the apparatus can further include a second platform, movably coupled to the frame along the vertical direction, configured to support a second box, and the picker robot can be configured to place the item picked from the first box into the second box.

The apparatus can further include a set of platforms movably coupled to the frame where the set of platforms includes the platform, and a camera assembly rigidly coupled to the frame. The camera assembly can include a robotic arm, a camera coupled to the robotic arm where the camera and the robotic arm have a first pose such that, when the camera and the robotic arm in the first pose and the set of platforms moves along the frame past the camera assembly, the set of platforms do not physically contact the camera assembly, and a locking mechanism, coupled to the robotic arm and the camera, to lock the robotic arm and the camera in the first pose. The picker robot can have a second pose such that, when the picker robot is in the second pose and the set of platforms moves along the frame past the picker robot, the set of platforms does not physically contact the picker robot.

4.2 Example 3

In another illustrative example, a mobile picker apparatus configured to operate in an environment to facilitate order fulfillment includes a body portion, a set of wheels coupled to the body portion to move the apparatus within the environment, a frame arm coupled to the body portion, a set of platforms movably coupled to the frame arm where each platform of the set of platforms is configured to support a box, a camera assembly rigidly coupled to the frame arm, and a picker robot coupled to the frame arm. The camera assembly includes a robotic arm, a camera coupled to the robotic arm where the camera and the robotic arm having a first pose such that, when the camera and the robotic arm in the first pose and the set of platforms moves along the frame arm past the camera assembly, the set of platforms do not physically contact the camera assembly, and a locking mechanism, coupled to the robotic arm and the camera, to lock the robotic arm and the camera in the first pose. The picker robot further has a second pose such that, when the picker robot is in the second pose and the set of platforms moves along the frame arm past the picker robot, the set of platforms do not physically contact the picker robot.

The robotic arm can be coupled to the frame arm via a mounting plate rigidly coupled to the frame arm where the mounting plate has an opening, and the locking mechanism can include a push pull solenoid actuator having a movable shaft. The push pull solenoid actuator can extend the shaft through the opening of the mounting plate when engaging the locking mechanism and retract the shaft from the opening of the mounting plate when disengaging the locking mechanism. The camera assembly can further include a magnet coupled to the mounting plate, and a magnetic sensor, coupled to the robotic arm, that detects the camera assembly is in the first pose when the magnetic sensor is aligned to the magnet.

4.4 Example 4

In another illustrative example, a mobile picker apparatus for order fulfillment includes a body portion and a set of wheels coupled to the body portion, to permit mobility of the apparatus. The apparatus further includes a frame coupled to the body portion, the frame including a track on a vertical portion of the frame. The apparatus further includes a set of platforms coupled to the frame, including a first platform to support a first box and a second platform to support a second box. The apparatus further includes a picker robot coupled to the track to permit the picker robot to translocate along the track on the vertical portion of the frame. The picker robot includes a handle and a set of arms disposed horizontally with respect to the vertical portion of the frame, the set of arms including a first arm coupled to the track and a second arm that includes or is coupled to the handle. The picker robot also includes a set of rotary joints, each arm of the set of arms being coupled to at least one other arm of the set of arms via a different rotary joint of the set of rotary joints. The picker robot further includes a gripper coupled to the handle of the picker robot. The apparatus further includes a first motor coupled to the picker robot to permit the picker robot to translocate along the track on the vertical portion of the frame. The apparatus further includes a set of second motors, each second motor of the set of second motors coupled to a corresponding rotary joint of the set of rotary joints to controllably move the gripper during use. The apparatus also includes a processor communicably coupled to the first motor to control movement of the picker robot along the track, the processor further communicably coupled to the set of second motors to control operation of each rotary joint of the picker robot such that during use, the picker robot and the gripper are configured to pick an item from the first box to the second box.

The mobile apparatus can further include a camera mounted on the frame and communicably coupled to the processor where the camera and the processor collectively configured for identifying the item in the first box. The camera is coupled to the track and the mobile apparatus further includes a third motor coupled to the camera and communicably coupled to the processor, where the processor is further configured to control movement of the camera along the track. At least one rotary joint of the set of rotary joints can permit 360 degree of motion in a horizontal plane of one arm couple thereto. The picker robot can have at most four degrees of freedom.

The processor can be further configured to control operation of the picker robot to pick the item from a first compartment of a set of compartments of the first box to the second box. The processor can be further configured to control operation of the picker robot to pick the item from the first box to a first compartment of a set of compartments of the second box. The set of platforms can further include a third platform to support a third box where the third platform is positioned such that the picker robot is not able to pick items to or from the third box.

The set of platforms can further include a third platform to support a third box where the third platform includes a sliding mechanism such that the third box is movable from a first position in which the third box is stacked over the second box and prevents access, by the picker robot, to the second box, to a second position which permits the picker robot to access the second box for picking. The track can be a first track and the mobile apparatus can further include a second track, where the first platform is coupled to the second track to permit the first box to translocate vertically along the frame, and a third track, where the second platform is coupled to the third track to permit the second box to translocate vertically along the frame.

4.5 Example 5

In another illustrative example, a method for automatically fulfilling an order using a mobile picker apparatus in an environment that includes a shelf unit having a plurality of shelves includes: A) moving the mobile picker apparatus to the shelf unit; B) moving a first platform of the mobile picker apparatus in alignment with a first shelf of the plurality of shelves of the shelf unit; C) loading a first box from the first shelf to the first platform, the first box containing at least one item, the at least one item including an item in the order; D) acquiring, by a camera assembly of the mobile picker apparatus, imagery of the at least one item; E) determining, based on the imagery, a location of the item within the first box; F) picking, by a picker robot of the mobile picker apparatus, the item from the first box based on the location; and G) placing, by the picker robot, the item into a second box supported by a second platform of the mobile picker apparatus.

The method can further include, before moving the mobile picker apparatus to the shelf unit: receiving, by the mobile picker apparatus from a master server, a command to move to the shelf unit, the command including a route for the mobile picker apparatus to follow through the environment to the shelf unit, where moving the mobile picker apparatus to the shelf unit occurs in accordance with the route.

The mobile picker apparatus can include a frame arm, the first platform can be movably coupled to the frame arm, the camera assembly can be rigidly coupled to the frame arm, the picker robot can be rigidly coupled to the frame arm, and moving the first platform of the mobile picker apparatus in alignment with the first shelf includes: moving the first platform along the frame arm past at least one of the camera assembly or the picker robot without physically contacting the camera assembly and the picker robot. The method can further include, before moving the first platform of the mobile picker apparatus in alignment with the first shelf: locking a pose of the camera assembly. The camera assembly can include a mounting plate rigidly coupled to the frame arm, a robotic arm directly coupled to the mounting plate, and a push pull solenoid actuator coupled to the robotic arm. Accordingly, locking the pose of the camera assembly can include: actuating the push pull solenoid actuator to insert a shaft of the actuator through an opening of the mounting plate thereby preventing movement of at least the robotic arm.

The method can further include: while moving the first platform of the mobile picker apparatus in alignment with the first shelf, moving the second platform together with the first platform. The method can further include, before loading the first box from the first shelf: acquiring, by a camera coupled to the first platform, imagery of a code on the first box, the code providing an identifier to differentiate the first box from other boxes in the shelf unit; and determining the code corresponds to a box containing the item in the order. The code can be a quick response (QR) code.

The step of acquiring the imagery of the at least one item can include moving the first platform to a predetermined distance below the camera assembly. The predetermined distance can be based on a scanning range of the camera assembly.

The step of picking the item in the order from the first box can include: moving the first platform below the picker robot; moving, via a robotic arm of the picker robot, a gripper of the picker robot above the item in the first box; moving the first platform upwards until the item makes physical contact with the gripper; attaching the item to the gripper; and moving the first platform downwards thereby removing the item from the first box. The gripper can include a suction cup, the mobile picker apparatus can include a pump operably coupled to the suction cup, and attaching the item to the gripper can include: activating the pump to generate vacuum suction at the suction cup thereby suctioning the item to the suction cup.

The step of placing the item into the second box can include: moving, via the robotic arm of the picker robot, the gripper above the second box; and releasing the item from the gripper thereby causing the item to fall into the second box.

The method can further include: moving the first platform in alignment with the first shelf; and unloading the first box from the first platform to the first shelf. The method can further include: moving the first platform in alignment with a second shelf of the plurality of shelves of the shelf unit where the second shelf is different from the first shelf; and unloading the first box from the first platform to the second shelf. The method can further include: determining, based on the imagery, the at least one item in the first box does not include another item identical to the item in the order; moving the mobile picker apparatus to a replenishment shelf in the environment; moving the first platform in alignment with the replenishment shelf; and unloading the first box from the first platform to the replenishment shelf. The method can further include: moving the mobile picker apparatus to a consolidation shelf; moving the second platform in alignment with the consolidation shelf; and unloading the second box from the second platform to the consolidation shelf.

5. CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A mobile picker apparatus configured to operate in an environment to facilitate order fulfillment, the apparatus comprising:
- a body portion;
- a set of wheels, coupled to the body portion, to move the apparatus within the environment;
- a frame coupled to the body portion, the frame including only one frame arm defining a vertical axis;
- a set of platforms directly coupled to the frame arm and movable along the vertical axis, the set of platforms comprising:
  - a first platform configured to support a first box;
  - a first push-pull mechanism, coupled to the first platform, configured to load the first box onto the first platform and unload the first box from the first platform;
  - a second platform configured to support a second box; and
  - a second push-pull mechanism, coupled to the second platform, configured to load the second box onto the second platform and unload the second box from the second platform;
- a picker robot, rigidly coupled to the frame, configured to pick an item from the first box and place the item in the second box; and
- a camera assembly, rigidly coupled to the frame arm, configured to acquire imagery of at least the item in the first box, the camera assembly comprising:
  - a camera; and
  - a robotic arm, coupled to the camera and the frame arm, to change at least one of a position or orientation of the camera, wherein:
  - the camera and the robotic arm of the camera assembly have a first pose such that, when the camera and the robotic arm is in the first pose and the set of platforms moves along the frame arm past the camera assembly, the set of platforms do not physically contact the camera assembly; and
  - the picker robot has a second pose such that, when the picker robot is in the second pose and the set of platforms moves along the frame arm past the picker robot, the set of platforms do not physically contact the picker robot.

2. The apparatus of claim 1, wherein:
- the first platform and the second platform are configured to move together along a vertical direction; and
- the first platform is located at a first vertical position along the frame and the second platform is located at a second vertical position identical to the first vertical position along the frame.

3. The apparatus of claim 1, wherein the set of platforms further comprises:
- a third platform configured to support a third box, the third platform including a sliding mechanism configured to move the third box from a first position where the third box is disposed above the second box and prevents access, by the picker robot, to the second box, to a second position that provides the picker robot access to the second box.

4. The apparatus of claim 1, wherein the set of platforms is movable along a vertical direction with a vertical range of travel ranging from about 2 meters to about 4 meters.

5. The apparatus of claim 1, wherein the picker robot has six degrees of freedom.

6. The apparatus of claim 1, wherein the picker robot has four degrees of freedom.

7. The apparatus of claim 1, wherein the picker robot includes a Selective Compliance Articulated Robot Arm (SCARA) robotic arm.

8. The apparatus of claim 1, wherein:
- the set of platforms is movable along a vertical direction with a first range of travel;
- the picker robot comprises:
  - a robotic arm rigidly coupled to the frame; and
  - a gripper coupled to the robotic arm to pick the item, the gripper being movable, via the robotic arm, along the vertical direction with a second range of travel less than and overlapping the first range of travel;
- the first range of travel and the second range of travel are defined with respect to a ground of the environment; and
- the picker robot is configured to pick the item from the first box when the first platform is moved near the picker robot such that the item is within the second range of travel of the gripper.

9. The apparatus of claim 1, wherein the camera assembly further comprises:
- a locking mechanism, coupled to the robotic arm and the camera, to lock the robotic arm and the camera in the first pose.

10. The apparatus of claim 9, wherein:
- the robotic arm is coupled to the frame arm via a mounting plate rigidly coupled to the frame arm, the mounting plate having an opening; and
- the locking mechanism comprises:
  - a push pull solenoid actuator having a movable shaft, the push pull solenoid actuator extending the shaft through the opening of the mounting plate when engaging the locking mechanism, the push pull solenoid actuator retracting the shaft from the opening of the mounting plate when disengaging the locking mechanism.

11. The apparatus of claim 10, wherein the camera assembly further comprises:
- a magnet coupled to the mounting plate; and a magnetic sensor, coupled to the robotic arm, that detects the camera assembly is in the pose when the magnetic sensor is aligned to the magnet.

12. A mobile picker apparatus configured to operate in an environment to facilitate order fulfillment, the apparatus comprising:

a body portion;

a set of wheels, coupled to the body portion, to move the apparatus within the environment;

a frame coupled to the body portion;

a platform, movably coupled to the frame along a vertical direction, configured to support a box, the platform having a first range of travel along the vertical direction; and a picker robot rigidly coupled to the frame, the picker robot comprising:

a robotic arm having a first end rigidly coupled to the frame and a second end, the robotic arm providing less than six degrees of freedom of movement; and a gripper coupled to the second end of the robotic arm and movable, via the robotic arm, along the vertical direction, the gripper having a second range of travel along the vertical direction less than and overlapping with the first range of travel, wherein:

the picker robot is configured to pick an item from the box when the platform is moved near the picker robot such that the item is within the second range of travel of the gripper; and the first range of travel and the second range of travel are defined with respect to a ground of the environment.

13. The apparatus of claim 12, wherein:

the platform is a first platform and the box is a first box; and the apparatus further comprises:

a second platform, movably coupled to the frame along the vertical direction, configured to support a second box; and the picker robot is configured to place the item picked from the first box into the second box.

14. The apparatus of claim 12, further comprising:

a set of platforms movably coupled to the frame, the set of platforms including the platform; and a camera assembly rigidly coupled to the frame, the camera assembly comprising:

a robotic arm;

a camera coupled to the robotic arm, the camera and the robotic arm having a first pose such that, when the camera and the robotic arm in the first pose and the set of platforms moves along the frame past the camera assembly, the set of platforms do not physically contact the camera assembly; and a locking mechanism, coupled to the robotic arm and the camera, to lock the robotic arm and the camera in the first pose, wherein the picker robot has a second pose such that, when the picker robot is in the second pose and the set of platforms moves along the frame past the picker robot, the set of platforms does not physically contact the picker robot.

15. A mobile picker apparatus configured to operate in an environment to facilitate order fulfillment, the apparatus comprising:

a body portion;

a set of wheels, coupled to the body portion, to move the apparatus within the environment;

a frame arm coupled to the body portion;

a set of platforms movably coupled to the frame arm, each platform of the set of platforms being configured to support a box;

a camera assembly rigidly coupled to the frame arm, the camera assembly comprising:

a robotic arm;

a camera coupled to the robotic arm, the camera and the robotic arm having a first pose such that, when the camera and the robotic arm in the first pose and the set of platforms moves along the frame arm past the camera assembly, the set of platforms do not physically contact the camera assembly; and a locking mechanism, coupled to the robotic arm and the camera, to lock the robotic arm and the camera in the first pose; and a picker robot, coupled to the frame arm, having a second pose such that, when the picker robot is in the second pose and the set of platforms moves along the frame arm past the picker robot, the set of platforms do not physically contact the picker robot.

16. The apparatus of claim 15, wherein:

the robotic arm is coupled to the frame arm via a mounting plate rigidly coupled to the frame arm, the mounting plate having an opening;

the locking mechanism comprises:

a push pull solenoid actuator having a movable shaft, the push pull solenoid actuator extending the shaft through the opening of the mounting plate when engaging the locking mechanism, the push pull solenoid actuator retracting the shaft from the opening of the mounting plate when disengaging the locking mechanism; and the camera assembly further comprises:

a magnet coupled to the mounting plate; and a magnetic sensor, coupled to the robotic arm, that detects the camera assembly is in the first pose when the magnetic sensor is aligned to the magnet.

17. The apparatus of claim 12, wherein the first range of travel ranges from about 2 meters to about 4 meters.

18. The apparatus of claim 13, wherein:

the first platform and the second platform are configured to move together along the vertical direction; and the first platform is located at a first vertical position along the frame and the second platform is located at a second vertical position identical to the first vertical position along the frame.

19. The apparatus of claim 12, wherein the robotic arm of the picker robot has one of four degrees of freedom, five degrees of freedom, or six degrees of freedom.

20. The apparatus of claim 12, wherein the robotic arm of the picker robot is a Selective Compliance Articulated Robot Arm (SCARA) robotic arm.

* * * * *